(12) United States Patent
Baker et al.

(10) Patent No.: US 9,229,925 B2
(45) Date of Patent: *Jan. 5, 2016

(54) APPARATUS, METHOD AND COMPUTER READABLE MEDIUM FOR A MULTIFUNCTIONAL INTERACTIVE DICTIONARY DATABASE FOR REFERENCING POLYSEMOUS SYMBOL

(71) Applicant: Semantic Compaction Systems, Pittsburgh, PA (US)

(72) Inventors: Bruce R. Baker, Pittsburgh, PA (US); Robert V. Conti, Pittsburgh, PA (US); Russell T. Cross, Wooster, OH (US); Thomas R. Kovacs, Pittsburgh, PA (US); Cindy C. Halloran, Maumelle, AR (US); John D. Halloran, Maumelle, AR (US); David H. Hershberger, Millersburg, OH (US); Katya J. Hill, Pittsburgh, PA (US); Rob Read, Millersburg, OH (US)

(73) Assignee: SEMANTIC COMPACTION SYSTEMS INC., Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/416,023

(22) PCT Filed: Jul. 26, 2013

(86) PCT No.: PCT/US2013/052232
§ 371 (c)(1),
(2) Date: Jan. 20, 2015

(87) PCT Pub. No.: WO2014/018845
PCT Pub. Date: Jan. 30, 2014

(65) Prior Publication Data
US 2015/0242390 A1   Aug. 27, 2015

Related U.S. Application Data

(63) Continuation of application No. 13/826,661, filed on Mar. 14, 2013.

(60) Provisional application No. 61/676,491, filed on Jul. 27, 2012.

(51) Int. Cl.
*G06F 17/27* (2006.01)
*G06T 11/60* (2006.01)
(Continued)

(52) U.S. Cl.
CPC .......... *G06F 17/2735* (2013.01); *G06F 3/0482* (2013.01); *G06F 3/04817* (2013.01);
(Continued)

(58) Field of Classification Search
CPC ................ G06F 17/2735; G06F 17/30386
USPC ........................................................ 704/10
See application file for complete search history.

(56) References Cited

U.S. PATENT DOCUMENTS

| 4,661,916 A | 4/1987 | Baker et al. |
| 5,097,425 A | 3/1992 | Baker et al. |

(Continued)

FOREIGN PATENT DOCUMENTS

KR   20110046434 A   5/2011

OTHER PUBLICATIONS

International Search Report and Written Opinion for PCT/US2013/052232 dated Nov. 1, 2013.

(Continued)

*Primary Examiner* — Douglas Godbold
(74) *Attorney, Agent, or Firm* — Harness, Dickey & Pierce, P.L.C.

(57) ABSTRACT

An embodiment of the present application is directed to an apparatus, method, and or computer readable medium for effectively storing an interactive dictionary database in a memory. The interactive dictionary database includes a plurality of symbol sequences, each of the plurality of symbol sequences including at least one polysemous symbol and each of the plurality of symbol sequences being stored in association with at least one word, sentence, phoneme, message, letter, number, morpheme, command and/or phrase. The method includes providing, in the interactive dictionary database, information useable to assign at least a subset of the plurality of symbol sequences at least one of an active and an inactive status.

10 Claims, 18 Drawing Sheets

(51) Int. Cl.
  *G09G 5/377* (2006.01)
  *G06F 3/0482* (2013.01)
  *G06F 17/30* (2006.01)
  *G09G 5/14* (2006.01)
  *G06F 3/0488* (2013.01)
  *G06F 3/0481* (2013.01)

(52) U.S. Cl.
  CPC .......... *G06F3/04886* (2013.01); *G06F 17/274* (2013.01); *G06F 17/30386* (2013.01); *G06F 17/30637* (2013.01); *G06T 11/60* (2013.01); *G09G 5/14* (2013.01); *G09G 5/377* (2013.01); *G09G 2340/12* (2013.01); *G09G 2354/00* (2013.01)

(56) References Cited

U.S. PATENT DOCUMENTS

| | | | |
|---|---|---|---|
| 5,210,689 | A | 5/1993 | Baker et al. |
| 5,297,041 | A | 3/1994 | Kushler et al. |
| 5,748,177 | A | 5/1998 | Baker et al. |
| 5,920,303 | A | 7/1999 | Baker et al. |
| 6,323,846 | B1 | 11/2001 | Westerman et al. |
| 6,570,557 | B1 | 5/2003 | Westerman et al. |
| 6,646,573 | B1 | 11/2003 | Kushler et al. |
| 6,677,932 | B1 | 1/2004 | Westerman |
| 6,778,995 | B1 | 8/2004 | Gallivan |
| 7,076,738 | B2 | 7/2006 | Baker et al. |
| 7,319,957 | B2 | 1/2008 | Robinson et al. |
| 7,506,256 | B2 | 3/2009 | Baker et al. |
| 7,614,008 | B2 | 11/2009 | Ording |
| 7,626,574 | B2 | 12/2009 | Kim |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,672,950 | B2 | 3/2010 | Eckardt, III et al. |
| 7,679,534 | B2 | 3/2010 | Kay et al. |
| 7,712,053 | B2 | 5/2010 | Bradford et al. |
| 7,720,682 | B2 | 5/2010 | Stephanick et al. |
| 7,844,914 | B2 | 11/2010 | Andre et al. |
| 7,881,936 | B2 | 2/2011 | Longe et al. |
| 7,966,578 | B2 | 6/2011 | Tolmasky et al. |
| 8,065,154 | B2 | 11/2011 | Schindler et al. |
| 8,095,364 | B2 | 1/2012 | Longe et al. |
| 8,234,589 | B2 | 7/2012 | Baker et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,381,137 | B2 | 2/2013 | Bradford et al. |
| 8,402,026 | B2 | 3/2013 | Gallivan |
| 8,577,279 | B2 | 11/2013 | Baker et al. |
| 2002/0015024 | A1 | 2/2002 | Westerman et al. |
| 2002/0163544 | A1 | 11/2002 | Baker et al. |
| 2002/0196163 | A1 | 12/2002 | Bradford et al. |
| 2003/0210280 | A1 | 11/2003 | Baker et al. |
| 2005/0010555 | A1 | 1/2005 | Gallivan |
| 2005/0017954 | A1 | 1/2005 | Kay et al. |
| 2005/0192802 | A1 | 9/2005 | Robinson et al. |
| 2005/0234722 | A1 | 10/2005 | Robinson et al. |
| 2005/0283358 | A1 | 12/2005 | Stephanick et al. |
| 2005/0283364 | A1 | 12/2005 | Longe et al. |
| 2006/0026521 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0106847 | A1 | 5/2006 | Eckardt et al. |
| 2006/0122838 | A1 | 6/2006 | Schindler et al. |
| 2006/0148520 | A1 | 7/2006 | Baker et al. |
| 2006/0190256 | A1 | 8/2006 | Stephanick et al. |
| 2006/0197753 | A1 | 9/2006 | Hotelling |
| 2006/0247915 | A1 | 11/2006 | Bradford et al. |
| 2007/0106492 | A1 | 5/2007 | Kim |
| 2007/0110222 | A1 | 5/2007 | Kim |
| 2007/0152980 | A1 | 7/2007 | Kocienda et al. |
| 2007/0255570 | A1 | 11/2007 | Annaz et al. |
| 2008/0233546 | A1 | 9/2008 | Baker et al. |
| 2009/0150828 | A1* | 6/2009 | Baker et al. .................. 715/835 |
| 2010/0106752 | A1 | 4/2010 | Eckardt, III et al. |
| 2010/0122164 | A1 | 5/2010 | Kay et al. |
| 2010/0174529 | A1 | 7/2010 | Bradford et al. |
| 2011/0010174 | A1 | 1/2011 | Longe et al. |
| 2011/0106743 | A1* | 5/2011 | Duchon ......................... 706/46 |
| 2012/0174035 | A1 | 7/2012 | Baker et al. |
| 2013/0065204 | A1 | 3/2013 | LoStracco et al. |
| 2013/0194191 | A1 | 8/2013 | Bradford et al. |
| 2013/0212098 | A1 | 8/2013 | Gallivan |
| 2014/0032584 | A1* | 1/2014 | Baker et al. ................... 707/758 |
| 2014/0111689 | A1* | 4/2014 | Kim et al. ..................... 348/563 |

OTHER PUBLICATIONS

International Search Report and Written Opinion for PCT/US2013/052217 dated Nov. 1, 2013.
U.S Office Action dated Mar. 6, 2015 for corresponding U.S. Appl. No. 13/826,504.
U.S. Office Action dated Mar. 6, 2015 for corresponding U.S. Appl. No. 13/827,937.
International Preliminary Report on Patentability mailed Feb. 5, 2015 for corresponding International Application No. PCT/US2013/052232.
International Preliminary Report on Patentability mailed Feb. 5, 2015 for corresponding International Application No. PCT/U52013/052217.
U.S. Office Action for corresponding U.S. Appl. No. 13/826,661 mailed Jul. 8, 2015.
U.S. Notice of Allowance for corresponding U.S. Appl. No. 13/827,937 mailed Jul. 8, 2015.
U.S. Notice of Allowance for corresponding U.S. Appl. No. 13/826,504 mailed Jun. 30, 2015.
U.S. Office Action for corresponding U.S. Appl. No. 14/416,017 mailed Jul. 21, 2015.
U.S. Notice of Allowance for corresponding U.S. Appl. No. 13/827,156 mailed Aug. 3, 2015.

* cited by examiner

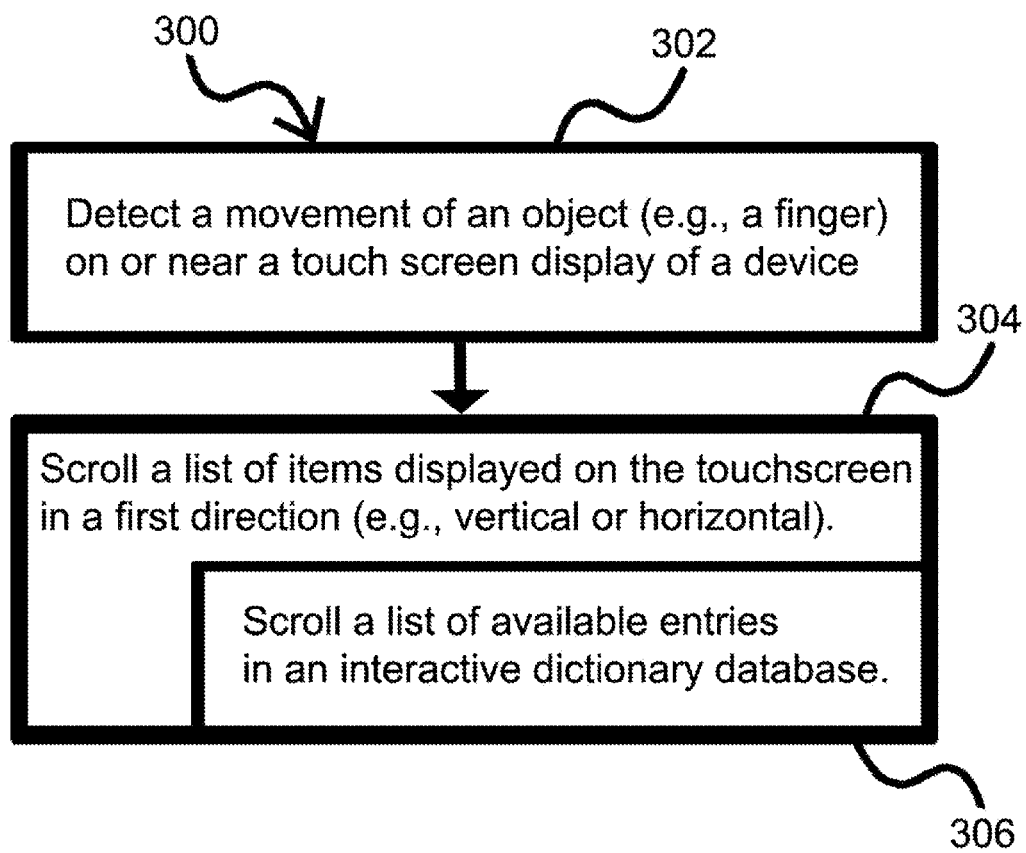

| | | | | | |
|---|---|---|---|---|---|
| big | | Elephants are BIG. | Active | 58 | |
| can I | | Pour the CAN of juice into the glass. Girl points to herself, I. | Active | 175 | |
| drop | | When the elephant DROPS something, it will fall down. | Inactive | 0 | [lift, 25] |
| fat | | Elephant represents big sizes. Some people are FAT. | Active | 23 | |
| heavy | | Elephants can lift HEAVY things. The sun is HEAVY. | Active | 34 | |
| I can | | Girl points to herself, I. Pour the CAN of juice into the glass. | Active | 143 | |
| large | | Elephants are big. LARGE is another word for big. | Active | 18 | |
| lift | | The elephant can LIFT things with it's trunk. | Active | 10 | |
| meet | | One elephant's trunk MEETs the other elephant's tail. | Active | 42 | |
| paint | | You can PAINT a room in your house with any color of the rainbow. | Active | 4 | |
| paint | | PAINT can be any color of the rainbow. PAINT is one of your art supplies. | Inactive | 0 | |
| power | | Elephants and trucks both have a lot of POWER. | Active | 21 | |
| powerful | | Elephants and trucks are both POWERFUL. | Active | 7 | |
| strong | | Give a thumb's up to elephants that are STRONG. | Active | 30 | |
| thick | | Elephants have THICK skin. Some books are very THICK. | Active | 5 | |
| weak | | The opposite of strong is WEAK. | Active | 10 | |

Figure 7

APPARATUS, METHOD AND COMPUTER READABLE MEDIUM FOR A MULTIFUNCTIONAL INTERACTIVE DICTIONARY DATABASE FOR REFERENCING POLYSEMOUS SYMBOL

PRIORITY STATEMENT

The present application is a PCT national stage application of international application PCT/US2013/052232 filed Jul. 26, 2013, which is a continuation of U.S. application Ser. No. 13/826,661, filed Mar. 14, 2013, which claims priority under 35 U.S.C. §119(e) to U.S. provisional patent application No. 61/676,491 filed Jul. 27, 2012, the entire contents of which are hereby incorporated herein by reference.

FIELD

The present application generally relates to an apparatus and method using polysemous (multi-meaning) symbols.

BACKGROUND

A system and method for producing synthetic single or plural word messages was developed by Bruce Baker et al. and is disclosed in U.S. Pat. No. 4,661,916 to Baker et al. (the Baker '916 patent) issued on Apr. 28, 1987, the entire contents of which are hereby incorporated herein by reference. The system was directed to a linguistic coding system and keyboard for use by people with cognitive and/or physical impairments. The coding system and associated keyboard was used to store and access messages, which included words, plural word messages, phonemes, sentences, phrases, full names, letters, numbers, functions, or any combination thereof.

In such a system, the keyboard was coupled to a computer device, or was alternately part of the stand-alone entity which included a microprocessor, memory and display. The memory stored the messages for selective retrieval by the keyboard. The messages retrieved from the keyboard were then fed to a voice synthesizer, for example, which converted them through a loudspeaker to produce audible spoken messages. On this keyboard, associated with each of a plurality of keys, were polysemous (multi-meaning) symbols, also known as icons. By designating selected ones of the keys and their associated symbols or icons, selected stored messages or plural word messages (including but not limited to words, phrases and sentences) were accessed from the memory and then subsequently output.

With the system described in the Baker '916 patent, messages stored in the memory could be retrieved by activating a combination of symbol keys and other keys to vary the context of the polysemous symbols. Thus, a plurality of sentences could be selectively generated as a function of polysemous symbols in combination with other polysemous symbols. This allowed a user the ability to access thousands of words or messages based upon as little as one, two, or three keystrokes. Further, with symbols being polysemous, thousands of symbol sequences could be generated with only a small number of keys on a keyboard. Based upon ease of use of the system, the polysemous icons or symbols utilized, and the easily memorized symbol sequence combinations, such a system became ideal for many mentally and physically challenged users for whom spelling and typing, as well as speech itself, was extremely difficult.

The system of the Baker '916 patent allowed for an operator to go directly from thought to speech. This was possible because each key of the keyboard bore a central image or symbol which was polysemous and illustrated an important aspect of life and/or linguistic function. The keyboards could be varied depending on the intellectual level of the intended operator. Therefore, each keyboard could in itself be a language which was designed for or with a specific user.

Each of the polysemous symbols was developed to be rich in associations so that combinations of symbols could signal sentence or message ideas in the operator's memory. This enabled the generation of plural word or whole sentence messages by the activation of only a limited number of keys. The device allowed for the generation of many sentences or phrases and a large core vocabulary which could be easily retrieved from memory because of the ease with which the polysemous symbols on the keys portrayed the production of whole thoughts.

In the aforementioned system of the Baker '916 patent, the spatial configuration of the symbols on a given keyboard remained constant. Sequences of symbols in fixed places were consistent, allowing messages to be reliably produced with the same sequence each time. This constant mapping supported the learning of motor patterns associated with symbol sequences. As such sequences were learned, the user could establish motor programs that allow sequences to be produced quickly and accurately in the same way a touch typist efficiently spelled many words or a musician played an instrument.

The aforementioned Baker '916 patent provided an excellent means of accessing high frequency "core" vocabulary words using sequenced polysemous symbols. However, the system of the Baker '916 patent only provided limited access to the relatively large set of low frequency "fringe" vocabulary words that would only be used periodically.

A subsequent design that provided for a way to easily access fringe vocabulary utilizing non-polysemous symbols on dynamic graphical screens was disclosed in U.S. Pat. No. 5,920,303 to Baker et al. (the Baker '303 patent) issued Jul. 6, 1999, the entire contents of which are hereby incorporated herein by reference. In the system of the aforementioned Baker '303 patent, non-polysemous symbols were used for accessing fringe vocabulary. In the system of the Baker '303 patent, less than all of a plurality of keys on the displayed keyboard were dynamically redefined in response to selection of a symbol or sequentially selected symbols. These dynamic characteristics produced a dynamically redefined keyboard for accessing fringe vocabulary.

Even though the system of the aforementioned Baker '303 patent provided an improved method for accessing fringe vocabulary, it could still be limited in that it could not provide efficient access to a very large set of fringe vocabulary words. The fringe vocabularies of adolescents or adults may include many thousand words that are used on occasion in specific contexts. For example, most vocabulary words that are learned in academic or vocational settings are fringe vocabulary words related to specific topics. In the system of the Baker '303 patent, a subset of the plurality of keys on the displayed keyboard could contain dynamically re-defined non-polysemous symbols for selection of fringe vocabulary. In some embodiments, this subset of keys on the displayed keyboard may include one row of twelve keys, which may be used to access fifty different fringe words, for example. In this case, the operator may need to use command keys to browse through a set of non-polysemous symbols that is much larger than the number of available key locations. A control key may be used to dynamically redefine this subset of keys multiple times until the desired symbol is presented. In the system of the aforementioned Baker '303 patent, the operator may need to execute six or more keystrokes to access a desired fringe vocabulary word corresponding to one of a large number of non-polysemous symbols.

Although many people have learned to successfully use augmentative and alternative communication systems containing embodiments of the semantic compaction encoding techniques to communicate with very high levels of linguistic performance, some populations of children have had difficulty learning more advanced systems where the available language is effectively unlimited. Children with autism, in particular, may be overwhelmed by a large array of unfamiliar polysemous symbols and potential polysemous symbol sequences. Alternatively, they may perseverate on one symbol while a clinician is trying to provide structured instructional activities involving sequences associated with a different polysemous symbol.

The Baker '916 patent provided for embodiments that include a keyboard with a relatively large number of polysemous symbols suitable for individuals with relatively high cognitive and linguistic skills, and embodiments that included a keyboard with a relatively small number of polysemous symbols suitable for individuals with more significant cognitive or linguistic impairments. An individual who has difficulty learning the system may benefit from a system with a simpler keyboard, but this consequently limits the availability of stored language content.

U.S. Pat. No. 5,297,041 issued Mar. 22, 1994 (the Kushler '041 patent), the entire contents of which are hereby incorporated herein by reference, provided for a predictive input system which only allowed an operator to select a polysemous symbol that would lead to the valid production of a sequence for accessing a previously stored message after, an initial polysemous symbol has been selected (or even prior to selection). The subsequent Baker '303 patent provided for a dynamically re-defined keyboard, where individual keys were dynamically re-definable after one or more initial polysemous symbols were selected to provide additional visual information about potential words or messages that may be produced by selecting one or more additional symbols. Such systems may support access to thousands of stored words or messages through selection of unique sequences of polysemous symbols, and provide feedback in relation to available sequences. Although these systems may store enough content to support selective generation of numerous unique sentences with a relatively small number of polysemous symbols, all valid polysemous symbol sequences and corresponding stored words and messages are accessible to the user at all times. Thus, access to the stored language content was effectively unlimited.

In the system of the Baker '916 patent, the communication device included a keyboard coupled to a microprocessor associated with an electrical programmable read only memory. Each key of the keyboards included a relatively centrally disposed polysemous symbol, and all keys were permanently displayed in a static configuration. A given pre-stored message including one or more words, for example, could be retrieved from the electrical programmable read-only memory by actuating a specific sequence of keys that included polysemous symbols, where the key sequence was associated with the given pre-stored message.

The systems of several subsequent patents improved on the design disclosed in the Baker '916 patent while consistently maintaining a requirement that pre-stored messages be retrieved from an electronic memory via actuation of a corresponding symbol sequence using a single keyboard or keyboard overlay. The system developed by Baker, et al, and disclosed in U.S. Pat. No. 5,210,689 to Baker, et al, (the Baker '689 patent) issued on May 11, 1993, the entire contents of which are hereby incorporated herein by reference, provided for a continuous input system that allowed a user utilizing an icon or symbol mode to access stored morphemes, words, phrases, or sentences by selecting sequences of polysemous icon symbols and allowed a user utilizing a character, word prediction, or suffix mode to enter additional content using a text-based keyboard. In the system of the Baker '689 patent, the keyboards for the symbol mode and character, word prediction or suffix mode overlapped in space so that a user could automatically toggle between modes on a single keyboard without having to manually switch between modes.

The system disclosed in U.S. Pat. No. 5,920,303, issued to Baker, et al on Jul. 6, 1999 provided for a dynamic keyboard on a graphical user interface including a plurality of keys with associated symbols that are dynamically redefinable to provide access to higher level keyboards. In this system, keys could be dynamically redefined based on one or more initially selected symbols in a sequence such that symbols on dynamically redefined keys could include embellished symbols and/or newly displayed symbols. This system also allowed for easy access to core vocabulary words through selection of sequenced polysemous symbols while providing improved access to fringe vocabulary words via selection of the new or embellished symbols corresponding to fringe vocabulary words.

In the systems of the above-mentioned patents, and other patents subsequent to the Baker '916 patent, sequenced polysemous symbols were selected from a keyboard to retrieve associated stored messages from an electronic memory. Where features of the keyboard have been dynamically redefined based on one or more initially selected polysemous symbols in a sequence, those dynamically redefinable features were limited to changes in individual keys or symbols.

An alternative to the polysemous symbols disclosed in the Baker '916 patent and subsequent patents involves the use of solely non-polysemous (single meaning) symbols. When solely non-polysemous symbols are used, a small number of non-polysemous symbols, for example 20 symbols in a four by five array, are initially introduced. Selection of one of these non-polysemous symbols is typically used to produce a stored message, such as a noun that is easy to represent with pictures of a pre-stored sentence. At this point, solely non-polysemous symbols may be used easily, and with minimal effort.

Use of solely non-polysemous symbols becomes much more challenging, however, when the number of available stored vocabulary words and sentences exceeds the number of available locations on the display of the communication device; when this happens, the set of non-polysemous symbols and associated stored messages must be sorted and divided across a plurality of linked pages, and the operator must navigate between these pages to locate and select desired messages. Typically, many of the non-polysemous symbols on the highest level "master" page include links to additional pages of non-polysemous symbols. These additional pages may contain non-polysemous symbols that include links to even more pages, a link back to the master page, and/or some non-polysemous symbols that are associated with stored messages.

The words on these various pages are often organized into semantic categories. In these systems, selecting a non-polysemous symbol on the master page that represents a superordinate semantic category links the operator to a second page containing non-polysemous symbols associated with category members and/or subordinate categories. On the second page, selecting a non-polysemous symbol associated with a subordinate category activates a link to a third page containing additional non-polysemous symbols, and so on. Selecting a non-polysemous symbol associated with a category member generates the associated stored message.

As an example, the master page on a communication device may have non-polysemous symbols linking to the categories "people," "food," "school", "fun times," and clothing." Selecting the non-polysemous symbols that includes a link to the "clothing" category may link to a page containing non-polysemous symbols associated with the category members "shirt," "pants," "underwear," and "shoes," as well as non-polysemous symbols that include links to the subordinate categories "winter clothing," "summer clothing," and "formal clothing," and a non-polysemous symbol including a link back to the master page.

As the vocabulary increases in size, the number of pages of non-polysemous symbols on such a system must necessarily increase, which in turn increases the cognitive complexity of tasks involved in using the system. In order to produce any given word, the operator must recall the categorical organization of the system well enough to identify the superordinate and subordinate categories that must be linked in order to navigate to the page containing the desired word, and visually search for each symbol that should be selected during navigation.

For example, the operator may recall that "coat" is located under the superordinate category for clothing, and still not be sure whether "coat" is located under the subordinate category for "winter clothing" or "formal clothing." This becomes a recurrent problem when navigating many pages. In order to store a 1,000 word vocabulary, consistent with that of a typically developing three-year-old, a minimum of 56 linked 20-location pages of non-polysemous symbols are required. When an operator must navigate such an extensive set of categorically organized pages, actual communication using the system may be very limited because the cognitive demands of page navigation are so extensive.

Recent developments in broadly available consumer technologies have included tablets, smart phones, and other portable multifunction devices with touch-screen interfaces, such as iPADs, iPhones, and Android devices. These devices have allowed programmers to develop and implement a wide range of third-party application programs, including assistive technology programs, as long as the program was compatible with the device hardware and the software platform that was integral to the device's operating system. The software platforms on portable multifunction devices were highly compatible with a wide range of third-party augmentative and alternative communication programs containing numerous pages of non-polysemous symbols, but were not necessarily compatible with established embodiments of the Baker '916 patent or any subsequent patents using polysemous symbol systems.

Previous embodiments of the Baker '916 patent and all subsequent patents have relied on a method of retrieving stored messages from an electronic memory when a corresponding symbol sequence is selected on a keyboard. This process could have involved a large and complex computer program with over a million lines of code and a database defining the interactions between the various polysemous or non-polysemous symbols, words, and speech. Modifying such a program to be elegantly and efficiently transferred between a plurality of operating systems on tablet, smart phone, and other portable multifunction devices may have been very difficult or even impossible.

Previous embodiments of the Baker '916 patent and all subsequent patents have incorporated a plurality of polysemous symbols that were rich with association, and could be used sequentially to produce a plurality of previously stored messages using various polysemous symbol sequences. The association between a polysemous symbol sequence and a corresponding previously stored message often was not immediately obvious to an inexperienced operator learning to use a polysemous symbol system for communication, or to that person's instructor. Experienced operators have often needed to give explanations of the associations between polysemous symbol sequences and corresponding previously stored messages have often been required in instructional and clinical settings. Rationales to explain these associations have been provided in printed (hard copy) manuals that service providers could access who were teaching an inexperienced operator to use a polysemous symbol system for communication. Such hard-copy manuals can provide critical reference material for non-disabled service providers in instructional and clinical settings. In previous communication devices utilizing sequenced polysemous symbols, an operator using a spelling mode to enter a word in a message window could optionally see a visually presented display of an existing polysemous symbol sequence that corresponds to a previously stored message with text matching the word that was just spelled. If any word or letter combination that did not correspond to a previously stored message were produced using spelling, the text would still be entered into a message window, but a corresponding polysemous symbol sequence would not be presented. This tool was primarily directed towards enhancing the operator's communication rate as messages were generated by reminding him/her that a polysemous symbol sequence could be used to produce a word that was just spelled using fewer keystrokes.

SUMMARY

The inventors have noticed that rationales have never been integrated into the design of a polysemous symbol based communication system so that a user could quickly reference them, and that they have never been presented in a format that was easily accessible to a person with severe physical impairments, such as many who rely on AAC technologies to communicate.

The inventors have discovered that there is a need for an accessible interactive dictionary tool explicitly designed to support the needs of inexperienced operators who may rely heavily on independent practice and self-directed learning strategies as they learn how to use polysemous symbol sequences for communication. At least one embodiment of the present invention is directed to a system (such as an AAC system for example), apparatus, computer readable medium and/or method including an application program utilizing sequenced polysemous symbols to access messages. Note that throughout the embodiments of the application, the word "message" or "messages" is used to mean any of words, plural word messages, phonemes, morphemes, sentences, phrases, full names, letters, numbers, functions, commands or any combination thereof, stored in association with sequenced polysemous symbols and/or at least one entry in an interactive dictionary database.

At least one embodiment of the system, apparatus, computer readable medium and/or method may be directed to at least one of:

1. Implementing an apparatus, computer readable medium method and/or an application program that may be adapted to a plurality of consumer devices, including tablets, smart phones and/or other devices computer processors, touch screen interfaces, memory and/or a plurality of different operating systems; and/or using sequenced multi-meaning symbols in such a system, apparatus, method and/or application program.

2. Implementing an application program, apparatus, computer readable medium and/or method involving an interactive dictionary database useful for adding and editing stored messages that correspond to polysemous symbol sequences and sequences of linked electronic screen overlays, for selecting a subset of previously stored messages that should be assigned an active status, and for searching for previously stored messages. The term of each entry in the dictionary database may be a letter, word, morpheme, phrase, phoneme, sentence, full name, number, plural word message, function, command or any combination thereof that can be produced on the system using polysemous symbol sequences and sequences of linked electronic screen overlays. The definition of each entry may include at least one of the corresponding symbol sequence and a rationale to explain the relationship between the word and the corresponding symbol sequence.

3. Providing an application program, apparatus, computer readable medium and/or method, for an experienced operator for example, to temporarily and systematically limit the number of active polysemous symbols or polysemous symbol sequences during instructional activities, or as an inexperienced operator for example is learning to use different polysemous symbol sequences on the system, to temporarily and systematically limit the number of active polysemous symbols or polysemous symbol sequences during instructional activities so that practice activities can be directed towards triggering polysemous symbols or polysemous symbol sequences that are active without modifying or removing any stored content. This may be accomplished, for example, by adjusting a binary setting associated with each entry in the interactive dictionary database to specify whether the corresponding symbol sequence should be active (available to the user) or inactive (hidden). Additionally, using word/frequency count information obtained from LAM data, for example, additional symbol sequences developmentally based on the user's performance with the system can thereafter be activated.

4. Providing an application program, apparatus, computer readable medium and/or method for searching the interactive dictionary database for a previously stored letter, word, morpheme, phrase, phoneme, sentence, full name, number, plural word message, function, command or any combination thereof and retrieving any corresponding definitions (including a symbol sequence and/or rationale for example) to identify a corresponding polysemous symbol sequence and/or sequence of linked electronic screen overlays.

At least one embodiment of the present application is directed to a method comprising: storing an interactive dictionary in a memory, the interactive dictionary including a plurality of symbol sequences, each of the plurality of symbol sequences including at least one polysemous symbol and each of the plurality of symbol sequences being stored in association with at least one of a letter, word, morpheme, phrase, phoneme, sentence, full name, number, plural word message, function and command; and providing information useable to assign a subset of the stored at least one of words, sentences, phonemes, plural word messages, full names, letters, numbers, morphemes, functions, commands and phrases at least one of an active and an inactive status.

At least one embodiment of the present application is directed to an article of manufacture, comprising: a first code segment for causing a computer device to store an interactive dictionary in a memory, the interactive dictionary including a plurality of symbol sequences, each of the plurality of symbol sequences including at least one polysemous symbol and each of the plurality of symbol sequences being stored in association with at least one of a letter, word, mo morpheme, phrase, morpheme, phrase, phoneme, sentence, full name, number, plural word message, function and command; and a second code segment for causing a computer device to provide information useable to assign a subset of the stored at least one of words, sentences, phonemes, plural word messages, full names, letters, numbers, morphemes, functions, commands and phrases at least one of an active and an inactive status.

At least one embodiment of the present application is directed to an apparatus, comprising: a memory configured to store an interactive dictionary, the interactive dictionary including a plurality of symbol sequences, each of the plurality of symbol sequences including at least one polysemous symbol and each of the plurality of symbol sequences being stored in association with at least one of letter, word, morpheme, phrase, phoneme, sentence, full name, number, plural word message, function and command; and an integrated input and display device configured to provide information useable to assign a subset of the stored at least one of words, sentences, phonemes, plural word messages, full names, letters, numbers, morphemes, functions, commands and phrases at least one of an active and an inactive status.

At least one embodiment of the present application is directed to a method, comprising: receiving an indication of initiation of a search, of a stored interactive dictionary database, by a user; displaying an electronic screen overlay, usable for searching the interactive dictionary database, to the user; receiving an indication of input of text into the electronic screen overlay usable for searching; determining whether or not at least one entry in the interactive dictionary database includes a term corresponding to text of a previously stored at least one of a letter, word, morpheme, phrase, phoneme, sentence, full name, number, plural word message, function and command matching the input text; and displaying, upon determining that one or more entries in the interactive dictionary database includes a term corresponding to the text of a previously stored at least one of a letter, word, morpheme, phrase, phoneme, sentence, full name, number, plural word message, function and command that matches the input text, a definition of the determined one or more identified entries in the interactive dictionary database.

At least one embodiment of the present application is directed to an article of manufacture, comprising: a first code segment for causing a computer device to receive an indication of initiation of a search, of a stored interactive dictionary database, by a user; a second code segment for causing the computer device to display an electronic screen overlay, usable for searching the interactive dictionary database, to the user; a third code segment for causing the computer device to receive an indication of input of text into the electronic screen overlay usable for searching; a fourth code segment for causing the computer device to determine whether or not at least one entry in the interactive dictionary database includes a term corresponding to text of a previously stored at least one of a letter, word, morpheme, phrase, phoneme, sentence, full name, number, plural word message, function and command matching the input text; and a fifth code segment for causing the computer device to display, upon determining that one or more entries in the interactive dictionary database includes a term corresponding to the text of a previously stored at least one of a letter, word, morpheme, phrase, phoneme, sentence, full name, number, plural word message, function and command that matches the input text, a definition of the determined one or more identified entries in the interactive dictionary database.

At least one embodiment of the present application is directed to an apparatus, comprising: a processor, configured to receive an indication of initiation of a search, of a stored interactive dictionary database, by a user; an integrated input and display device to display an electronic screen overlay, usable for searching the interactive dictionary database, to the user, the processor being further configured to receive an indication of input of text into the electronic screen overlay usable for searching, and determine whether or not at least one entry in the interactive dictionary database includes a term corresponding to text of a previously stored at least one of a letter, word, morpheme, phrase, phoneme, sentence, full name, number, plural word message, function and command matching the input text, and the display being further configured to display, upon the processor determining that one or more entries in the interactive dictionary database includes a term corresponding to the text of a previously stored at least one of a letter, word, morpheme, phrase, phoneme, sentence, full name, number, plural word message, function and command, a definition of the determined one or more identified entries in the interactive dictionary database.

At least one embodiment of the present application is directed to a method, comprising: providing polysemous symbols for selection on an initial electronic screen overlay displayed on a display; storing, in a memory, an interactive dictionary database including a plurality of entries, each entry including at least one sequence of symbols including at least one of the polysemous symbols and including an associated at least one of a letter, word, morpheme, phrase, phoneme, sentence, full name, number, plural word message, function and command; receiving an indication of input of a at least one of a letter, word, morpheme, phrase, phoneme, sentence, full name, number, plural word message, function and command via a spelling mode; storing an indication of a number of times that the at least one of a letter, word, morpheme, phrase, phoneme, sentence, full name, number, plural word message, function and command is received via the spelling mode; and displaying a prompt, prompting storage of a symbol sequence in the interactive dictionary database corresponding to the received input at least one of a letter, word, morpheme, phrase, phoneme, sentence, full name, number, plural word message, function and command, upon the stored indication reaching a frequency threshold.

At least one embodiment of the present application is directed to an apparatus, comprising: an integrated input and display device configured to provide polysemous symbols for selection on an initial electronic screen overlay; a memory, configured to store an interactive dictionary database including a plurality of entries, each entry including at least one sequence of symbols including at least one of the polysemous symbols and including an associated at least one of a letter, word, morpheme, phrase, phoneme, sentence, full name, number, plural word message, function and command; and a processor configured to receive indication of input of a at least one of a letter, word, morpheme, phrase, phoneme, sentence, full name, number, plural word message, function and command via a spelling mode, to store in the memory, an indication of a number of times that the at least one of a letter, word, morpheme, phrase, phoneme, sentence, full name, number, plural word message, function and command is received via the spelling mode, and to control the integrated input and display device to display a prompt, prompting storage of a symbol sequence in the interactive dictionary database corresponding to the received input at least one of a letter, word, morpheme, phrase, phoneme, sentence, full name, number, plural word message, function and command, upon the processor recognizing that the stored indication has reached a frequency threshold.

At least one embodiment of the present application is directed to an article of manufacture, comprising: a first code segment for causing a computer device to provide polysemous symbols for selection on an initial electronic screen overlay displayed on a display; a second code segment for causing the computer device to store, in a memory, an interactive dictionary database including a plurality of entries, each entry including at least one sequence of symbols including at least one of the polysemous symbols and including an associated at least one of a letter, word, morpheme, phrase, phoneme, sentence, full name, number, plural word message, function and command; a third code segment for causing the computer device to receive an indication of input of a at least one of a letter, word, morpheme, phrase, phoneme, sentence, full name, number, plural word message, function and command via a spelling mode; a fourth code segment for causing the computer device to store an indication of a number of times that the at least one of a letter, word, morpheme, phrase, phoneme, sentence, full name, number, plural word message, function and command is received via the spelling mode; and a fifth code segment for causing the computer device to display a prompt, prompting storage of a symbol sequence in the interactive dictionary database corresponding to the received input at least one of a letter, word, morpheme, phrase, phoneme, sentence, full name, number, plural word message, function and command, upon the stored indication reaching a frequency threshold.

At least one embodiment of the present application is directed to a method, comprising: storing an interactive dictionary in a memory, the interactive dictionary including a plurality of symbol sequences, each of the plurality of symbol sequences including at least one polysemous symbol and each of the plurality of symbol sequences being stored in association with at least one of a letter, word, morpheme, phrase, phoneme, sentence, full name, number, plural word message, function and command; providing information useable to assign a subset of the plurality of symbol sequences, stored in association with at least one of a at least one of letters, words, morphemes, phrases, phonemes, sentences, full names, numbers, plural word messages, functions and commands, at least one of an active and an inactive status; receiving an indication of an assignment of an active status to at least one of the symbol sequences; and displaying polysemous symbols on an initial electronic screen overlay displayed on a display, wherein polysemous symbols, included within at least one symbol sequence assigned an active status, are selectable.

At least one embodiment of the present application is directed to an apparatus, comprising: a memory configured to store an interactive dictionary, the interactive dictionary including a plurality of symbol sequences, each of the plurality of symbol sequences including at least one polysemous symbol and each of the plurality of symbol sequences being stored in association with at least one of a letter, morpheme, phrase, phoneme, sentence, full name, number, plural word message, function and command; an interactive input and display device configured to provide information useable to assign a subset of the plurality of symbol sequences, stored in association with at least one of a at least one of letters, words, morphemes, phrases, phonemes, sentences, full names, numbers, plural word messages, functions and commands, at least one of an active and an inactive status; a processor configured to receive an indication of an assignment of an active status to at least one of the symbol sequences, the processor being further configured to control the interactive input and display device to display polysemous symbols on an initial electronic screen overlay, wherein polysemous symbols, included within at least one symbol sequence assigned an active status, are selectable.

At least one embodiment of the present application is directed to an article of manufacture, comprising: a first code segment for causing a computer device to store an interactive dictionary in a memory, the interactive dictionary including a plurality of symbol sequences, each of the plurality of symbol sequences including at least one polysemous symbol and each of the plurality of symbol sequences being stored in association with at least one of a letter, word, morpheme, phrase, phoneme, sentence, full name, number, plural word message, function and command; a second code segment for causing the computer device to provide information to assign a subset of the plurality of symbol sequences, stored in association with at least one of a at least one of letters, words, morphemes, phrases, phonemes, sentences, full names, numbers, plural word messages, functions and commands, at least one of an active and an inactive status; a third code segment for causing the computer device to receiving an indication of an assignment of an active status to at least one of the symbol sequences; and a fourth code segment for causing the computer device to display polysemous symbols on an initial electronic screen overlay displayed on a display, wherein polysemous symbols, included within at least one symbol sequence assigned an active status, are selectable.

BRIEF DESCRIPTION OF THE DRAWINGS

FIG. 3 is a flow diagram illustrating an example embodiment of a method of scrolling through a list of entries in an interactive dictionary database;

FIG. 7 illustrates an example embodiment of an interactive dictionary database;

Figure 1:
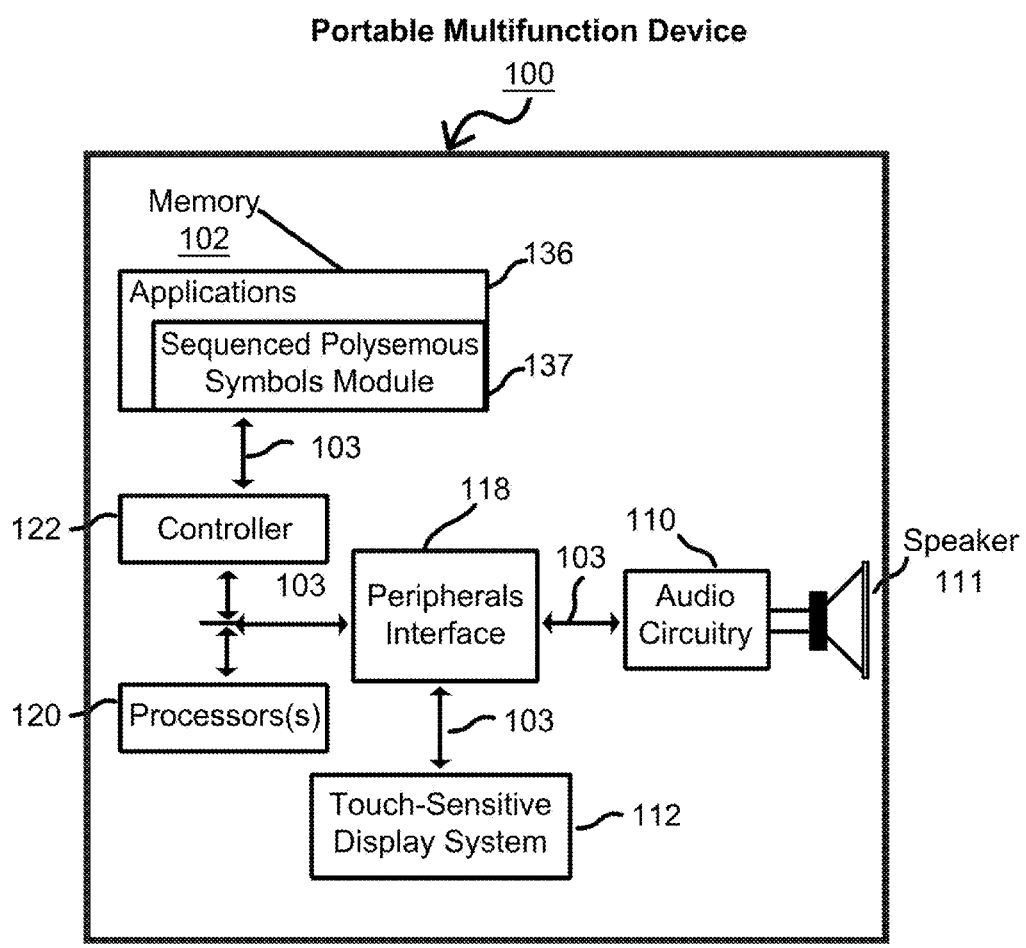
FIG. 1 is a block diagram illustrating components of an example portable multifunction device with a touch-sensitive display.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods. Although the processes describe the operations as sequential processes, many of the operations may be performed in parallel, concurrently or simultaneously. In addition, the order of operations may be re-arranged. The processes may be terminated when their operations are completed, but may also have additional steps not included. The processes may correspond to methods, functions, procedures, subroutines, subprograms, etc.

Methods discussed below may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Embodiments of a portable multifunction device, user interfaces for such devices, and associated processes for using such devices are described herein. In some embodiments, the portable multifunction device is a portable communications device such as a mobile telephone that also contains other functions, such as PDA and/or music player functions. It should be noted that the portable multifunction device described hereafter is an example of a device capable of performing the methodology provided in the present application and discussed in detail hereafter, and that the methodologies of the embodiments of the present application can be performed on the hereafter discussed portable multifunction device, but are not necessarily limited thereto.

The portable multifunction device may support a variety of application programs or applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the portable multifunction device may use at least one common physical user-interface device, such as the touch screen. One or more functions of the touch screen as well as corresponding information displayed on the portable multifunction device may be adjusted and/or varied from one application to the next and/or within a respective application. In this way, a common physical architecture (such as the touch screen) of the portable multifunction device may support the variety of applications with user interfaces that are intuitive and transparent.

The user interfaces may include one or more soft keyboard embodiments. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

FIG. 1 is a block diagram illustrating an example embodiment of a portable multifunction device 100 with a touch-sensitive display 112. The touch-sensitive display 112 is sometimes referred to herein as a "touch screen", "touch panel" "integrated input and display device", or "display system 112" for convenience. The portable multifunction device 100 may include a memory 102 (which may include one or more computer readable storage mediums for example), a memory controller 122, one or more computer processing units (CPU's, sometimes referred to herein as a "processor" or "controller" for convenience) 120. These components may communicate over one or more communication buses or signal lines 103.

It should be appreciated that the portable multifunction device 100 is only one example of a portable multifunction device, and that the portable multifunction device supporting various embodiments of the present application described hereafter may have more or fewer components than shown, may combine two or more components, or a may have a different configuration or arrangement of the components, etc.

The touch-sensitive display system 112 provides an input interface and an output interface between the portable multifunction device 100 and a user (hence the previous reference to integrated input and display device). The touch-sensitive display system 112 displays visual output to the user. The visual output may include for example, graphics, text, icons, video, and any combination thereof (collectively termed "graphics"). Additional outputs can be that of, for example, a printer (not shown), an audible output via a speaker 111 and audio circuitry 110, and/or other output devices. Peripheral interfaces 118 can be included between the processor(s) 120/ controller 122 and the output devices (touch-sensitive display system 112, and audio circuitry 110/speaker 111).

The touch screen in the touch-sensitive display system 112 may use LCD (liquid crystal display) technology, or LPD (light emitting polymer display) technology, although other display technologies may be used in the embodiments of the invention as well, and is not limited as such.

In some embodiments, in addition to the touch screen in the touch-sensitive display system 112, the portable multifunction device 100 may include a touchpad (not shown) for activating or deactivating particular functions. In some embodiments, the touchpad may be a touch-sensitive area of the device that, unlike the touch screen, does not display visual output. The touchpad may be a touch-sensitive surface that is separate from the touch screen in the touch-sensitive display system 112 or an extension of the touch-sensitive surface formed by the touch screen. Further, other types of known input devices (keyboard, mouse, microphone, etc.) and/or output devices (speaker, printer, etc.) may also be integrated therein/connected thereto.

Application programs 136 of embodiments of the present application, utilizing sequenced polysemous symbols to access messages (sequenced polysemous symbols module 137), can also be stored in memory 102. Such application programs 136 of various embodiments of the present application, as will be discussed hereafter can be implemented on the portable multifunction device 100 and/or can implement the methods discussed above and hereafter.

Figure 2:
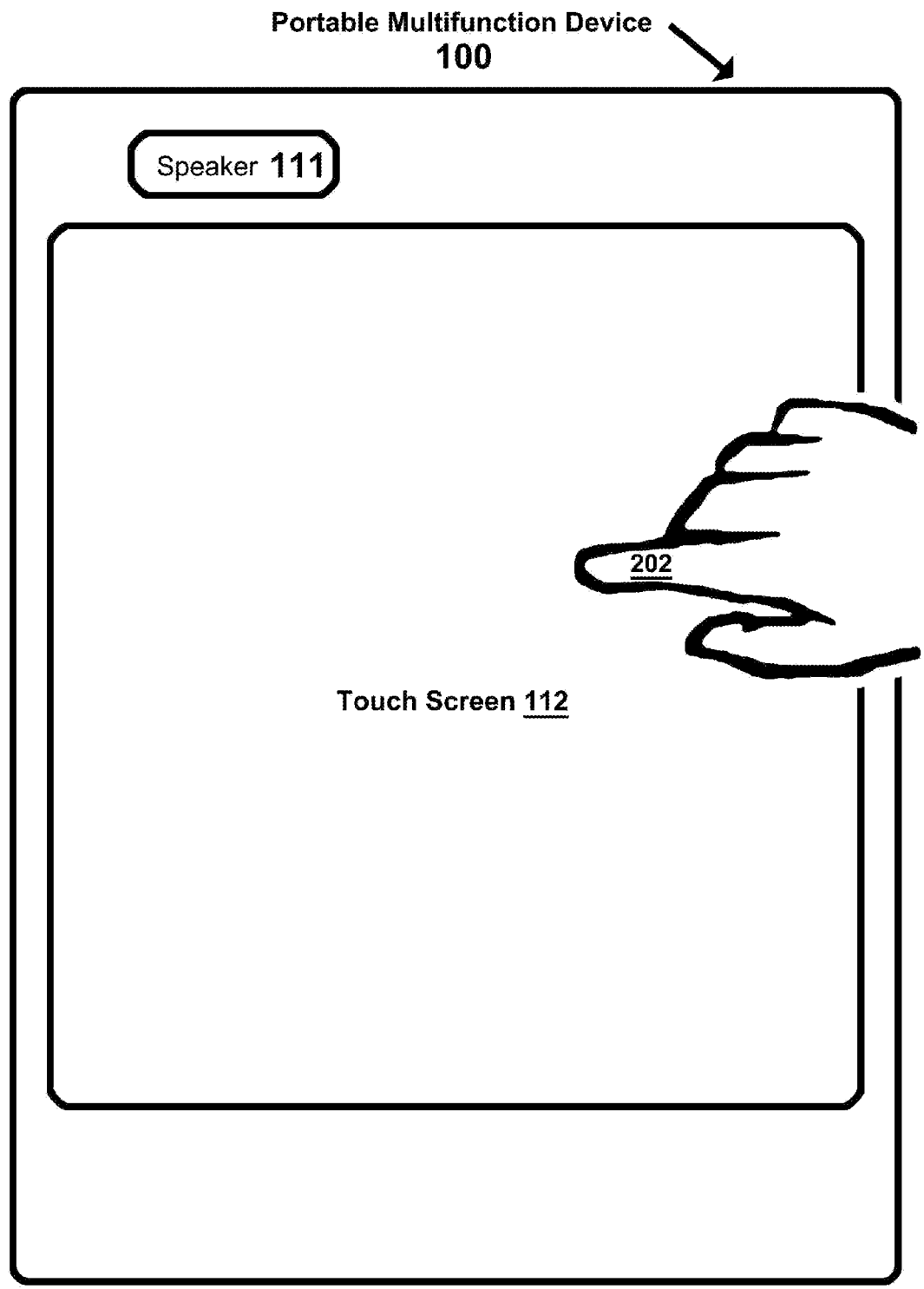
FIG. 2 illustrates an example portable multifunction device having a touch sensitive display.

FIG. 2 illustrates a portable multifunction device 100 having a touch screen 112 in accordance with some embodiments. The touch screen 112 may display one or more graphics. These graphics can include symbols, icons, text, a virtual keyboard with virtual keys, etc., such as those described in the embodiments hereafter. In an embodiment, as well as others described below, a user may select one or more of the graphics by making contact or touching the graphics, for example, with one or more fingers 202 (not drawn to scale in the figure).

FIG. 3 is a flow diagram illustrating a method 300 of scrolling through a list in accordance with some embodiments. The presence of an object is detected on or near a touch screen display of a portable multifunction device 302. In some embodiments, the object is a finger. In response to detecting the presence, a list of items displayed on the touch screen display. Movement of the detected object may then trigger the multifunction device to scroll through the list of available items in a first direction 304. In some embodiments, the scrollable list is a list of available entries in an interactive dictionary database 306. In some embodiments, the list is a complete list of a plurality of entries in an interactive dictionary database, which may be organized alphabetically. In some other embodiments, the list is a selected subset of a plurality of entries in an interactive dictionary database, which may be organized alphabetically. In some embodiments, the first direction is a vertical direction; in some other embodiments, the first direction is a horizontal direction.

Scrolling the list in the first direction while the object is still detected on or near the touch screen display may continue at least until a terminus of the list is reached. The scrolling process 300 may be re-initiated upon subsequent detection of another movement of an object on or near the touch screen display 302. When the scrolling process 300 is re-initiated, the list may be scrolled in the first direction again, or in the opposite direction.

If the list of entries fills more than the allotted screen area, the user may scroll through the items using vertically upward and/or vertically downward swipe gestures on the touch screen display. A user performs a vertically downward swipe gesture to scroll toward the top of the list, or a vertically upward swipe gesture to scroll toward the bottom of the list. The vertically downward gesture, which may be a finger gesture, corresponds to the movement of an object on or near the touch screen that is detected in operation 302 of process 300. The vertically downward gesture need not be exactly vertical; a gesture within a predetermined angle of being perfectly vertical is sufficient and results in vertical scrolling.

In one embodiment an item from the scrollable list may be selected by a finger tap on that item.

The scrollable list of entries may be a list of entries in the interactive dictionary database 306. In some embodiments not all elements of each entry in the interactive dictionary database may be displayed. For example, in some embodiments, the scrollable list may display the term of each entry in the interactive dictionary database, where the term includes a previously stored message of at least one of a word, sentence, phoneme, message, letter, morpheme, command and phrase. There may also be a definition associated with each entry in the interactive dictionary database, which may be displayed when the term is selected (e.g., triggered by a finger tap). The definition corresponding with a selected term may include at least one of a polysemous symbol sequence that may be triggered to produce the corresponding term, a rationale explaining the association between the corresponding term and the polysemous symbol sequence, an indicator of the entry's active or inactive status, and a frequency counter.

It should be noted that the apparatus described above with reference to FIGS. 1, 2 3 references a general description of hardware for an apparatus described hereafter regarding embodiments of the present application, as well as a general description of hardware for an apparatus to implement the methods and programs described below regarding embodiments of the invention.

Application programs of embodiments of the present application described hereafter, utilizing sequenced polysemous symbols to access stored messages, can also be stored in memory 102. Such application programs of various embodiments of the present application as will be discussed hereafter can be implemented on the portable multifunction device 100 discussed above.

At least one embodiment of the present invention is directed towards an application program utilizing sequenced polysemous symbols to access stored messages, on tablet devices such as the portable multifunction device 100 including but not limited to iPADs and Android devices, for example, as well as other computer devices with at least one processor 120, memory 102, integrated input and display device or touch screen display 112, etc. Thus, it should be noted that while hardware relating to the portable multifunction device 100 is described above for implementing the application programs of embodiments of the present application described hereafter in an example manner, the embodiments of the present application are not limited to the portable multifunction device 100 described above and can be implemented on various portable and non-portable computer devices including at least one processor, memory, integrated input and display device, etc.

For example, at least one embodiment of the present invention is directed towards an application program utilizing sequenced polysemous symbols to access stored messages on smaller portable smart phone devices such as iPhone devices, for example.

At least one embodiment of the present invention is directed towards an apparatus, computer readable medium, method, article of manufacture and/or an application program utilizing sequenced polysemous symbols to access stored messages on computer devices with touch screen interfaces, as well as other computer devices with at least one processor, memory, touch screen interface, etc.

At least one embodiment of the present invention is directed towards an apparatus, computer readable medium, method, article of manufacture and/or an application program utilizing sequenced polysemous symbols to access stored messages with an elegantly structured (internally consistent) database that can be easily and efficiently adapted to establish compatibility with a plurality of operating systems and devices. For example, an embodiment of the present invention may include an application program such as an Sqlite (for example) or other database program that is natively supported by a plurality of software platforms, including mutual compatibility across different platforms.

Figure 4A:
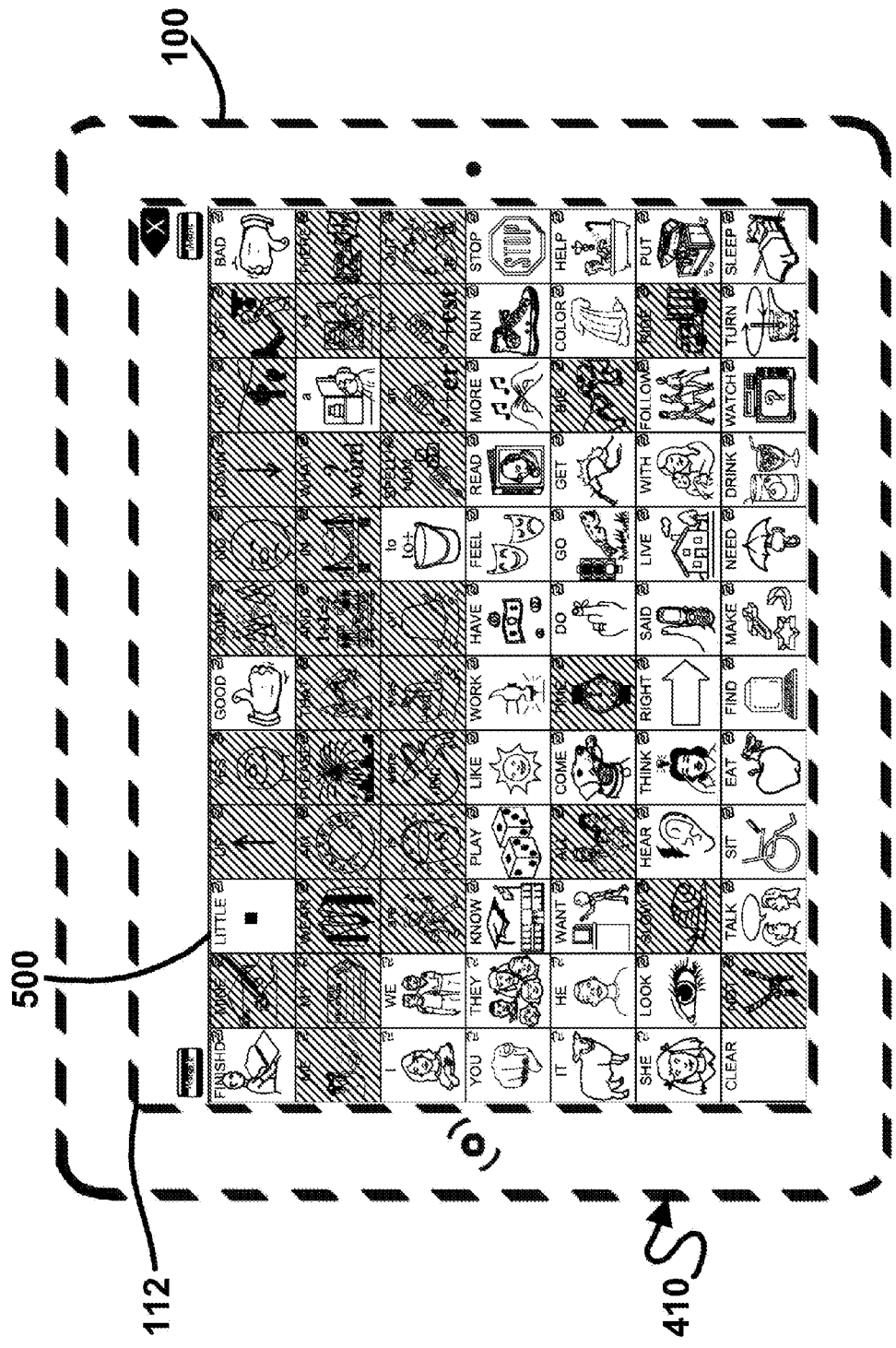
FIG. 4A illustrates an example embodiment of the application program of an embodiment of the present invention running on a portable multifunction device which is a tablet type consumer computer device, including a touch sensitive display.

FIG. 4A illustrates an example embodiment of the application program of an example embodiment of the present invention running on a portable multifunction device 100 which is a tablet type consumer computer device 410, including a touch sensitive display 112. The touch sensitive display 112 includes a plurality of graphic symbols arranged in an initial or first level electronic screen overlay 500. Again, the illustrated structure of FIG. 4A is that of an example embodiment and the embodiments of the present application should not be limited to such a portable multifunction device 100, or even to portable devices.

Figure 4B:
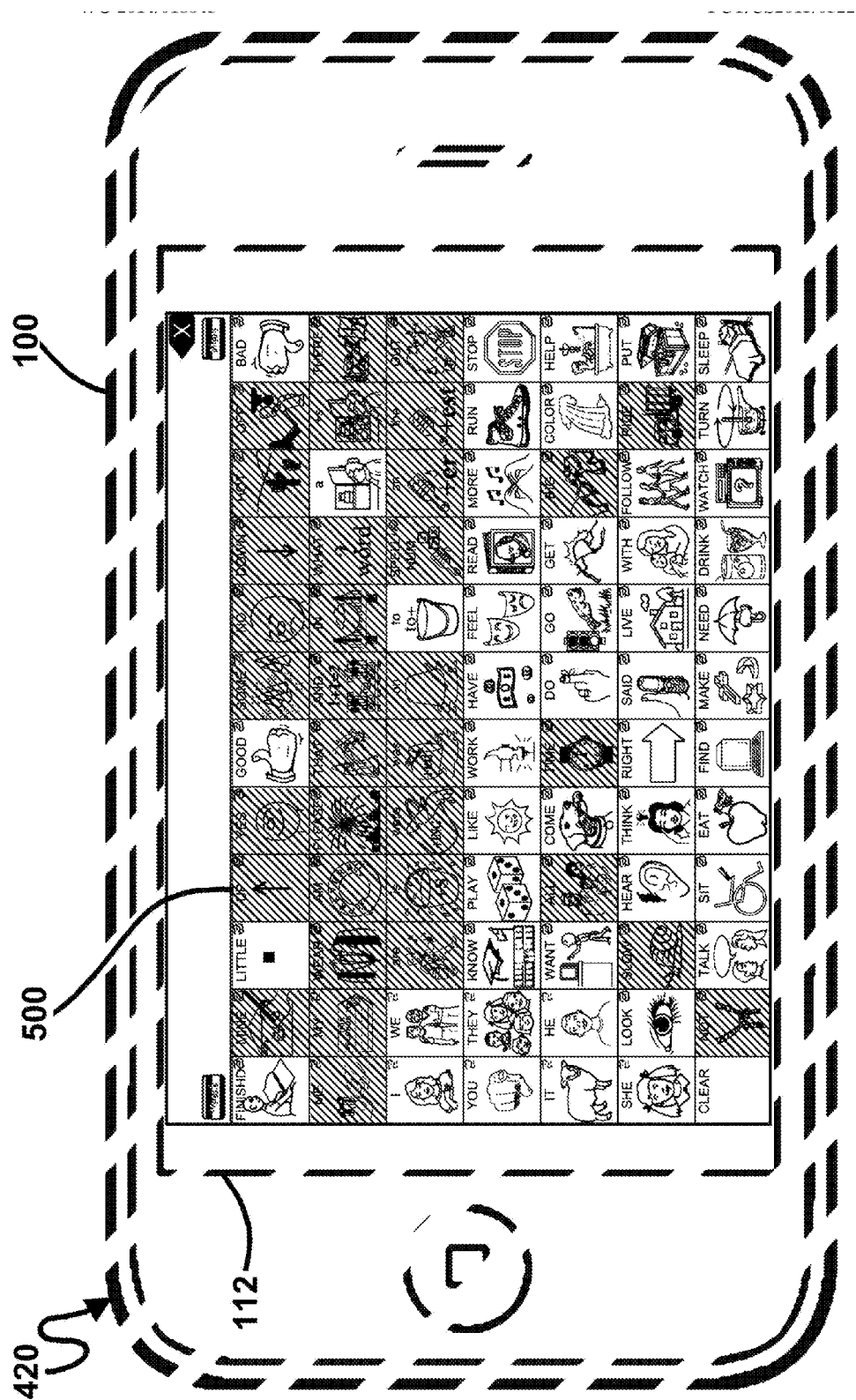
FIG. 4B illustrates an example embodiment of the application program of an embodiment of the present invention running on a portable multifunction device which is a smart phone type consumer device, including a touch sensitive display.

FIG. 4B illustrates an example embodiment of the application program of an example embodiment of the present invention running on a portable multifunction device 100 which is a smart phone type consumer device 420, including a touch sensitive display 112. The touch sensitive display 112 includes a plurality of graphic symbols arranged in an initial or first level electronic screen overlay 500. Again, the illustrated structure of FIG. 4B is that of an example embodiment and the embodiments of the present application should not be limited to such a portable multifunction device 100, or even to portable devices.

Note that FIGS. 4A and 4B are merely non-limiting examples of portable multifunction devices 100 including a graphical touch sensitive display 112 which are encompassed by the embodiments of the present application, used to illustrate a relationship between symbols arranged on an electronic screen overlay 500 and the portable multifunction devices 100 including a graphical touch sensitive display 112. It should be understood that the embodiments of the present application are applicable to any portable or even semi or non-portable multifunction devices including a graphical touch sensitive display capable of displaying electronic screen overlays such as those shown in FIGS. 4A and 4B.

At least one embodiment of the present application is directed towards an interactive dictionary database that may be fully integrated with an application program containing a plurality of polysemous symbol sequences, each of which may be triggered to produce a corresponding previously stored message of at least one of a letter, word, morpheme, phrase, phoneme, sentence, full name, letter, number, plural word message, function, and command being stored in a memory in such a way that:

the interactive dictionary database may be searched to identify at least one polysemous symbol sequence associated with a given previously stored message of at least one of a letter, word, morpheme, phrase, phoneme, sentence, full name, letter, number, plural word message, function, and command; and a rationale for that association, individual polysemous symbol sequences may be independently configured to an active or inactive status, and each entry in the interactive dictionary database may be associated with a frequency counter that automatically records the number of times the corresponding polysemous symbol sequence is triggered to produce a given previously stored message of at least one of a letter, word, morpheme, phrase, phoneme, sentence, full name, letter, number, plural word message, function, and command; and data from these frequency counters may be used to help automatically expand the range of active polysemous symbol sequences.

Embodiments of a sequenced polysemous symbol system using sequentially linked electronic screen overlays are described herein in such a way that each polysemous symbol sequence is fully integrated with an entry in an embodiment of an interactive dictionary database. These embodiments are non-limiting, in that other sequenced polysemous symbol systems that do not utilize sequentially linked electronic screen overlays may also be integrated with entries in an interactive dictionary database. At least one embodiment of the present invention includes a plurality of linked electronic screen overlays, each of which displays a virtual keyboard with a plurality of virtual key locations that may include a symbol, such as a relatively centrally disposed symbol for example.

At least one embodiment of the present invention includes a plurality of linked electronic screen overlays, each of which displays a virtual keyboard, as described above, where a configuration of the virtual key locations of the virtual keyboard may be held constant across the plurality of electronic screen overlays.

At least one embodiment of the present invention includes a plurality of linked electronic screen overlays, as described above, all of which may occupy the same region of space on a graphic display when they are displayed so that only one overlay may be displayed for the operator at any given moment.

At least one embodiment of the present invention includes an apparatus, method, computer readable medium and/or article of manufacture displaying a plurality of polysemous symbols, each of which may be relatively centrally disposed on at least one location of the virtual keyboard of a subset of one or more of a plurality of linked electronic screen overlays, as described above.

At least one embodiment of the present invention includes an apparatus method, computer readable medium and/or article of manufacture displaying a plurality of virtual key locations, as described above, each of which may include a corresponding polysemous symbol and a corresponding embedded link to retrieve and display an electronic screen overlay that differs from the electronic screen overlay that is currently displayed for the operator. As such, the electronic screen overlay that is displayed for the operator may change when a key location including a polysemous symbol and an embedded link is triggered or selected. Although key locations and/or polysemous symbols may be included on a plurality of linked electronic screen overlays, the embedded link that corresponds to a key location and/or symbol on one electronic screen overlay may be unique and differ from an embedded link that corresponds to the same key location and/or symbol on other electronic screen overlays. Note that the same symbol can be included on multiple electronic screen overlays and may exist at the same key location, for example.

At least one embodiment of the present invention provides an apparatus, method, computer readable medium and/or article of manufacture including a plurality of polysemous symbols, each of which may be relatively centrally disposed on a location of the virtual keyboard of at least one of a plurality of linked electronic screen overlays, and which may produce the speech and/or text output of a corresponding previously stored message when triggered. Although each polysemous symbol may be included on a plurality of linked electronic screen overlays, the previously stored message that corresponds to a symbol on one electronic screen overlay (when sequenced with other symbols) may be unique and differ from the previously stored message that corresponds to the same symbol on other electronic screen overlays (when sequenced with other symbols). Note that the same symbol can be included on multiple electronic screen overlays and may exist at the same key location, for example. Each of these polysemous symbol sequences that may be triggered to produce a previously stored message may be integrated with a corresponding entry in an interactive dictionary database. In at least one embodiment of an apparatus, method, computer readable medium and/or article of manufacture of the present invention, an operator may trigger, via selection thereof, a sequence of two polysemous symbols that are located on two sequentially displayed linked electronic screen overlays to produce a speech or text output of a previously stored message using the following process, for example.

An initial electronic screen overlay 500, such as that shown in FIGS. 4A and 4B for example, is shown on the touch sensitive display 112 of the portable multifunction device 100; the initial electronic screen overlay 500 including a grid of symbols for example, stored in a database in memory 102 for example, and visually displayed to the user on an LCD display, for example, of the touch sensitive display 112. The initial electronic screen overlay 500 may be referred to as the 'CORE HOME overlay,' for example.

Polysemous and non-polysemous symbols are initially provided for selection on the initial electronic screen overlay 500 or 'CORE HOME overlay', displayed with symbols for selection on touch sensitive display 112, for example. Thereafter, triggering of an initial polysemous symbol of the sequence on the initial or first level electronic screen overlay then may begin upon user selection (via selection using a touch panel key or other form of input, for example on the touch sensitive display 112), as described above, where the initially selected polysemous symbol may include an embedded link to retrieve (upon the processor 120, for example, receiving an indication of selection of a key location corresponding to the symbol) and trigger display of a second level electronic screen overlay (the display being displayed on touch sensitive display 112, for example, in place of the first level electronic screen overlay, for example).

The aforementioned may occur, for example, by the processor 120 receiving an indication of user selection by determining the XY position of the activation on the touch sensitive display 112 to identify the position of the initially selected polysemous symbol within the CORE HOME overlay. This selected polysemous symbol may be one of a plurality of selectable polysemous symbols of the 'CORE HOME overlay' stored in association with, and marked in the database in memory 102 for example, a pointer to a second level electronic screen overlay. In response to the processor 120 determining selection of the initially selected polysemous symbol, the processor 120 may then control the touch sensitive display 112 to display the second level electronic screen overlay indicated by the pointer, the second level electronic screen overlay being the electronic screen overlay associated via a pointer with the selected polysemous symbol and being different from the initial electronic screen overlay or 'CORE HOME overlay'. The contents of this second level electronic screen overlay can further be directed by the processor 120 to replace the content of the CORE HOME overlay on the touch sensitive display 112 from which the initial polysemous symbol was selected.

Thereafter, the processor 120 may receive an indication of selection of a terminal (final) polysemous symbol of a sequence, from the currently displayed second level electronic screen overlay for example (via selection using a touch panel key or some other form of input, for example), as described above, where the selected final polysemous symbol triggers (upon the processor 120, for example, receiving an indication of selection of a key location corresponding to the terminal symbol) output of a previously stored message (word, phrase, morpheme or message) corresponding to the symbol sequence including the selected first and terminal symbols (displayed on touch sensitive display 112, output via a speaker, etc.). Thus, a polysemous or non-polysemous symbol on the second level electronic screen overlay can serve as a terminal symbol. In this case, detection of selection of the symbol, through that described above, may cause the processor 120 to access a message (word, phrase, morpheme, message, etc.) stored in memory 102 and linked in the database to a symbol sequence including the initially selected symbol and the selected symbol provided on the displayed second electronic screen overlay. The message may contain a text string which can be shown on the LCD display of the touch sensitive display 120, spoken via a speech synthesizer, printed, etc., or otherwise output. Further, each of these previously stored messages and each corresponding polysemous symbol sequence may be integrated with a corresponding entry in an interactive dictionary database 700.

Selection of the terminal polysemous symbol of the two symbol sequence that is on the second level electronic screen overlay may further trigger display of the first level electronic screen overlay or 'CORE HOME overlay' (in place of the second level electronic screen overlay for example and in addition to the outputting of the stored message, e.g. subsequent thereto or simultaneous therewith). This may occur subsequent to the symbol being selected so that the operator may thereafter begin executing a new function, such as selection of a next sequence of polysemous symbols, for example. This automatic function may allow the system to act as a continuous input device that does not require additional keystrokes to return to the first level electronic screen overlay after completion of a valid two symbol sequence. In addition to acting upon linked text string as described above, the selection of a terminal symbol may also trigger the contents of the second level electronic screen display to be replaced by the contents of the CORE HOME overlay. Again, similar to that discussed previously, this can occur via storage of an embedded link in association with the terminal symbol in the database of memory 102 for example.

Note that all key locations on the any level electronic screen overlay need not correspond solely to symbols including an embedded link, let alone polysemous symbols including an embedded link. Note also that key locations corresponding to a symbol including an embedded link on any level electronic screen overlay may be differentiated from key locations corresponding a symbol which does not include an embedded link, by including a common displayable additional symbol for all key locations corresponding to symbols which include an embedded link, for example (and/or in any other way, such as by including differentiated lettering on the corresponding key location, for example).

In at least one embodiment of an apparatus, method, computer readable medium and/or article of manufacture of the present invention, an operator may trigger a sequence of three polysemous symbols that are located on three sequentially displayed linked electronic screen overlays to produce a speech or text output of a previously stored message using the following process, for example.

Polysemous and non-polysemous symbols are initially provided for selection on the initial electronic screen overlay 500 or 'CORE HOME overlay', displayed with symbols for selection on touch sensitive display 112, for example. Thereafter, triggering of an initial polysemous symbol of the sequence on the initial or first level electronic screen overlay then may begin upon user selection (via selection using a touch panel key or other form of input, for example on the touch sensitive display 112), as described above, where the initially selected polysemous symbol may include an embedded link to retrieve (upon the processor 120, for example, receiving an indication of selection of a key location corresponding to the symbol) and trigger display of a second level electronic screen overlay (the display being displayed on touch sensitive display 112, for example, in place of the first level electronic screen overlay, for example).

It can further include triggering an intermediate polysemous symbol of the same sequence (via selection of, and detection of selection by processor 120, a symbol of the displayed second level electronic screen overlay using a touch panel key or some other form of input on touch sensitive display 112, for example), as described above, where the selected intermediate polysemous symbol includes a corresponding embedded link stored in memory 102 and retrievable via processor 120 to trigger the processor 120 to control display of a third level electronic screen overlay on touch sensitive display 112. The aforementioned may be achieved by an initial electronic screen overlay being shown on the visual display of the touch sensitive display system 112; an electronic screen overlay being a grid of symbols, stored in a database in the memory 102 and visually displayed to the user on an LCD display of the touch sensitive display system 112, for example. The initial electronic screen overlay will be referred to as the 'CORE HOME overlay.'

Symbol activation may be detected by the processor 120 on the touchscreen of the touch sensitive display 112 or alternative input device. The processor 120 may then determine the XY position of the activation to identify the initial polysemous symbol within the CORE HOME overlay. This polysemous symbol may be marked in the database in memory 102 with a pointer to a second level electronic screen overlay. The contents of this second level electronic screen overlay may then be controlled by processor 120 to replace the content of the CORE HOME overlay from which the initial polysemous symbol was selected.

A second polysemous symbol can then be selected from the symbols of the second electronic screen overlay. Again, the processor 120 receives an indication of and determines the XY position of the activation to identify the second selected polysemous symbol within the second level electronic screen overlay. This polysemous symbol may be one marked in the database in memory 102 with a pointer to a third level electronic screen overlay. In response to the processor 120 determining selection of the second selected polysemous symbol, the processor 120 may then control the touch sensitive display 112 to display the third level electronic screen overlay indicated by the pointer, the third level electronic screen overlay being the electronic screen overlay associated via a pointer with the second selected polysemous symbol and being different from the second electronic screen overlay. The contents of this third level electronic screen overlay may replace the content of the second level electronic screen overlay from which the second polysemous symbol was selected.

Selection of a the terminal polysemous symbol of the sequence may then occur on the currently displayed third level electronic screen overlay (via selection using a touch panel key or some other form of input, for example), as described above, where the final polysemous symbol triggers (upon a processor, 120 for example, receiving an indication of detection of a key location corresponding to the terminal symbol) output of a previously stored message (word, phrase, morpheme or message) corresponding to the symbol sequence including the selected first, second and terminal symbols (displayed on touch sensitive display 112, output via a speaker, etc.).

Thus, as described above, a polysemous or non-polysemous symbol on the second level or third level electronic screen display can serve as a terminal symbol. In this case, detection of selection of the symbol, through that described above, may cause the processor 120 to access a message (word, phrase, morpheme or message) stored in memory 102 and linked in the database to a symbol sequence including the initially selected symbol, and the selected symbol provided on the displayed electronic screen overlay (and potentially an intermediate symbol as well). The message may contain a text string which can be shown on the LCD display of the touch sensitive display 120, spoken via a speech synthesizer, printed, etc., or otherwise output.

Selection of the terminal polysemous symbol of the three symbol sequence that is on the third level electronic screen overlay (or similarly the second level electronic screen overlay in a two symbol sequence) may further trigger display of the first level electronic screen overlay or 'CORE HOME overlay' (in place of the third level electronic screen overlay for example, or similarly the second level electronic screen overlay in a two symbol sequence) and in addition to the outputting of the stored message, e.g. subsequent thereto or simultaneous therewith). This may occur subsequent to the symbol being selected so that the operator may thereafter begin executing a new function, such as selection of a next sequence of polysemous symbols, for example. This automatic function may allow the system to act as a continuous input device that does not require additional keystrokes to return to the first level electronic screen overlay after completion of a valid three symbol sequence. In addition to acting upon linked text string as described above, the selection of a terminal symbol may also trigger the contents of the second level or third level electronic screen display to be replaced by the contents of the CORE HOME overlay. Again, similar to that discussed previously, this can occur via storage of an embedded link in association with the terminal symbol in the database of memory 102 for example.

Note that all key locations on the any level electronic screen overlay need not correspond solely to symbols including an embedded link, let alone polysemous symbols including an embedded link. Note also that key locations corresponding to a symbol including an embedded link on any level electronic screen overlay may be differentiated from key locations corresponding to a symbol which does not include an embedded link, by including a common additional symbol for all key locations corresponding to symbols which include an embedded link, for example (and/or in any other way, such as by including differentiated lettering on the corresponding key location, for example).

In at least one embodiment of an apparatus, method, computer readable medium and/or article of manufacture of the present invention, a pointer associated with each of a plurality of second level linked electronic screen overlays may store, in memory 102, the name of the polysemous symbol on the first level linked electronic screen overlay that can be triggered to retrieve and display the second level linked electronic screen overlay. Similarly, a pointer may be associated with each of a plurality of third level linked electronic screen overlays which stores, in memory 102, the names of the symbols on the first level linked electronic screen overlay and subsequent second level linked electronic screen overlay that can be triggered to retrieve and display the third level linked electronic screen overlay. There may also be a pointer that stores in memory 102 a name associated with the first level linked electronic overlay, "Core Home" for example. These pointers may automatically populate an overlay name field to create a unique name for each of the plurality of linked electronic screen overlays that corresponds to the symbol sequence used to retrieve and display that overlay, and may be accessed via processor 120 from memory 102.

At least one embodiment of the present invention includes an apparatus, method, computer readable medium and/or article of manufacture including a plurality of linked electronic screen overlays, as described above, where the virtual keys of the virtual keyboard on each electronic screen overlay may include one of a plurality of polysemous symbols, as described above, wherein the included corresponding polysemous symbols may vary across the plurality of electronic screen overlays, and may exist at the same key location, for example.

At least one embodiment of the present invention includes an apparatus, method, computer readable medium and/or article of manufacture including a plurality of linked electronic screen overlays, as described above, where a given polysemous symbol may be relatively centrally disposed on one or more locations of the virtual keyboard of one or more of the plurality of linked electronic screen overlays, and where the given polysemous symbol may be relatively centrally disposed in the same one or more locations on the virtual keyboards of all linked electronic screen overlays that include the symbol. In this way, the key locations of the given polysemous symbol may be held constant across the whole plurality of linked electronic screen overlays.

At least one embodiment of the present invention includes an apparatus, method, computer readable medium and/or article of manufacture including a plurality of polysemous symbols, as described above, each of which may be included on the virtual keyboards of a subset of a plurality of linked electronic screen overlays, as described above, where the key locations of each of the plurality of polysemous symbols may be held constant across the whole plurality of linked electronic screen overlays.

At least one embodiment of the present invention includes an apparatus, method, computer readable medium and/or article of manufacture including a first level electronic screen overlay or CORE HOME overlay, which may include all of a plurality of polysemous symbols, as described above.

At least one embodiment of the present invention includes an apparatus, method, computer readable medium and/or article of manufacture including a first level electronic screen overlay or CORE HOME overlay, which may include all of a plurality of polysemous symbols, as described above, where at least one of these polysemous symbols may include an embedded link to a second level electronic screen overlay.

At least one embodiment of the present invention includes an apparatus, method, computer readable medium and/or article of manufacture including a first level electronic screen overlay or CORE HOME overlay, which may include a plurality of polysemous symbols, as described above, and a plurality of symbols which, when triggering or activation is detected, can trigger production of a speech and/or text output of a corresponding previously stored message. Each of these symbols that may be triggered or activated to trigger production of a speech and/or text output of a corresponding previously stored message and each corresponding previously stored message may be integrated with a corresponding entry in an interactive dictionary database.

At least one embodiment of the present invention includes an apparatus, method, computer readable medium and/or article of manufacture including a plurality of second level electronic screen overlays, each of which may be accessed by triggering a link that is embeddedly connected or corresponded to a polysemous symbol and/or key location on the first level electronic screen overlay.

In at least one embodiment of the present invention, each second level electronic screen overlay can only be accessed by triggering or selecting one of the plurality of polysemous symbols on the first level electronic screen overlay.

At least one embodiment of the present invention includes an apparatus, method, computer readable medium and/or article of manufacture including a plurality of second level electronic screen overlays, as described above, each of which may include a subset of the plurality of polysemous symbols included on the first level electronic screen overlay.

At least one embodiment of the present invention includes an apparatus, method, computer readable medium and/or article of manufacture including a plurality of second level electronic screen overlays, as described above, each of which may include a subset of one or more keys which may be blank and which do not include any corresponding symbol which can be triggered by an operator (and thus at least temporarily inactive).

At least one embodiment of the present invention includes an apparatus, method, computer readable medium and/or article of manufacture including at least one key location and/or symbol on each of at least one of a plurality of second level electronic screen overlays, as described above, that includes and/or corresponds to an embedded link to the first level electronic screen overlay to return the user to the first level electronic screen overlay or CORE HOME overlay.

At least one embodiment of the present invention includes an apparatus, method, computer readable medium and/or article of manufacture including a plurality of second level electronic screen overlays, as described above, each of which may include at least one polysemous symbol that can be selected and thus triggered to produce the speech and/or text output of a corresponding previously stored message and that includes an embedded link to the first level electronic screen overlay or CORE HOME overlay, as described above. As such, the user may be returned to the CORE HOME overlay as a function of a continuous input system that eliminates the extra keystrokes necessary to change screens. The at least one sequence of two polysemous symbols, including the previously selected polysemous symbol on the initial electronic screen overlay and a second polysemous symbol on the currently displayed second level linked electronic screen overlay that can be selected as described and thus triggered to produce the speech and/or text output of a corresponding previously stored message, and the corresponding previously stored message may be integrated with at least one corresponding entry in an interactive dictionary database.

At least one embodiment of the present invention includes an apparatus, method, computer readable medium and/or article of manufacture including a plurality of second level electronic screen overlays, as described above, each of which may include at least one non-polysemous symbol that can be triggered to produce the speech and/or text output of a corresponding previously stored message and includes an embedded link to the first level electronic screen overlay or CORE HOME overlay, as described above. The at least one sequence of two symbols, including the previously selected polysemous symbol on the initial electronic screen overlay and a non-polysemous symbol on the currently displayed second level linked electronic screen overlays that can be selected as described and thus triggered to produce the speech and/or text output of a corresponding previously stored message and the corresponding previously stored message may be integrated with at least one corresponding entry in an interactive dictionary database.

At least one embodiment of the present invention includes an apparatus, method, computer readable medium and/or article of manufacture including a plurality of second level electronic screen overlays, as described above, each of which may include at least one polysemous symbol that includes an embedded link to a third level electronic screen overlay.

At least one embodiment of the present invention includes an apparatus, method, computer readable medium and/or article of manufacture including a plurality of second level electronic screen overlays, as described above, each of which may include at least one non-polysemous symbol that includes an embedded link to a third level electronic screen overlay. At least one embodiment of the present invention includes an apparatus, method, computer readable medium and/or article of manufacture including a plurality of third level electronic screen overlays that may be accessed by triggering a link that is embedded in a polysemous or non-polysemous symbol on one of the plurality of second level electronic screen overlays.

In at least one embodiment of the present invention, each third level electronic screen overlay can only be accessed by triggering, via a processor receiving an indication of selection thereof, one of the one or more polysemous or non-polysemous symbols on one of the plurality of second level electronic screen overlays. Given that a second level electronic screen overlay may only be accessed by triggering one of the plurality of polysemous symbols on the first level electronic screen overlay, there may be only one sequence of symbols on sequentially linked electronic screen overlays that can be used to access a specific third-level electronic screen overlay.

At least one embodiment of the present invention includes an apparatus, method, computer readable medium and/or article of manufacture including a plurality of third level electronic screen overlays, as described above, each of which may include a subset of one or more of a plurality of polysemous symbols.

At least one embodiment of the present invention includes an apparatus, method, computer readable medium and/or article of manufacture including a plurality of third level electronic screen overlays, as described above, each of which may include one or more non-polysemous symbols.

At least one embodiment of the present invention includes at least one symbol on each of a plurality of third level electronic screen overlays, as described above, that includes an embedded link to the first level electronic screen overlay or CORE HOME overlay, as described above.

At least one embodiment of the present invention includes an apparatus, method, computer readable medium and/or article of manufacture including a plurality of third level electronic screen overlays, as described above, each of which may include at least one polysemous or non-polysemous symbol that can be triggered to produce the speech and/or text output of a corresponding previously stored message and includes an embedded link to the first level electronic screen overlay or CORE HOME overlay, as described above.

The at least one sequence of three symbols, including the previously selected polysemous symbol on the initial electronic screen overlay, the previously selected polysemous or non-polysemous symbol on the previously displayed second level linked electronic screen overlay, and a polysemous or non-polysemous symbol on the currently displayed third level linked electronic screen overlay that can be selected as described and thus triggered to produce the speech and/or text output of a corresponding previously stored message and the corresponding previously stored message may be integrated with at least one corresponding entry in an interactive dictionary database.

In at least one embodiment of an apparatus, method, computer readable medium and/or article of manufacture of the present invention, a unique name may be assigned to each of a plurality of sequentially linked electronic screen overlays such that the name assigned to each overlay reflects a sequence including one or more polysemous symbols on the sequentially linked electronic screen overlays that may be triggered in order to retrieve and display the specific electronic screen overlay. In this way, an operator who is reviewing the name of any of a plurality of linked electronic screen overlays can immediately identify the corresponding sequence including polysemous symbols on sequentially linked electronic screen overlays that may be triggered in order to retrieve and display the specific electronic screen overlay. Note that the name of the currently displayed electronic screen overlay may be displayed in a message window of the electronic screen overlay when one is working in an edit mode, for example.

In at least one embodiment of an apparatus, method, computer readable medium and/or article of manufacture of the present invention, a unique name may be assigned to each of a plurality of sequentially linked electronic screen overlays, where the first level linked electronic screen overlay may be assigned a default name, "core home", for example.

In at least one embodiment of an apparatus, method, computer readable medium and/or article of manufacture of the present invention, a unique name may be assigned to each of a plurality of sequentially linked electronic screen overlays, where each of a plurality of second level linked electronic screen overlays may be assigned a name that includes the name of the polysemous symbol that may be triggered on the first level electronic screen overlay to retrieve and display the specific second level linked electronic screen overlay. In at least one embodiment of an apparatus, method, computer readable medium and/or article of manufacture of the present invention, a unique name may be assigned to each of a plurality of sequentially linked electronic screen overlays, where each of a plurality of third level linked electronic screen overlays may be assigned a name that includes the name of the polysemous symbol that may be triggered on the first level electronic screen overlay and the name of the polysemous or non-polysemous symbol that must be triggered on a second-level electronic screen overlay to retrieve and display the specific third level linked electronic screen overlay.

Figure 5A:
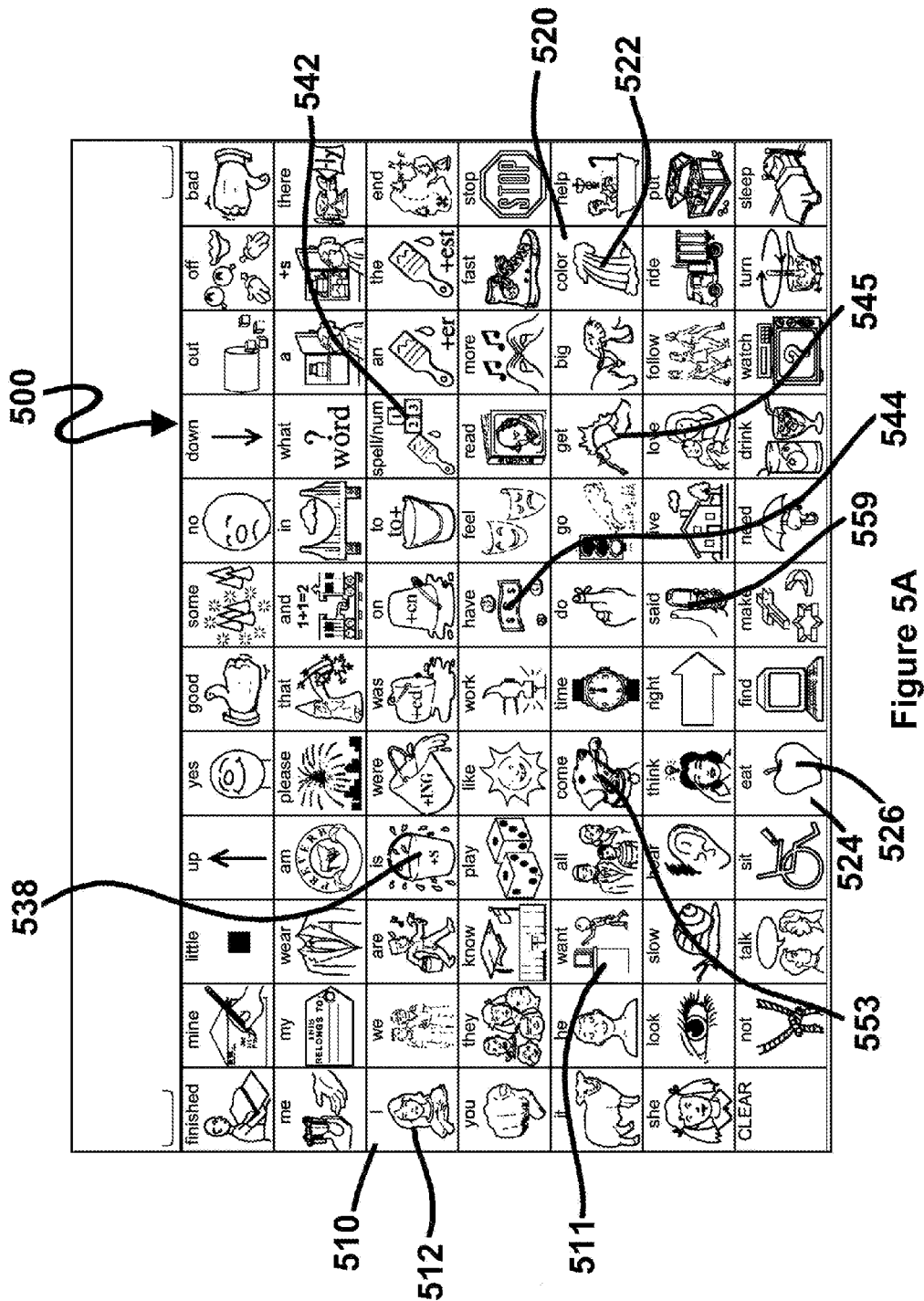
FIGS. 5A-D illustrate example embodiments of electronic screen overlays.
Figure 5B:
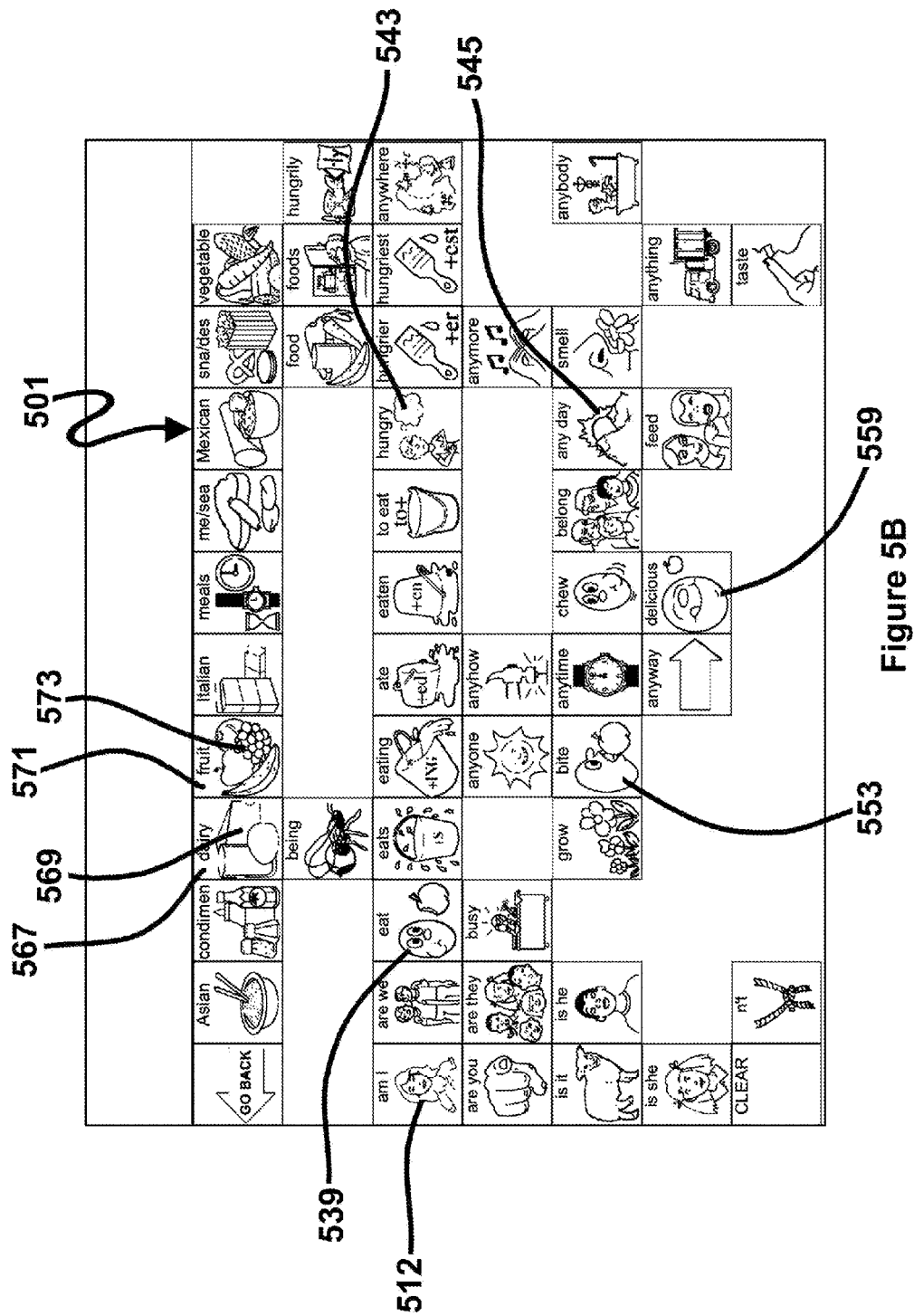
Figure 5C:
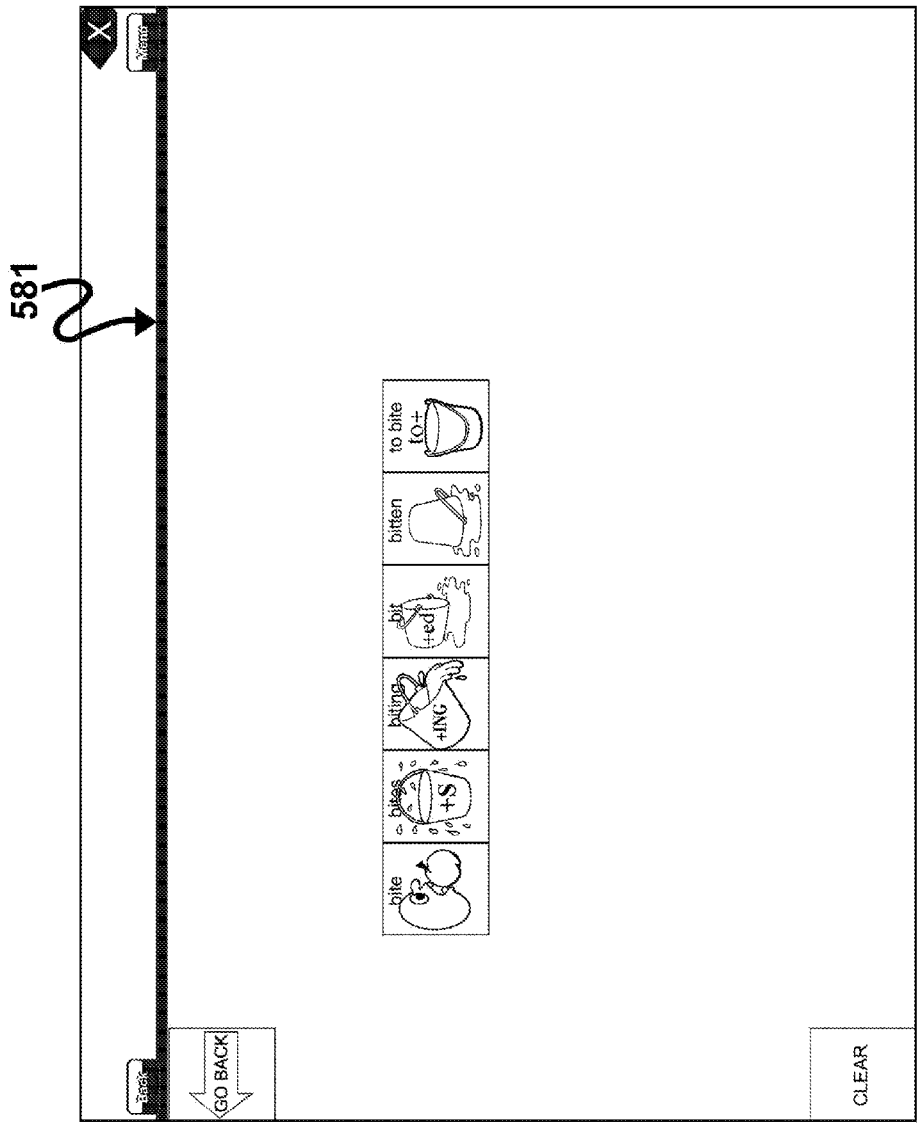

FIGS. 5A-C show a series of three sequentially linked electronic screen overlays for display on a touch sensitive display 112 of a portable multifunctional device 100 for example, from an embodiment of the present invention with 84 locations on the virtual keyboard on each of a plurality of linked electronic screen overlays. Each of the plurality of previously stored messages in this embodiment, and each of the corresponding polysemous symbol sequences may be integrated with a corresponding entry in the interactive dictionary database 700. Each key location on each electronic screen overlay may include a relatively centrally disposed polysemous or non-polysemous symbol. FIG. 5A is the first level electronic screen overlay 500. FIG. 5B is a second level electronic screen overlay 501, which may be retrieved and displayed when an operator triggers a key location or virtual key on the first level electronic screen overlay 500 of FIG. 5A that includes a polysemous symbol that functions as an initial symbol in a plurality of polysemous symbol sequences. FIG. 5C is a third level electronic screen overlay 581, which may be retrieved and displayed when an operator triggers a sequence of two symbols, including selection of a key on the first level electronic screen overlay 500 of FIG. 5A that includes a polysemous symbol that functions as an initial symbol in a plurality of polysemous symbol sequences, and including selection of a key on the second level electronic screen overlay 501 of FIG. 5B that includes a polysemous symbol that functions as an intermediate symbol in a plurality of polysemous symbol sequences.

FIG. 5A shows a first level or initial electronic screen overlay 500, named the "CORE HOME" overlay for example with an 84 key location virtual keyboard and a plurality of polysemous symbols associated with various virtual keys or key locations of the virtual keyboard. On the first level electronic screen overlay 500 of FIG. 5A, the key 510 corresponding to the polysemous "I" symbol 512 may be triggered as the initial symbol in a plurality of polysemous symbol sequences. When the "I" symbol 512 (associated with key 510 located in Row 3, Column 1 of the virtual keyboard first level electronic screen overlay 500 of FIG. 5A) is triggered, a second level electronic screen overlay 551 named the "I" overlay for example, may be retrieved and displayed, and the operator may trigger one of a plurality of keys corresponding to second polysemous symbols to continue producing one of a plurality of previously stored messages, such as "I," "me", "I am", or "I can." Each of these previously stored messages and each corresponding polysemous symbol sequence may be integrated with a corresponding entry in the interactive dictionary database 700.

When the key 520 corresponding to the RAINBOW symbol 522 (associated with key 520 located in Row 5, Column 11 of the virtual keyboard first level electronic screen overlay 500 of FIG. 5A) is triggered, a second level electronic screen overlay named the "RAINBOW" overlay for example may be retrieved and displayed, and the operator may trigger one of a plurality of second polysemous symbols to continue producing one of a plurality of previously stored messages, such as "color," "coloring," "pretty," "paint," "red," "blue," and "green." Each of these previously stored messages and each corresponding polysemous symbol sequence may be integrated with a corresponding in the interactive dictionary database 700.

When the key 524 corresponding to the APPLE symbol 526 (Row 7, Column 5 of the virtual keyboard first level electronic screen overlay 500 of FIG. 5A) is triggered, the second level electronic screen overlay, named the "APPLE" overlay for example may be retrieved and displayed, and the operator may trigger one of a plurality of second polysemous symbols to continue producing one of a plurality of previously stored messages, such as "eat," "ate," "bite," "hungry," "am I," or "anyone." When the APPLE symbol (Row 7, Column 5) is triggered and the second level electronic screen overlay, named the "APPLE" overlay has been retrieved and displayed, the operator may also trigger one of a subset of second symbols that are non-polysemous to produce one of a plurality of previously stored messages that may be a fringe vocabulary word, "apple," "banana," or "burrito," for example. Each of these previously stored messages and each corresponding polysemous symbol sequence may be integrated with a corresponding in the interactive dictionary database 700.

FIG. 5B shows a second level linked electronic screen overlay 501 with an 84 location virtual keyboard similar to the 84 location virtual keyboard of the first level electronic screen overlay 500 in FIG. 5A. This overlay 501, named the "APPLE" overlay for example, may be retrieved and displayed when the APPLE symbol 526 on the first level linked electronic screen overlay 500 is triggered. Symbols on this overlay (some of which are the same as those in the same key locations as FIG. 5A and some of which are embellished symbols) may be selected as the second symbol in polysemous symbol sequences that begin with the APPLE symbol 526, which is triggered on the first level electronic screen overlay 500.

The I symbol 512 (Row 3, Column 1), VERB symbol 539, embellished from symbol 538 of FIG. 5A (Row 3, Column 3), ADJECTIVE symbol 543, embellished from symbol 542 of FIG. 5A (Row 3, Column 9), and MOUNTAIN symbol 545 (Row 5, Column 9) on the second level linked electronic screen overlay 501 in FIG. 5B may be triggered as the terminal symbol in sequences of two polysemous symbols beginning with the APPLE symbol 526. When a key corresponding to one of these symbols is triggered, the corresponding previously stored message (corresponding to the two symbol sequence) is produced and the first level linked electronic overlay 500 is retrieved and displayed once again. Each of these previously stored messages and each corresponding sequence of two polysemous symbols may be integrated with a corresponding entry in the interactive dictionary database 700.

The (embellished) DOG symbol 553 on the second level linked electronic screen overlay 501 in FIG. 5B may be triggered as the intermediate symbol in at least one sequence of three polysemous symbols beginning with the APPLE 526 and DOG 553 symbols. When the key corresponding to this (embellished) DOG symbol 553 is triggered, the third level linked electronic screen overlay 581 of FIG. 5C, named the "APPLE DOG" overlay for example, may be retrieved and displayed. The (embellished) DOG symbol 553 on the second level linked electronic overlay 501 in FIG. 5B may be used as an intermediate symbol in polysemous symbol sequences for producing different forms of the verb "bite." Each form of the verb "bite" may correspond to a different previously stored message and a different sequence of three polysemous symbols. Therefore, each form of the verb "bite" may be integrated with a different entry in the interactive dictionary database 700.

The (embellished) PHONE symbol 559 (Row 6, Column 7) on the second level linked electronic screen overlay 501 in FIG. 5B may be triggered as the intermediate symbol in at least one sequence of three polysemous symbols beginning with the APPLE 526 and PHONE 559 symbols. When this symbol is triggered, a third level linked electronic screen overlay, named the "APPLE PHONE" overlay may be retrieved and displayed. The PHONE symbol 559 on the second level linked electronic overlay 501 in FIG. 5B may be used as an intermediate symbol in polysemous symbol sequences for producing different forms of the adjective "delicious." Each form of the adjective "delicious" may correspond to a different previously stored message and a different sequence of three polysemous symbols. Therefore, each form of the adjective "delicious" may be integrated with a different entry in the interactive dictionary database 700.

The key 567 including the DAIRY symbol 569 (Row 1, Column 4) and the key 571 including the FRUIT symbol 573 (Row 1, Column 5) on the second level linked electronic screen overlay 501 in FIG. 5B are non-polysemous symbols that are each associated with a semantically related category of fringe words. The DAIRY symbol 569 on the second level linked electronic screen overlay 501 in FIG. 5B may function as an intermediate symbol in one or more sequences of symbols on sequentially linked electronic screen overlays beginning with the polysemous APPLE symbol 526 and the non-polysemous DAIRY symbol 569. When the DAIRY symbol 569 is triggered, a third level linked electronic screen overlay, named the "APPLE DAIRY" overlay for example may be retrieved and displayed. This "APPLE DAIRY" overlay may include one or more non-polysemous symbols corresponding to previously stored messages that are members of the category of "dairy" words. Examples of "dairy" words may include "milk," "cheese," and "yogurt." Each "dairy" word may correspond to a different previously stored message and a different sequence of one polysemous and two non-polysemous symbols. Therefore, each "dairy" word may be integrated with a different entry in the interactive dictionary database 700. The FRUIT symbol 573 on the second level linked electronic screen overlay 501 in FIG. 5B may function as an intermediate symbol in one or more sequences of symbols on sequentially linked electronic screen overlays beginning with the polysemous APPLE symbol 526 and the non-polysemous FRUIT symbol 573. When the FRUIT symbol 573 is triggered, the third level linked electronic overlay 600 of FIG. 6, named the "APPLE FRUIT" overlay for example may be retrieved and displayed. This "APPLE FRUIT" overlay may include one or more non-polysemous symbols corresponding to previously stored messages that are members of the category of "fruit" words.

FIG. 5C shows a third level linked electronic screen overlay 581 with an 84 location virtual keyboard similar to the 84 location virtual keyboard of the first level electronic screen overlay in FIG. 5A. This overlay, named the "APPLE DOG" overlay, may be retrieved and displayed when the APPLE symbol 526 on the first level linked electronic screen overlay 500 is triggered and then the (embellished) DOG symbol 553 on the corresponding second level linked electronic overlay 501 is triggered. Symbols on this overlay 581 may be selected as the third symbol in polysemous symbol sequences that begin with the APPLE 526 and DOG 553 symbols. As discussed above, each of these previously stored messages and polysemous symbol sequences may be integrated with a corresponding entry in the interactive dictionary database 700.

Figure 5D:
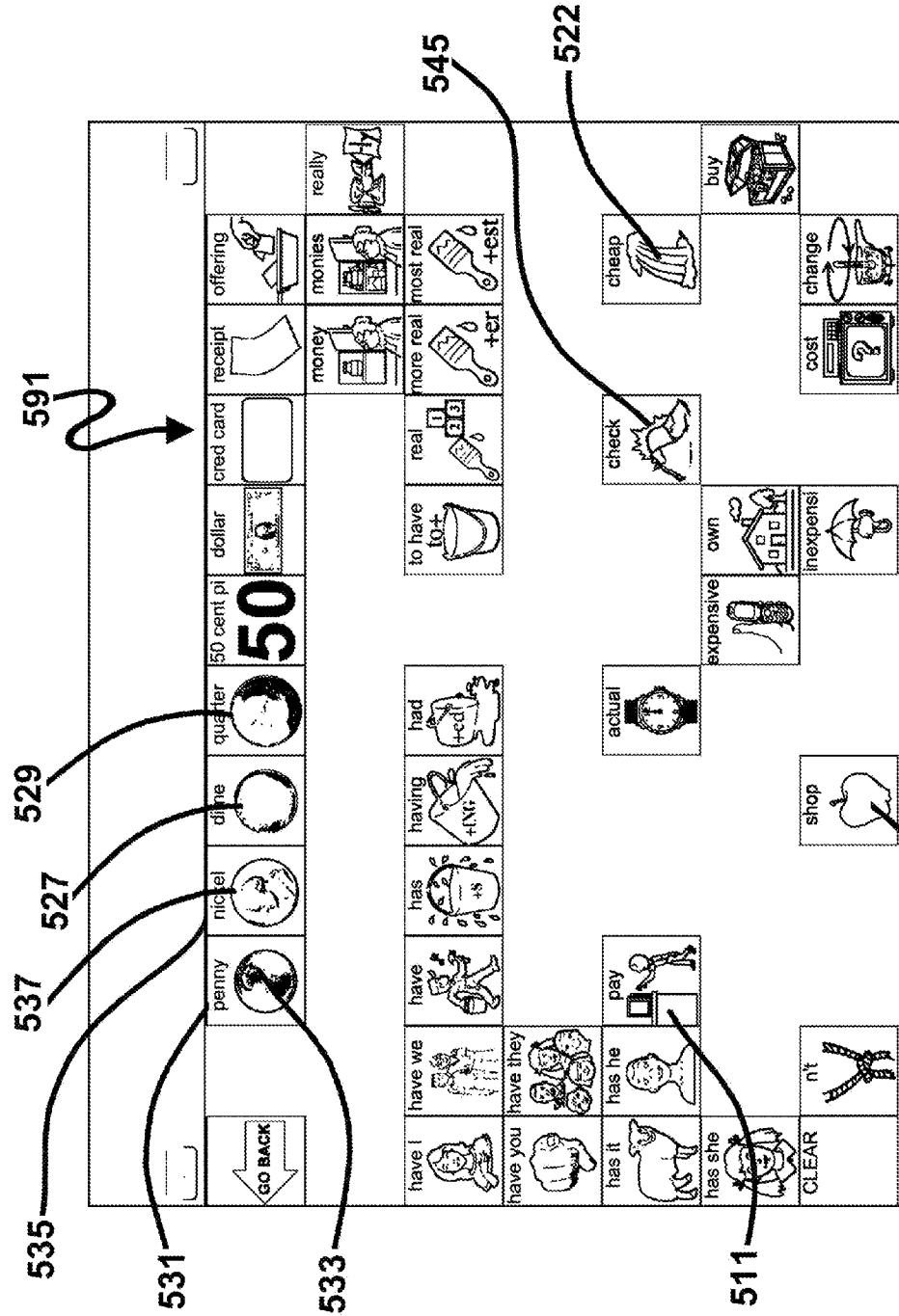

FIG. 5D shows a second level linked electronic screen overlay 591 with an 84 location virtual keyboard similar to the 84 location virtual keyboard of the first level electronic screen overlay in FIG. 5A. This is an example using a two symbol sequence including a polysemous and non-polysemous symbol. This overlay, named the "MONEY" overlay, may be retrieved and displayed when the MONEY symbol 544 (Row 4, Column 7) on the first level linked electronic screen overlay 500 is triggered or selected. The key 531 including the PENNY symbol 533, the key 535 including the NICKEL symbol 537, the key including the DIME symbol 527, and the key including the QUARTER symbol 529 on the second level linked electronic screen overlay 591 in FIG. 5D are non-polysemous symbols that are each associated with fringe vocabulary words that are members of the semantically related category of "money" words. The words associated with each of these non-polysemous symbols, namely "penny," "nickel," "dime," and "quarter" can each be produced with unique sequences of two keystrokes that include one polysemous symbol and one non-polysemous symbol. Each "money" word may correspond to a different previously stored message and a different sequence of one polysemous and one non-polysemous symbol. Therefore, each "money" word may be integrated with a different entry in the interactive dictionary database 700. The polysemous WANT symbol 511, the polysemous MOUNTAIN symbol 545, the polysemous RAINBOW symbol 522, and the polysemous APPLE symbol 526 on the second level linked electronic screen overlay 591 in FIG. 5D all function as the intermediate symbol in at least one sequence of three polysemous symbols. A corresponding third level linked electronic overlay is retrieved and displayed when any of these intermediate polysemous symbols is triggered or selected. The WANT symbol 511, MOUNTAIN symbol 545, RAINBOW symbol 522, and APPLE symbol 526 on the second level linked electronic screen overlay 591 in FIG. 5D are not embellished, meaning that they have the same appearance as the corresponding WANT 511, MOUNTAIN 545, RAINBOW 522, and APPLE 526 symbols of the first level linked electronic screen overlay 500 of FIG. 5A. As described above, each of these messages and polysemous symbol sequences may be integrated with an entry in the interactive dictionary database 700.

Figure 6:
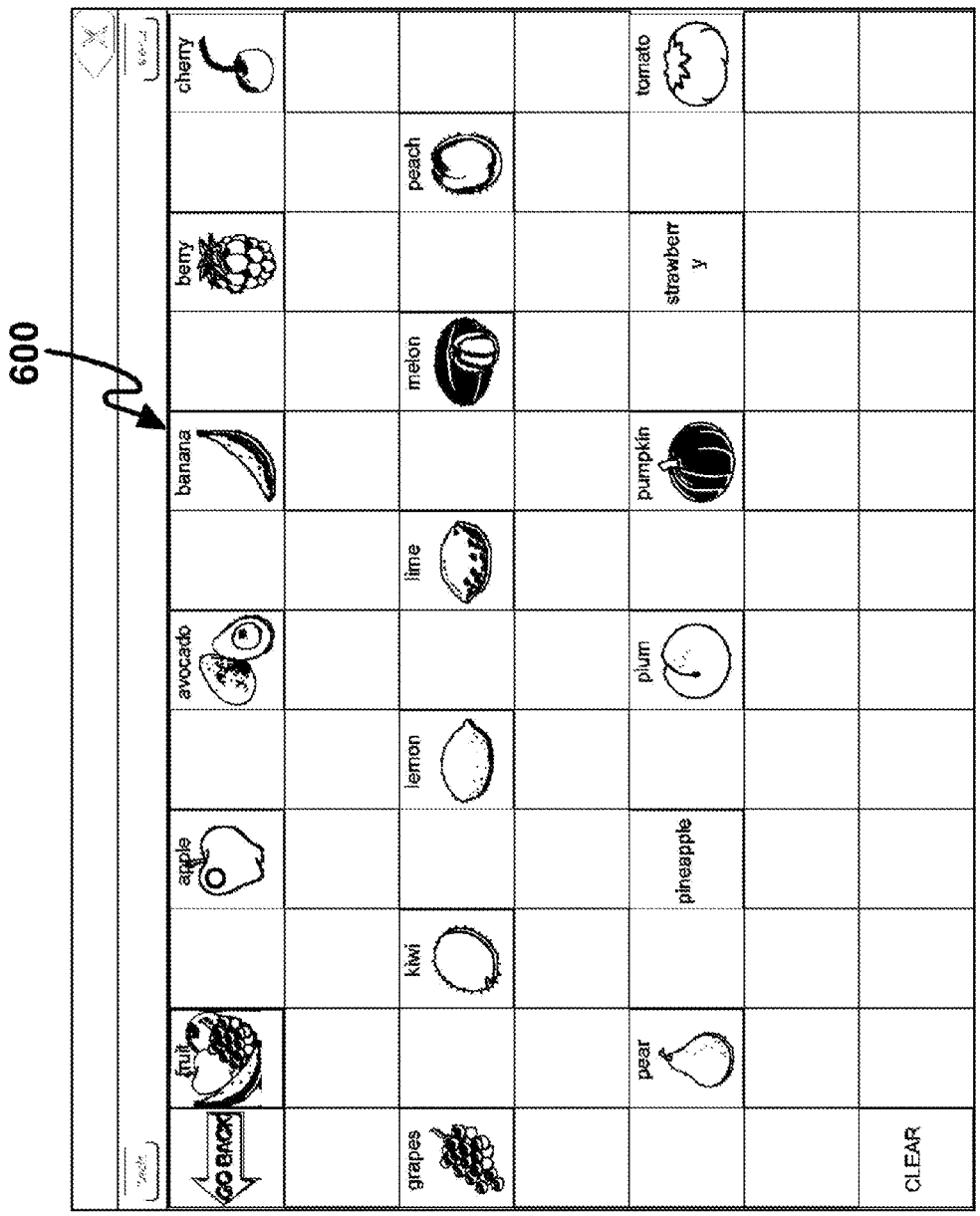
FIG. 6 illustrates an example embodiment of an electronic screen overlay with non-polysemous symbols.

FIG. 6 shows a third level linked electronic screen overlay 600 with an 84 location virtual keyboard similar to the 84 location virtual keyboard of the first level electronic screen overlay 500 in FIG. 5A. This overlay 600, named the "APPLE FRUIT" overlay, may be retrieved and displayed when the polysemous APPLE symbol 526 on the first level linked electronic screen overlay 500 of FIG. 5A is triggered and then the non-polysemous FRUIT symbol 573 on the corresponding second level linked electronic overlay 501 of FIG. 5B is triggered. Each of the locations on the virtual keyboard of the "APPLE FRUIT" overlay of FIG. 6 may include a relatively centrally disposed non-polysemous symbol corresponding to a previously stored message that is a member of the category of "fruit" words. Since all of the locations of the "APPLE FRUIT" overlay may correspond to members of the category of "fruit" words, as many as 84 members of the "fruit" category may be produced with unique sequences of only three keystrokes each. Each "fruit" word may correspond to a different previously stored message and a different sequence of one polysemous and two non-polysemous symbols. Therefore, each "fruit" word may be integrated with a different entry in the interactive dictionary database 700.

At least one embodiment of an apparatus, method, computer readable medium and/or article of manufacture of the present invention includes an interactive dictionary database that includes a plurality of symbol sequences, each of the plurality of symbol sequences including at least one polysemous symbol and each of the plurality of symbol sequences being stored in association with at least one word, sentence, phoneme, message, letter, number, morpheme, command and/or phrase.

At least one embodiment of an apparatus, method, computer readable medium and/or article of manufacture of the present invention includes storing an interactive dictionary database in a memory, the interactive dictionary database including a plurality of symbol sequences, each of the plurality of symbol sequences including at least one polysemous symbol and each of the plurality of symbol sequences being stored in association with at least one word, sentence, phoneme, message, letter, number, morpheme, command and/or phrase; and providing, in the interactive dictionary database, information useable to assign at least a subset of the plurality of symbol sequences at least one of an active and an inactive status. At least one embodiment of an apparatus, method, computer readable medium and/or article of manufacture of the present invention includes a memory configured to store an interactive dictionary database, the interactive dictionary database including a plurality of symbol sequences, each of the plurality of symbol sequences including at least one polysemous symbol and each of the plurality of symbol sequences being stored in association with at least one word, sentence, phoneme, message, letter, number, morpheme, command and/or phrase; and an integrated input and display device configured to display at least portions of the interactive dictionary database to a user upon receipt of user input, including information useable to assign at least a subset of the plurality of symbol sequences at least one of an active and an inactive status.

At least one embodiment of an apparatus, method, computer readable medium and/or article of manufacture of the present invention includes storing an interactive dictionary database in a memory, the interactive dictionary database including a plurality of symbol sequences, each of the plurality of symbol sequences including at least one polysemous symbol and each of the plurality of symbol sequences being stored in association with a rationale and at least one word, sentence, phoneme, message, letter, number, morpheme, command and/or phrase, each of the respective the rationales relating each of the respective symbols sequences to the associated at least one word, sentence, phoneme, message, letter, number, morpheme, command and/or phrase; and displaying, upon a processor receiving an input from a user, at least portions of the interactive dictionary database to the user, the at least portions including at least one associated symbol sequence, rationale and at least one word, sentence, phoneme, message, letter, number, morpheme, command and/or phrase.

At least one embodiment of an apparatus, method, computer readable medium and/or article of manufacture of the present invention includes a memory configured to store an interactive dictionary database, the interactive dictionary database including a plurality of symbol sequences, each of the plurality of symbol sequences including at least one polysemous symbol and each of the plurality of symbol sequences being stored in association with at least one word, sentence, phoneme, message, letter, number, morpheme, command and/or phrase, each of the respective the rationales relating each of the respective symbols sequences to the associated at least one word, sentence, phoneme, message, letter, number, morpheme, command and/or phrase; and an integrated input and display device configured to display at least portions of the interactive dictionary database to a user, the at least portions including at least one associated symbol sequence, rationale and at least one word, sentence, phoneme, message, letter, number, morpheme, command and/or phrase.

At least one embodiment of an apparatus, method, computer readable medium and/or article of manufacture of the present invention includes an interactive dictionary database that includes an entry corresponding to each of a plurality of previously stored messages, as described above, where the definition of each entry includes at least the corresponding unique name of the final linked electronic screen overlay in a sequence of linked electronic screen overlays that may be accessed to produce the corresponding previously stored message.

At least one embodiment of an apparatus, method, computer readable medium and/or article of manufacture of the present invention includes an interactive dictionary database that includes an entry corresponding to each of a plurality of previously stored messages, as described above, where a definition of each entry includes at least the corresponding sequence of polysemous symbols that may be triggered to produce the corresponding previously stored message.

At least one embodiment of an apparatus, method, computer readable medium and/or article of manufacture of the present invention includes an interactive dictionary database that includes an entry corresponding to each of a plurality of previously stored messages, as described above, where the definition of each entry further includes a rationale relating each of the respective symbols sequences to the associated at least one word, sentence, phoneme, message, letter, number, morpheme, command and/or phrase, each of the respective the rationales are useable to explain how the respective symbol sequence relates to the respective stored at least one word, sentence, phoneme, message, letter, number, morpheme, command and/or phrase.

In at least one embodiment of an apparatus, method, computer readable medium and/or article of the present invention, at least portions of the interactive dictionary are displayable to a user, and wherein the information is displayable to the user in a selectable manner.

In at least one embodiment of an apparatus, method, computer readable medium and/or article of the present invention, the interactive dictionary includes a plurality of symbol sequences stored in association with a common at least one word, sentence, phoneme, message, letter, number, morpheme, command and/or phrase.

At least one embodiment of an apparatus, method, computer readable medium and/or article of manufacture of the present invention includes an interactive dictionary database that includes an entry corresponding to each of a plurality of previously stored messages, as described above, where each entry may correspond to at least one adjustable binary setting, such as a binary setting that can be used to assign the corresponding entry to an active or inactive status, for example.

In at least one embodiment of an apparatus, method, computer readable medium and/or article of the present invention, when an inactive status is assigned, a corresponding symbol sequence is rendered unselectable by a user.

At least one embodiment of an apparatus, method, computer readable medium and/or article of manufacture of the present invention includes an interactive dictionary database that includes an entry corresponding to each of a plurality of previously stored messages, as described above, where the terms of two or more entries including the texts of two or more previously stored messages are identical matches, and the corresponding definitions of those two or more entries differ. There may be multiple symbol sequences for producing a same stored message, and each of those symbol sequences may be stored as a separate entry in the interactive dictionary database. As such, the interactive dictionary may include a plurality of symbol sequences stored in association with a common at least one word, sentence, phoneme, message, letter, number, morpheme, command and/or phrase.

At least one embodiment of an apparatus, method, computer readable medium and/or article of manufacture of the present invention includes an interactive dictionary database, as described above, which is fully integrated with the contents of a plurality of linked electronic screen overlays.

At least one embodiment of an apparatus, method, computer readable medium and/or article of manufacture of the present invention includes an interactive dictionary database, as described above, which is fully integrated with the contents of a plurality of linked electronic screen overlays, as described above. In at least one embodiment, the dictionary database may be integrated with the system of electronic screen overlays in such a way that editing the dictionary results in corresponding changes in the use of symbol sequences on electronic screen overlays to produce words, etc. The integration of the database with the rest of the system may be established by explaining that changes in the dictionary database result in changes in the use of symbols on electronic screen overlays, and that changes to symbols on electronic screen overlays result in changes in the dictionary database 700.

At least one embodiment of an apparatus, method, computer readable medium and/or article of manufacture of the present invention includes an interactive dictionary database, as described above, which is fully integrated with the contents of a plurality of linked electronic screen overlays, as described above, such that adding a new entry to the interactive dictionary database results in the addition of a new previously stored message that may be produced by triggering a corresponding sequence of polysemous symbols on sequentially linked electronic screen overlays.

At least one embodiment of the present invention includes an interactive dictionary database, as described above, which is fully integrated with the contents of a plurality of linked electronic screen overlays, as described above, such that deleting an existing entry from the interactive dictionary database removes that previously stored message from the plurality of linked electronic screen overlays so that the corresponding sequence of polysemous symbols on sequentially linked electronic screen overlays cannot be triggered to produce the message that has been deleted.

At least one embodiment of an apparatus, method, computer readable medium and/or article of manufacture of the present invention includes an interactive dictionary database, as described above, which is fully integrated with the contents of a plurality of linked electronic screen overlays, as described above, such that modifying an existing entry in the interactive dictionary database results in a corresponding change in the corresponding plurality of linked electronic screen overlays.

At least one embodiment of an apparatus, method, computer readable medium and/or article of manufacture of the present invention includes an interactive dictionary database, as described above, which is fully integrated with the contents of a plurality of linked electronic screen overlays, as described above, such that modifying features of a key on a sequentially linked electronic screen overlay so that it can be triggered to produce a newly stored message results in the addition of a corresponding entry to the interactive dictionary database.

At least one embodiment of an apparatus, method, computer readable medium and/or article of manufacture of the present invention includes an interactive dictionary database, as described above, which is fully integrated with the contents of a plurality of linked electronic screen overlays, as described above, such that deleting features of a key on a sequentially linked electronic screen overlay that otherwise could be triggered to produce a previously stored message results in deletion of the corresponding entry from the interactive dictionary database.

At least one embodiment of an apparatus, method, computer readable medium and/or article of manufacture of the manufacture of the present invention includes an interactive dictionary database, as described above, which is fully integrated with the contents of a plurality of linked electronic screen overlays, as described above, such that modifying features of a key on a sequentially linked electronic screen overlay that may be triggered to produce a previously stored message results in a corresponding change in the corresponding entry of the interactive dictionary database.

In at least one embodiment of an apparatus, method, computer readable medium and/or article of manufacture of the present invention, the interactive dictionary database is searchable.

In at least one embodiment of an apparatus, method, computer readable medium and/or article of manufacture of the present invention, the plurality of entries in the interactive dictionary database may be browsed in order using known methods, a scrollable list for example.

FIG. 7 shows a non-limiting example embodiment of several entries of an interactive dictionary database 700 that may be stored in memory 102 of the portable multifunction device 100 and fully integrated with the contents of a plurality of linked electronic screen overlays. Each row includes one entry in the interactive dictionary database 700. The first column 705 includes an alphabetized list of messages in the interactive dictionary database 700. Each message includes text contents of a previously stored at least one word, sentence, phoneme, plural word message, letter, number, morpheme, command and/or phrase stored in memory 102. The second column 715 and the third column 725 include two different parts of the definitions that correspond to each entry in the interactive dictionary database 700. The first part of the definition includes a polysemous symbol sequence including at least one polysemous symbol in column 715 that may be triggered on sequentially linked electronic screen overlays to produce the corresponding message of column 705 (previously stored). The interactive dictionary database 700 may further include a plurality of symbol sequences stored in association with a common at least one word, sentence, phoneme, message, letter, number, morpheme, command and/or phrase.

The second part of the definition includes a rationale in column 725 that explains an association between the corresponding polysemous symbol sequence in column 715 and the corresponding previously stored at least one word, sentence, phoneme, plural word message, letter, number, morpheme, command and/or phrase in column 705. In other words, the interactive dictionary 700 includes a plurality of rationales, each respectively relating a respective one of the plurality of symbol sequences to a respective associated at least one word, sentence, phoneme, message, letters, number, morpheme, command and/or phrase, wherein each of the respective the rationales are useable to explain how the respective symbol sequence relates to the respective stored at least one word, sentence, phoneme, message, letter, number, morpheme, command and/or phrase.

The fourth column 745 corresponds to a binary setting that can be configured for each entry in the interactive dictionary database 700. Specifically, this binary setting in column 745 useable to assign at least a subset of the plurality of polysemous symbol sequences at least one of an active and an inactive status, which may be adjusted to independently assign each entry in the interactive dictionary database 700 to an active or inactive status. In the example interactive dictionary database 700 of FIG. 7, the binary setting 747 corresponding to the stored message "drop" 746 is assigned an inactive status. Several other entries are assigned an active status (see column 745). As such, the corresponding or associated symbol sequence of "ELEPHANT", "UMBRELLA" and "MR. ACTION MAN" will be inactive and thus rendered unselectable by a user.

The fifth column 755 corresponds to a frequency counter that may be included in the interactive dictionary database 700, corresponding to each of the entries in the interactive dictionary database 700. The frequency counter corresponding to a given entry in the interactive dictionary database 700 may increment each time the corresponding message of column 705 has been input by a user, via triggering the associated polysemous symbol sequence of column 715. Note that the values of frequency counters of column 755 are illustrated with varied numbers because the different messages in the interactive dictionary database 700 may be produced a different numbers of times.

Note that two or more messages in the interactive dictionary database 700 may correspond to identical messages, but correspond to different polysemous symbol sequences and rationales, just as there may be multiple definitions of a word in a written dictionary. In the example of FIG. 7, messages 731 and 735 of column 705 both correspond to the word "paint." However, these entries correspond to different definitions. The message "paint" 731 corresponds to polysemous symbol sequence 732 and rationale 733, while the message "paint" 735 corresponds to polysemous symbol sequence 736 and rationale 737. It should be further noted that the active/inactive status of these two entries may be configured independently; the entry corresponding to the message "paint" 731 is configured to an active status 734 while the entry "paint" 735 is configured to an inactive status 738.

An additional column 765 may be included in the interactive dictionary database 700, corresponding to an optional threshold argument for of the entries in the interactive dictionary database 700. The threshold argument 765 may include a threshold defining, when reached, a point when an inactive entry in the interactive dictionary database 700 should probably be re-configured from an inactive to an active status, or at least a point in time when reconfiguring should be considered, as will be discussed later. The threshold argument 748 corresponding to the stored message "drop" 746 indicates that the stored message "drop" 746 should probably be re-configured from an inactive to an active status, or at least this should be considered, when the frequency counter 768 corresponding to the stored message "lift" 766 has been produced twenty-five times using the corresponding polysemous symbol sequence 767.

In at least one embodiment, the information of the interactive dictionary database 700, useable to assign at least a subset of the plurality of symbol sequences at least one of an active and an inactive status, is stored in the memory 102. The information is stored in association with at least a plurality of the symbol sequences as indicated above. The integrated input and display device 112 may be configured to display the information to the user in a selectable manner. When the processor 120 receives input information relating to the at least one of an active and an inactive status of a symbol sequence, it may further edit the interactive dictionary database 700 stored in memory 102 to reflect this change.

In at least one embodiment of the present invention, there is an apparatus, method, computer readable medium and/or article of manufacture for an operator to enter a search term and search for an existing entry among the contents of an interactive dictionary database 700, as described above, and retrieve a definition for each existing entry that matches the search term entered by the operator. Such an apparatus, method, computer readable medium and/or article of manufacture may include, for example, a processor 120 configured to receive an indication of initiation of a search, of a stored interactive dictionary database 700, by a user; an integrated input and display device 112 to display an electronic screen overlay, usable for searching the interactive dictionary database 700, to the user; the processor 120 being further configured to receive an indication of input of text into the electronic screen overlay usable for searching and determine whether or not at least one entry in the interactive dictionary database 700 includes a previously stored at least one word, sentence, phoneme, message, letter, number, morpheme, command and/or phrase matching the input text; and the integrated input and display 112 being configured to display, upon the processor 120 determining that one or more entries in the interactive dictionary database 700 includes a previously stored at least one word, sentence, phoneme, message, letter, number, morpheme, command and phrase that matches the input text, a definition of the determined one or more identified entries in the interactive dictionary database 700.

In at least one example embodiment of the system, method, computer readable medium and/or article of manufacture:

a. The operator triggers, via a key selection on a displayed electronic overlay for example, a command to initiate a search of the interactive dictionary database 700 using a polysemous symbol sequence or a drop-down menu, for example, and this indication of initiation of a search is received by processor 120.

b. An interactive dialog screen may be displayed on the visual screen of the touch sensitive display 112 for searching the database of electronic screen overlays in memory 102. This overlay may include at least a search term field for entry of the text of a search term, one or more results fields that may include a display of search results, a key to trigger a search command, and a key to close the interactive dialog screen.

c. The operator may then enter the text of a search term, or search string, into the search term field for example, using spelling methods and a virtual keyboard, for example.

d. The operator may then trigger the search command and the processor 120 will then receive the indication of the input text.

e. An electronic search of the interactive dictionary database 700 may then be executed by processor 120 to determine whether or not at least one entry (identify any existing entries) in the interactive dictionary database 700 includes a previously stored message in memory 102 that matches the input text of the search term entered into the search term field by the operator. An electronic search of the database 700 may then be executed by the processor 120 to determine whether the search string is stored in memory 102 as a text message associated with a key within an electronic screen overlay.

f. If a search produces positive search results, including the processor 120 determining one or more entries in the interactive dictionary database 700 that includes a term corresponding to the text of a previously stored message that matches the text of the search term, the definition(s) of those one or more identified entries in the interactive dictionary database 700 may then be displayed, in one or more results fields for example. The definitions may include symbol sequences and rationales, each respectively relating each of the plurality of symbol sequences to their associated at least one of words, sentences, phonemes, messages, letters, numbers, morphemes, commands and phrases. If a search returns a positive search, the processor 120 may then analyze the interconnecting electronic screen overlays in the database in memory 102 to determine each unique sequence of symbols that can be combined to generate the message represented by the search string. These unique sequences are displayed on the visual display of the touch sensitive display 112.

g. At any time, the operator may close the interactive dialog screen used for searching the interactive dictionary database 700 and return to communication mode. The displayed electronic screen overlay may include a key to close the electronic screen overlay used for searching the interactive dictionary database 700.

At least one embodiment of the present invention includes an apparatus, method, computer readable medium and/or article of manufacture for an operator to enter a search term and search for an existing entry among the contents of an interactive dictionary database, as described above, where the text of a search term may be entered into the text of the search term field using a virtual spelling keyboard, the built-in popup keyboard on a portable multi-function device, for example.

At least one embodiment of the present invention includes an apparatus, method, computer readable medium and/or article of manufacture for an operator to enter a search term and search for an existing entry among the contents of an interactive dictionary database, as described above, where the text of a search term may be entered into the text of the search term field using a physical keyboard.

At least one embodiment of the present invention includes an apparatus, method, computer readable medium and/or article of manufacture for an operator to enter a search term and search for an existing entry among the contents of an interactive dictionary database, as described above, by entering a search term into a search field, as described above, where the search field may include a search term prediction mechanism.

At least one embodiment of the present invention includes an apparatus, method, computer readable medium and/or article of manufacture for an operator to enter a search term and search for an existing entry among the contents of an interactive dictionary database, as described above, by entering a search term into a search field, as described above, where the search field may include a search term prediction mechanism, and the search term prediction mechanism only predicts terms that exist in the interactive dictionary database, and thus only predicts search terms that produce positive search results.

At least one embodiment of the present invention includes an apparatus, method, computer readable medium and/or article of manufacture for an operator to enter a search term and search for an existing entry among the contents of an interactive dictionary database, as described above, where a preliminary search is automatically executed each time the text contents of the search field change, and the key for the search command becomes inactive if a search for the text in the search term field will produce negative results. This may prevent an operator from executing a search that will produce negative results by searching for a term that has no matches in the interactive dictionary database, searching for a misspelled word, for example.

At least one embodiment of the present invention includes an apparatus, method, computer readable medium and/or article of manufacture for an operator to enter a search term and search for an existing entry among the contents of an interactive dictionary database, as described above, where the definition of at least one existing entry in the interactive dictionary database that is identified during the search is displayed in at least one of the one or more results fields, as described above, and the displayed definition includes at least the unique name of the final linked electronic screen overlay in a sequence of linked electronic screen overlays that must be accessed to produce the corresponding previously stored message.

At least one embodiment of the present invention includes an apparatus, method, computer readable medium and/or article of manufacture for an operator to enter a search term and search for an existing entry among the contents of an interactive dictionary database, as described above, where the definition of at least one existing entry in the interactive dictionary database that is identified during the search is displayed in at least one of the one or more results fields, as described above, and the displayed definition includes at least the sequence of polysemous symbols that must be triggered to produce the corresponding previously stored message.

At least one embodiment of the present invention includes an apparatus, method, computer readable medium and/or article of manufacture for an operator to enter a search term and search for an existing entry among the contents of an interactive dictionary database, as described above, where the definition of at least one existing entry in the interactive dictionary database that is identified during the search is displayed in at least one of the one or more results fields, as described above, and the displayed definition includes at least a rationale to explain why the corresponding sequence of polysemous symbols is associated with the corresponding previously stored message.

At least one embodiment of the present invention includes an apparatus, method, computer readable medium and/or article of manufacture for an operator to enter a search term and search for an existing entry among the contents of an interactive dictionary database, as described above, where the definitions of two or more existing entries in the interactive dictionary database may be identified during the search and displayed in two or more results fields.

Figure 8:
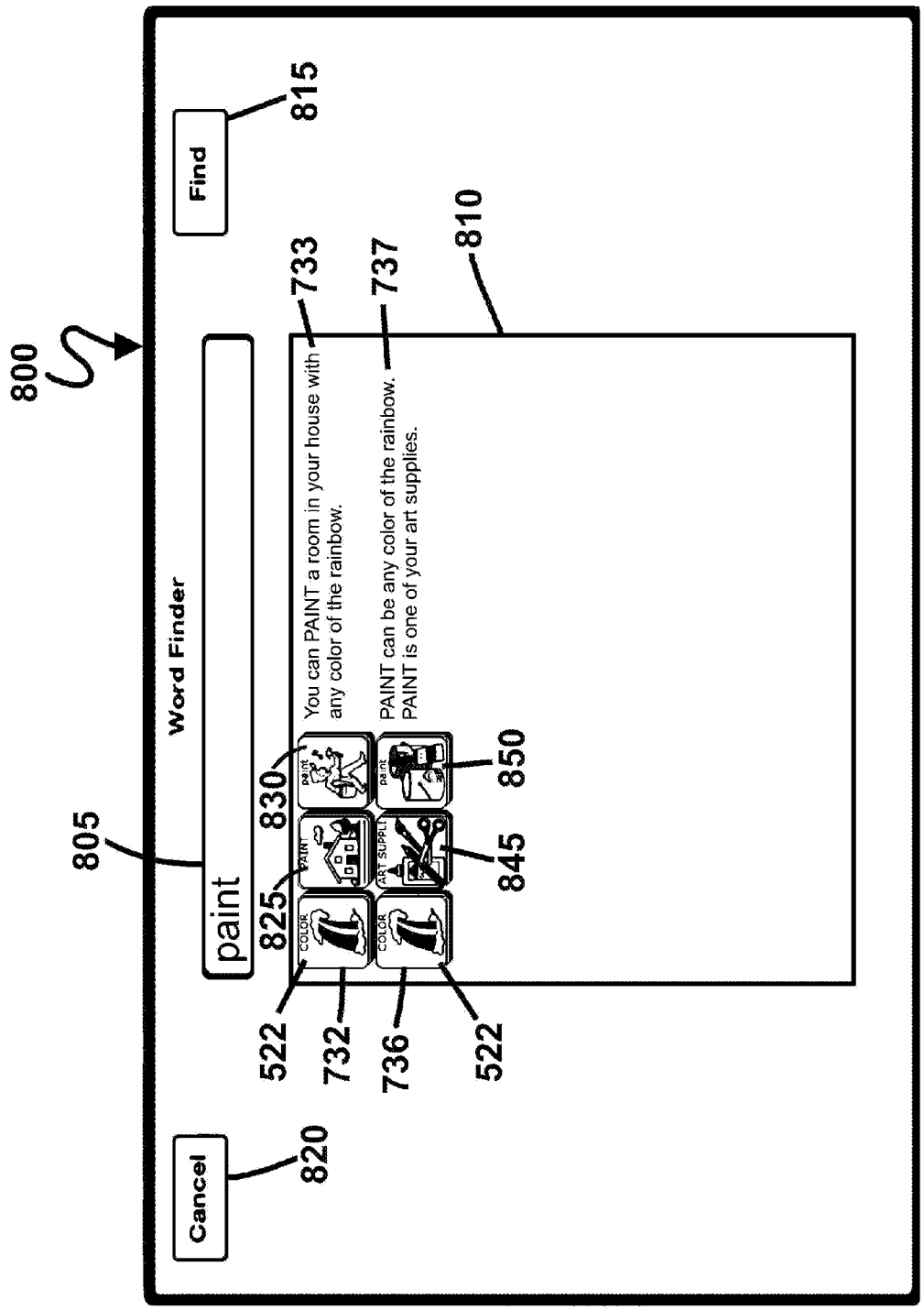
FIG. 8 illustrates an electronic screen overlay containing a Word Finder tool for searching the interactive dictionary database of an embodiment of the present invention.

FIG. 8 shows a non-limiting example of an electronic screen overlay 800 that contains a Word Finder tool that may be used for searching for an existing entry in the interactive dictionary database 700 that matches a search term entered by an operator. This tool includes at least a search term field 805 that may include the text of a search term such as "paint" for example, one or more results fields 810 that may include a display of search results, a key to trigger a search command 815, and a key to close 820 the electronic screen overlay 800 used for searching the interactive dictionary database 700.

An operator may enter a search term into the search term field 805 using spelling methods on a physical or virtual keyboard for spelling, such as the term "paint" in this example. Then, the operator may trigger a key for a search command (the FIND key 815 in FIG. 8 for example, indicating initiation of a search, of the stored interactive dictionary database 700) to execute a search of the interactive dictionary database 700 for any entries with a message (previously stored word, phrase, morpheme, etc.) that is an identical match for the current search term. If one or more matches are found in the interactive dictionary database 700, the definitions of the one or more corresponding entries may be displayed in one or more results fields 810. The definition may include at least a polysemous symbol sequence (such as sequence 732 consisting of polysemous symbols 522, 825, and 830 for example; and/or sequence 736, consisting of polysemous symbol 522 and nonpolysemous symbols 845 and 850 for example) that can be triggered to produce a previously stored message that matches the search term ("paint"). In this example of FIG. 8, there are two different definitions for the term "paint", namely there are two different symbol sequences that, when selected, will output the word "paint". Further, the respective definitions may also include a respective rationale relating each of the plurality of symbol sequences to their associated at least one of words, sentences, phonemes, messages, letters, numbers, morphemes, commands and phrases, each of the respective the rationales being useable to explain how the respective symbol sequence relates to the respective stored at least one word, sentence, phoneme, message, letter, number, morpheme, command and/or phrase.

In the example of FIG. 8, the operator has searched for entries in the interactive dictionary database 700 whose terms match the search term "paint" and found two matching entries. A corresponding polysemous symbol sequence (732 and 736) and rationale (733 and 737) are displayed in a results field for each matching entry that was found in the search (two symbol sequences and two rationales displayed in area 810). The first result may correspond to a sequence of three polysemous symbols 522, 825, and 830 used to produce the word "paint" as a verb. The second result may correspond to a sequence of one polysemous RAINBOW symbol 522 and two non-polysemous symbols 845, 850 used to produce the word "paint" as a noun that is a member of the semantic category ART SUPPLIES.

The search field 805 may include a search term prediction mechanism that only predicts search terms that correspond to one or more existing entries in the interactive dictionary database 700. The key to trigger the search command may only be active when a search term corresponding to one or more existing entries in the interactive dictionary database 700 have been entered. These mechanisms may ensure that an operator only searches for terms that produce a positive match with an existing entry in the interactive dictionary database 700.

At least one embodiment of an apparatus, method, computer readable medium and/or article of manufacture of the present invention provides for an experienced operator to temporarily and systematically limit the number of active sequences of polysemous symbols on sequentially linked electronic screen overlays during instructional activities, or as an inexperienced operator is learning to use different polysemous symbol sequences on the system. This may be accomplished by configuring one or more of a plurality of binary settings corresponding to each of a plurality of entries in the interactive dictionary database 700 to prevent the operator from triggering a selected subset of one or more polysemous symbol sequences that have an inactive status, without modifying the contents of the interactive dictionary database 700, and without modifying the spatial configuration of any keys on any of the plurality of linked electronic screen overlays.

In at least one embodiment, the system, method, computer readable medium and/or article of manufacture comprises storing an interactive dictionary database 700 in a memory, the interactive dictionary database 700 including a plurality of symbol sequences, each of the plurality of symbol sequences including at least one polysemous symbol and each of the plurality of symbol sequences being stored in association with at least one word, sentence, phoneme, message, letter, number, morpheme, command and/or phrase; providing information, stored in association with the plurality of symbol sequences in interactive dictionary database 700 in memory, useable to assign a subset of the plurality of symbol sequences at least one of an active and an inactive status; receiving an indication of an assignment of an active status to at least one of the symbol sequences; and displaying polysemous symbols on an initial electronic screen overlay displayed on a display, wherein polysemous symbols, included within at least one symbol sequence assigned an active status, are selectable.

In at least one embodiment, the system and/or method comprises:

a. An interactive dictionary database 700 that includes an entry corresponding to each of a plurality of previously stored messages, as described above, where each entry may correspond to a binary setting that can be configured to assign the corresponding entry to an active or inactive status is fully integrated with a plurality of sequences of polysemous symbols on sequentially linked electronic screen overlays, as described above.

b. An operator may view an electronic screen overlay displayed on touch sensitive display 112 that includes at least a comprehensive listing of each of the plurality of entries in the interactive dictionary database 700, including at least the message corresponding to each entry (text contents of a previously stored message) and a binary electronic control mechanism used to assign an active or inactive status to each entry, a check-box displayed as part of the interactive dictionary database 700 for example. An operator may view an interface screen that shows information extracted from the database, including at least all messages assigned to keys functioning as terminal symbols and a binary electronic control mechanism used to assign an active or inactive status to each entry, a check-box for example.

c. The operator may optionally use the binary electronic control mechanism to change any one or more of the plurality of entries in the interactive dictionary database 700 from an active status to an inactive status, or from an inactive status to an active status. This indication of an assignment of an active/inactive status, for at least one of the symbol sequences, is then received by processor 120.

d. If an entry in the interactive dictionary database 700 is assigned an active status, all of the corresponding sequence of polysemous and, if applicable, non-polysemous symbols, will be made selectable by processor 120 controlling the display on the corresponding sequentially linked electronic screen overlays, wherein polysemous symbols, included within at least one symbol sequence assigned an active status, are selectable and can then be sequentially triggered (selected by the operator) to produce the corresponding previously stored message.

e. If an entry in the interactive dictionary database 700 is assigned an inactive status, at least the terminal symbol in the corresponding sequence of symbols on sequentially linked electronic screen overlays will not be selectable (or visually indicated as being inactive, e.g. darkened or blacked out for example) on its' respective linked electronic screen overlay, and an operator will not be able to trigger (select) the full sequence of symbols on sequentially linked electronic screen overlays to produce the corresponding previously stored message. As such, the processor 120 controls the display such that polysemous symbols, not included within at least one symbol sequence assigned an active status, are non-selectable. This inactive status only applies to the one corresponding sequence of symbols on sequentially linked electronic screen overlays. Other symbol sequences that include an initial symbol or initial and intermediate symbols that are also included in an inactive symbol sequence may still be assigned an active status. Thus, the processor 120 controls the display such that a particular key becomes inactive if and only if all corresponding entries in the interactive dictionary database 700 have been set to an inactive status, thereby always giving full access to all messages that are set to be active. When an operator is working in communication mode, inactive keys are not selectable and may possess visual characteristics that indicate their inactive status, appearing as blank keys or as keys with and no symbol, for example. Thus, selectable displayed polysemous symbols are differentiated from non-selectable polysemous symbols.

f. Other than recording the change of the active/inactive setting, toggling this setting does not alter the contents of the interactive dictionary database 700 in any way. Any messages, links, etc. associated with the key are still maintained in the database, even if certain contents are currently inaccessible to the operator when using the system in communication mode.

g. After assigning one or more entries of the interactive dictionary database 700 to an active or inactive setting, the operator may trigger a command to save the current configuration of active/inactive settings, using a dedicated save key on the electronic screen overlay that lists each of the plurality of interactive dictionary database 700 entries, for example. The saved settings may be retrieved and configured, as needed. Each message associated with a terminal symbol has a corresponding active/inactive setting in the database stored in memory 102. The active/inactive settings are saved along with other contents of the database and can be configured at any time as described above.

h. Each of the plurality of keys on the virtual keyboards of each of the plurality of linked electronic screen overlays may be assigned to a dedicated coordinate location. Thus the spatial configurations of keys on each linked electronic screen overlay may remain constant when any number of entries in the interactive dictionary database 700 are set to an inactive status.

i. A global binary setting may optionally be adjusted at any time to either make all symbol sequences corresponding to entries in the interactive dictionary database 700 visible and selectable, regardless of their active/inactive status, or to only make entries in the interactive dictionary database 700 that currently have an active status visible. A binary setting can optionally be set such that the system will ignore the active/inactive setting of each individual message and will give full access to all messages, regardless of the individual active/inactive settings.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where the listing of interactive dictionary database entries includes at least one polysemous symbol sequence that comprises at least part of the definition of an entry.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where the listing of interactive dictionary database entries includes at least one rationale to explain the association between a polysemous symbol sequence and a previously stored message that comprises at least part of the definition of an entry.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where the listing of interactive dictionary database entries includes two or more entries that correspond to previously stored messages with matching text content, and two or more different polysemous symbol sequences.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where the listing of interactive dictionary database entries is alphabetized.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where an operator can browse through the listing of entries in order using known methods, a scrollable list for example and independently adjust the active/indicative status of individual entries.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, and a search term field in which an operator can enter a search term to search for an entry in the interactive dictionary database.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where this electronic screen overlay may be retrieved and displayed by triggering a polysemous symbol sequence.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, using an electronic screen overlay that includes at least a comprehensive listing of each of the plurality of entries in the interactive dictionary database, as described above, where this electronic screen overlay may be retrieved and displayed using known methods, triggering a drop-down menu, for example.

In at least one embodiment of the present invention, there is an apparatus, method, computer readable medium and/or article of manufacture for an operator to temporarily and systematically limit the number of active sequences of polysemous symbols on sequentially linked electronic screen overlays, where an operator may use a binary electronic control mechanism to selectively change any one of the plurality of entries in the interactive dictionary database from an active status to an inactive status, or from an inactive status to an active status.

In at least one embodiment of the present invention, there is an apparatus, method, computer readable medium and/or article of manufacture for an operator to temporarily and systematically limit the number of active sequences of polysemous symbols on sequentially linked electronic screen overlays, where an operator may use a binary electronic control mechanism to simultaneously change all of the plurality of entries in the interactive dictionary database from an active status to an inactive status, or from an inactive status to an active status.

In at least one embodiment of the present invention, there is an apparatus, method, computer readable medium and/or article of manufacture for an operator to temporarily and systematically limit the number of active sequences of polysemous symbols on sequentially linked electronic screen overlays, where an operator may selectively and simultaneously change a subset of less than all of the plurality of entries in the interactive dictionary database from an active status to an inactive status, or from an inactive status to an active status.

In at least one embodiment of the present invention, there is an apparatus, method, computer readable medium and/or article of manufacture for an operator to temporarily and systematically limit the number of active sequences of polysemous symbols on sequentially linked electronic screen overlays, where an operator may selectively and simultaneously change a subset of less than all of a plurality of entries in the interactive dictionary database from an active to an inactive status, or from an inactive to an active status by using a dialog box to create a list of entries in the interactive dictionary database that should be changed to an active or inactive status.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, where a subset of entries in the interactive dictionary database 700 may be listed in a vocabulary list file, a .txt file, for example, and where the subset of entries in the interactive dictionary database 700 that are listed in the vocabulary list file are automatically set to an active status while all other entries in the interactive dictionary database 700 are automatically set to an inactive status.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, where the operator may save the current configuration of active/inactive settings, as described above, to a vocabulary list file, as described above.

In at least one embodiment of the present invention, a vocabulary list file, as described above, may be downloaded from an external data source.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, where the operator may load a vocabulary list file, as described above that is selected from an array of one or more available vocabulary list files, and where the configuration of active/inactive settings of entries in the interactive dictionary database 700 is automatically set based on the contents of the vocabulary list file that has been loaded, as described above.

In at least one embodiment of the present invention, there is an apparatus, method, computer readable medium and/or article of manufacture for an operator to temporarily and systematically limit the number of active sequences of polysemous symbols on sequentially linked electronic screen overlays by loading a vocabulary list file, as described above, where the subset of entries in the interactive dictionary database 700 that are listed in the vocabulary list file may be edited.

In at least one embodiment of the present invention, there is an apparatus, method, computer readable medium and/or article of manufacture for an operator to temporarily and systematically limit the number of active sequences of polysemous symbols on sequentially linked electronic screen overlays by loading a vocabulary list file, as described above, where the subsets of entries in the interactive dictionary database 700 that are listed in two different vocabulary list files may be concatenated into one larger vocabulary list file.

In at least one embodiment of the present invention, there is an apparatus, method, computer readable medium and/or article of manufacture for an operator to temporarily and systematically limit the number of active sequences of polysemous symbols on sequentially linked electronic screen overlays, as described above, where a polysemous symbol on the first level electronic screen overlay may function as a terminal symbol in a one symbol sequence (when all corresponding longer polysemous symbol sequences are inactive) and the same polysemous symbol on the same first level electronic screen overlay may function as an initial polysemous symbol in at least one longer active polysemous symbol sequence.

The polysemous symbol on the first level electronic screen overlay may not function as a terminal symbol in a polysemous symbol sequence with an active status if at least one of the longer polysemous symbol sequences using the same polysemous symbol is configured to an active status. In this case, the polysemous symbol sequence in which the symbol functions as the terminal symbol in a one symbol sequence may automatically be re-configured to an inactive status and remain inaccessible even if a global binary setting is adjusted to configure all other polysemous symbol sequences to an active status. The active status of the at least one longer polysemous symbol sequences may always take priority so that the largest possible number of active polysemous symbol sequences may be available for use.

At least one embodiment of an apparatus, method, computer readable medium and/or article of manufacture of the present invention comprises providing polysemous symbols on an initial electronic screen overlay displayed on a display 112; storing, in memory 102 for example, a plurality of the polysemous symbols in association with a pointer identifying display of an electronic screen overlay which is different from the initial electronic screen overlay; storing, in the memory 102, an interactive dictionary database 700 including a plurality of single symbol and multi-symbol symbol sequences, each of the symbol sequences being stored in association with at least one word, sentence, phoneme, message, letter, number, morpheme, command and/or phrase and in association with information indicating at least one of an active and an inactive status, wherein only symbols, of the provided polysemous symbols of the initial electronic screen overlay, corresponding to at least one of the plurality of stored symbol sequences stored in association with information indicating an active status, are selectable; and controlling display of, on display 112 for example, a second electronic screen overlay on the display, associated with the selected polysemous symbol, in response to receiving selection of one of the provided selectable polysemous symbols functioning as an initial symbol in one of the active multi-symbol sequences. Further, an associated word, sentence, phoneme, message, letter, number, morpheme, command and/or phrase, may be output in response to the processor 120 receiving an indication of selection of one of the provided selectable polysemous symbols corresponding to an active single symbol sequence. In addition, it may include the processor 120 controlling display of information on display 112, stored in association with the plurality of symbol sequences in interactive dictionary database 700 in memory 102, useable to assign at least a subset of the plurality of symbol sequences at least one of an active and an inactive status. Upon drawing the electronic screen overlays on the display 112, the processor 102, upon detecting that one or more symbols on the electronic screen overlay is not used in any valid sequences for which the symbols are current options, may render the symbols in a indicative manner on display 112 and may make these symbols non-selectable. Further, upon only a single symbol sequence being active, display of corresponding second electronic screen overlays on the display 112, beginning with the selected polysemous symbol, is prevented by processor 102. Further, upon the processor 102 detecting that one or more multi-symbol sequences including a common initial symbol on the initial electronic screen overlay being active, the processor 102 may automatically set the one symbol sequence corresponding to the common initial symbol to an inactive status.

In one embodiment of the present invention, there is an apparatus, method, computer readable medium and/or article of manufacture for an operator to temporarily and systematically modify the active status settings of one or more symbol sequences, thereby limiting the number of active sequences of polysemous symbols on sequentially linked electronic screen overlays, as described above, where a polysemous or non-polysemous symbol on a second level electronic screen overlay may function as a terminal symbol in a two symbol sequence and the same polysemous or non-polysemous symbol on the same second level electronic screen overlay may function as an intermediate symbol in at least one longer symbol sequence.

The polysemous or non-polysemous symbol on the second level electronic screen overlay may not function as a terminal symbol in a symbol sequence with an active status if at least one of the longer symbol sequences using the same polysemous or non-polysemous symbol is configured to an active status. In this case, the symbol sequence in which the symbol functions as the terminal symbol in a two symbol sequence may automatically be re-configured to an inactive status and remain inaccessible even if a global binary setting is adjusted to configure all other polysemous symbol sequences to an active status. The active status of the at least one longer polysemous symbol sequences may always take priority so that the largest possible number of active polysemous symbol sequences may be available for use.

Figure 9:
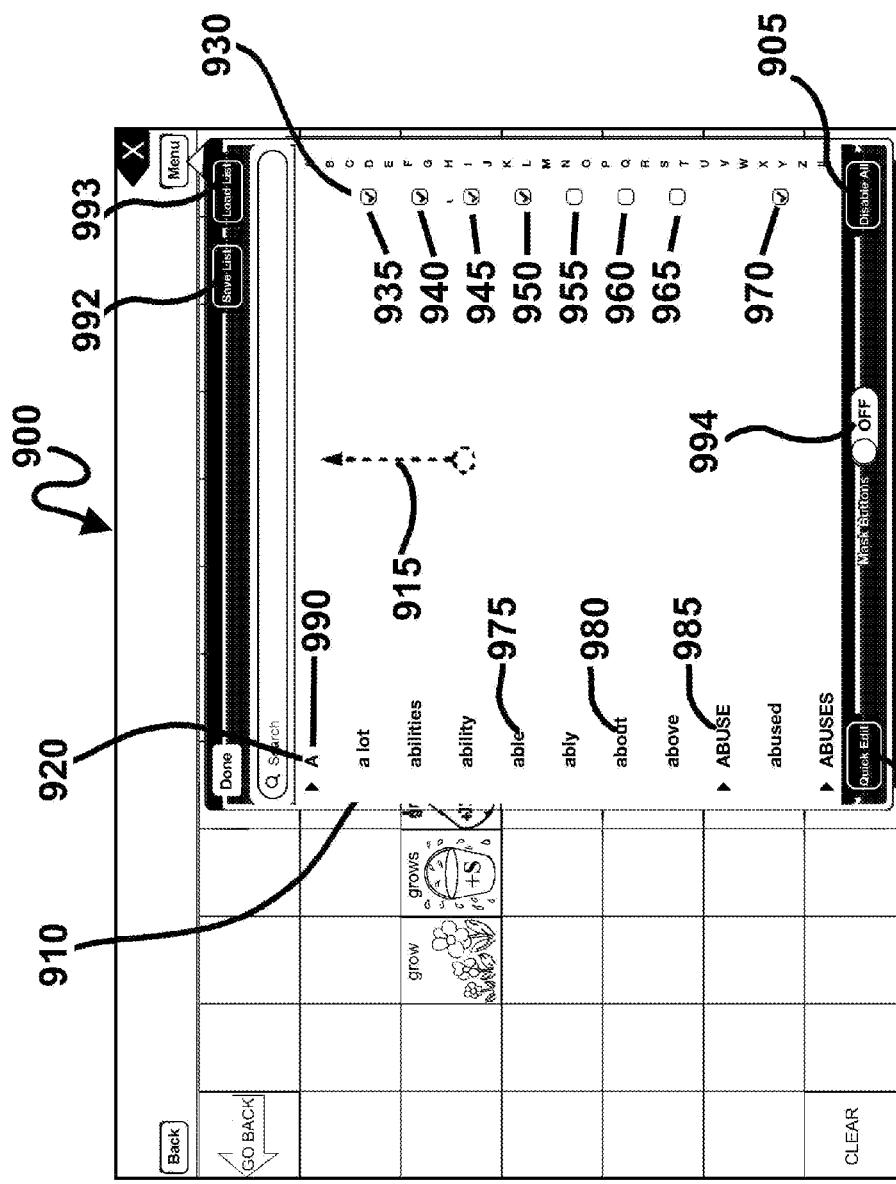
FIG. 9 illustrates an electronic screen overlay including a listing of a plurality of entries in the interactive dictionary database of an embodiment of the present invention.

FIG. 9 shows an electronic screen overlay 900 that includes a listing 910 of a plurality of entries in the interactive dictionary database 700 of an embodiment of the present invention (noting that FIG. 9 illustrates only a partial list, going from A—ABUSES, of all entries in the interactive dictionary database 700) including each corresponding term 920 (text of each previously stored word, phrase, phoneme or message) and a corresponding checkbox 930 that functions as a binary electronic control mechanism to assign an active or inactive status to each entry (active being checked and inactive being un-checked for example). In FIG. 9, the listing is alphabetized in column 920. Each of these terms corresponds to a definition, including a sequence of polysemous symbols on sequentially linked electronic overlays that may be triggered to produce the word, phrase, phoneme or message, and a rationale to explain the relationship between the polysemous symbol sequence and the message.

The checkbox 930 to the right of each entry may be a binary electronic control mechanism that is used to configure the active/inactive status of each of the individual entries in the interactive dictionary database 700. In the example shown in FIG. 9, at least the entries 935, 940, 945, 950 and 970 respectively corresponding to "a lot", "abilities", "ability", and "abused" are currently assigned an active status, as indicated by a check-mark in the corresponding checkbox. In the example shown in FIG. 9, at least the entries 955, 960, and 965 respectively corresponding to "ably", "about", and "above" are currently assigned to an inactive status, as indicated by the absence of a check-mark in the corresponding checkbox. Although not specifically shown, it should be understood that the entries may correspond to single symbol, as well as multi-symbol, sequences. Further, it should also be understood that the interactive dictionary database 700 can also be used in conjunction with the linked electronic screen overlays in the manner discussed above, including in conjunction with symbol sequences being designatable as active/inactive.

The active/inactive status of any of these entries may be adjusted independently. At any time, a sequence of polysemous symbols on sequentially linked electronic screen overlays corresponding to an entry with an active status may be available to an operator working in a communication mode such that it may be triggered to produce a corresponding active previously stored message (and, similarly, can be inactive if/when only single symbol sequences are designated active as described above). At any time, a sequence of polysemous symbols on sequentially linked electronic screen overlays corresponding to an entry with an inactive status may not be available to an operator working in a communication mode such that it may not be triggered to produce a corresponding inactive previously stored message. However, no entries in the interactive dictionary database 700 with an inactive status are deleted from the system.

An operator may optionally view the corresponding definition for any of the displayed terms, including a symbol sequence and/or rationale. Terms 920 that are listed in lower case letters (such as term 975 "able", for example) may correspond to one entry in the interactive dictionary database 700. For example, the term 980 "about" may only correspond to one polysemous symbol sequence and rationale. Terms that are listed in UPPER CASE letters (such as term 985 ABUSE for example) may correspond to two or more entries in the interactive dictionary database 700. In these cases, an operator may optionally view all corresponding definitions (i.e. polysemous symbol sequences and rationales) and independently adjust the active/inactive status of each corresponding definition. For example, there may be two different entries corresponding to term 990 "A". One may correspond to the letter "a" that may be entered in a spelling mode. The other may correspond to the word "a." An operator may set the entry corresponding to the letter "a" to an inactive status and simultaneously set the entry corresponding to the word "a" to an active status.

The plurality of entries in the interactive dictionary database 700 may be substantially larger than the short list shown in FIG. 9, and may exceed the number of entries that may be listed on the screen of the supporting hardware device at any given time. An operator may browse through the entries in the interactive dictionary database 700 in order using known methods, such as using swipe gesture 915 for scrolling, for example. An operator may also search for a specific term in the interactive dictionary database 700 by entering text into a search term field, such as the search term field of FIG. 9.

The example of FIG. 9 includes a binary electronic control mechanism for simultaneously setting all of the entries in the interactive dictionary database 700 to an active or inactive status, specifically the Disable All/Enable All key 905 in the bottom right corner. This control mechanism may be used to rapidly make global adjustments so that the configuration of active/inactive statuses across entries in the interactive dictionary database 700 may be fine-tuned by adjusting individual settings.

The "Quick Edit" key 995 in the bottom left corner of FIG. 9 may be triggered to retrieve and display a mechanism for simultaneously and selectively changing the active/inactive status of a subset of less than all of the plurality of entries in the interactive dictionary database 700, such as a dialog box, for example. In such a dialog box, an operator may use spelling methods to enter a list of one or more terms corresponding to existing entries in the interactive dictionary database 700 and adjust the active/inactive status of all listed terms independently.

The "Save List" key 992 of FIG. 9 can be triggered to save a vocabulary list file containing a list of all entries in the interactive dictionary database 700 with an active status, such as a .txt file, for example. This vocabulary list file may be loaded at a later time to restore the configuration of active/inactive statuses of entries in the interactive dictionary database 700 to the current status. This list may also be editable in a text editor. The "Load List" key 993 of FIG. 9 can be triggered to select and load an existing vocabulary list file from an array of at least one existing vocabulary list files. The contents of two vocabulary list files may be concatenated, or merged into one longer vocabulary list file as a method of systematically increasing the number of active entries in the interactive dictionary database 700.

The "Mask Buttons" mechanism 994 of FIG. 9 is a global binary control mechanism that an operator may adjust at any time. If the "Mask Buttons" mechanism 994 is set to on, then entries in the interactive dictionary database 700 with an active status will be available to an operator in communication mode, and entries in the interactive dictionary database 700 with an inactive status will not be available to an operator in communication mode. If the "Mask Buttons" mechanism 994 is set to off, then all entries in the interactive dictionary database 700 will be available to an operator in communication mode, regardless of their active/inactive status. Adjusting the "Mask Buttons" mechanism 994 may not change the active/inactive statuses of any individual entries in the interactive dictionary database 700.

Figure 10A:
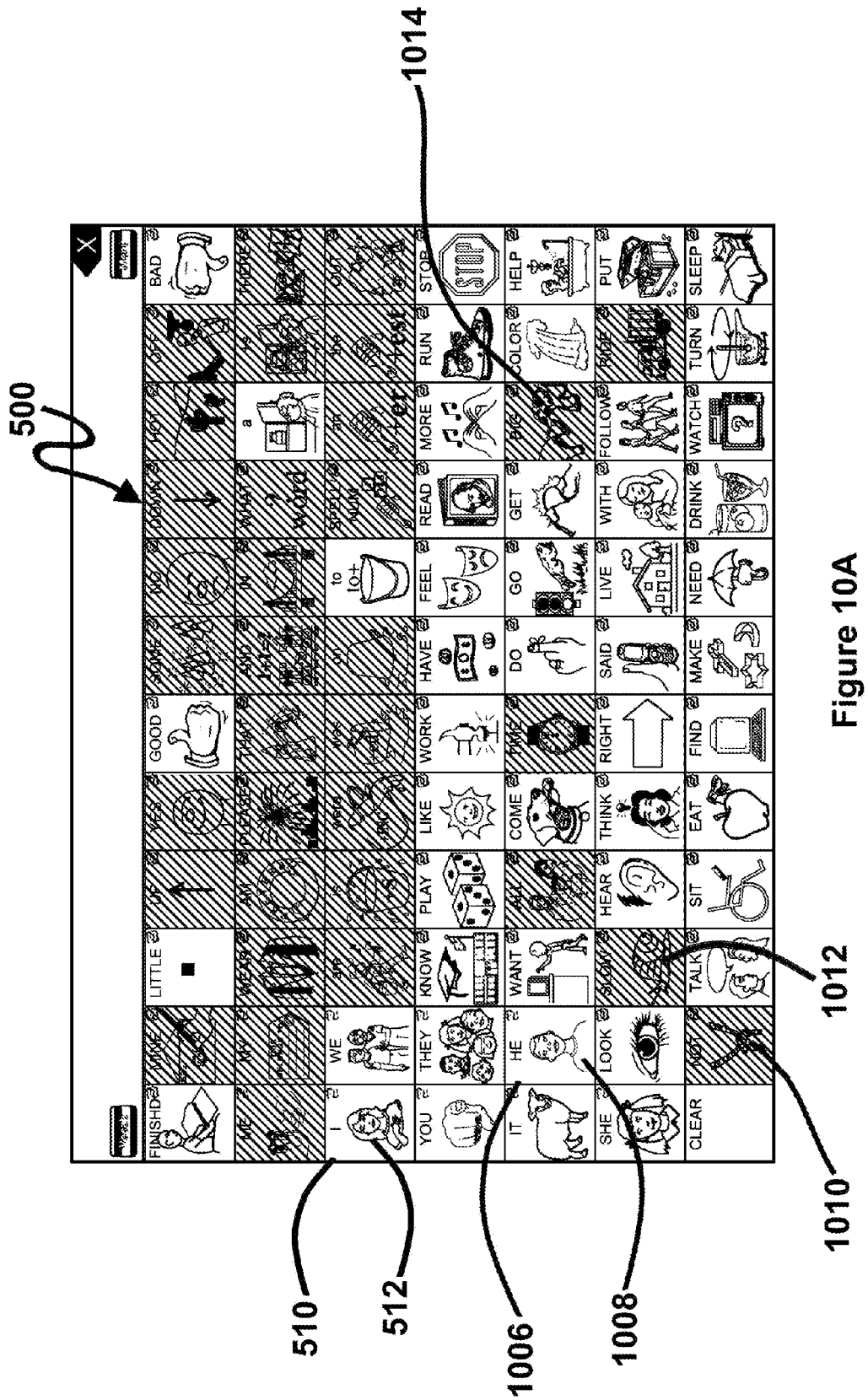
FIG. 10A illustrates a first level electronic screen overlay of an embodiment of the present invention.
Figure 10B:
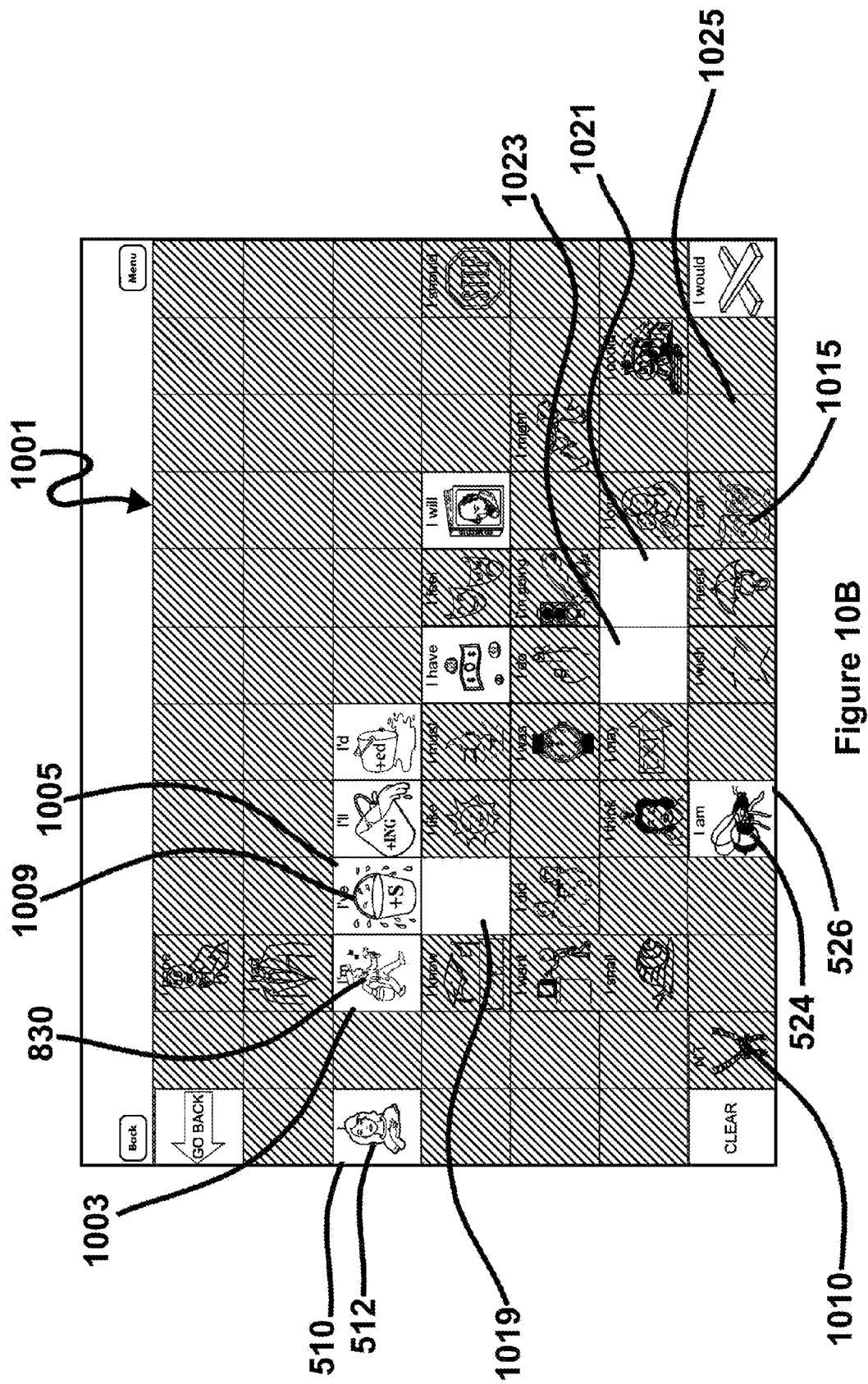
FIG. 10B illustrates a next level electronic screen overlay of an embodiment of the present invention.

FIGS. 10A-B respectively show a first level electronic screen overlay and a second level electronic screen overlay of an embodiment of the present invention wherein many of the plurality of entries in the interactive dictionary database 700 have been set to an inactive status. Many of the entries in the interactive dictionary database 700 may have been set to an inactive status to temporarily and systematically limit the number of entries in the interactive dictionary database 700 that may be available to an inexperienced operator working in a communication mode during an instructional activity. This may support instruction focusing on specific words or language structures.

In the example of FIGS. 10A-B, the active entries in the interactive dictionary database 700 are limited to a subset of entries that may be useful in an instructional activity teaching an inexperienced operator sequences for producing contractions with personal pronouns, such as "I'm," "I've," "he's", "she'll", or "we'd," and un-contracted plural word messages, such as "I am," "I have," "he is," "she will," or "we would." In such an activity, active entries in the interactive dictionary database 700 may include messages that are being targeted in instruction, such as "I'm," "I've," "she'll," or "we'd", and messages that the inexperienced operator is already familiar with and using appropriately, such as verbs "like" or "go" and adjectives "good" or "bad." In this example, an operator may only trigger a polysemous symbol sequence corresponding to an active entry in the interactive dictionary database 700 to produce a corresponding previously stored message. The operator may not trigger any polysemous symbol sequences corresponding to inactive entries in the interactive dictionary database 700 to produce a corresponding previously stored message.

FIG. 10A shows the first level electronic screen overlay 500 of an embodiment of the present invention with 84 key locations on the virtual keyboard of each electronic screen overlay representing a situation wherein many of the entries in the interactive dictionary database 700 may have been set to an inactive status. The first level electronic screen overlay 500 may include the first symbol of every polysemous symbol sequence that corresponds to an entry in the interactive dictionary database 700. Each of the symbols on the first level electronic screen overlay 500 may be used as the first symbol in a plurality of valid sequences of polysemous symbols on sequentially linked electronic screen overlays.

However, in the first level electronic screen overlay 500 of FIG. 10A, only symbols that may be used as the first symbol in one or more sequences corresponding to an entry in the interactive dictionary database 700 with active status can be triggered and are thus selectable by an operator. Other symbols may be invisible (may not be visible), or concealed behind a non-responsive virtual place-holder so that they cannot be triggered or selected by the operator. For example, the key 510 corresponding to the "I" symbol 512 (Row 3, Column 1) may be triggered as the first symbol in active polysemous symbol sequences to produce contractions using the first person pronoun, such as "I'm" and "I've." Even though the "I" symbol 512 is available, it may not be used as the first symbol in inactive polysemous symbol sequences to produce plural word messages "I wish" or "I like." The key 1006 corresponding to the HE symbol 1008 (Row 5, Column 2) may be triggered as the first symbol in active polysemous symbol sequences to produce contractions using the masculine pronoun, "he's," and "he'll." Even though the HE symbol 1008 is available, it may not be used as the first symbol in inactive polysemous symbol sequences to produce plural word messages "he did" or "he was."

There may not be any active polysemous symbol sequences that begin with the NOT symbol 1010 (Row 7, Column 2), the SNAIL symbol 1012 (Row 6, Column 3), or the ELEPHANT symbol 1014 (Row 5, Column 10). Therefore, these symbols may not be triggered by an operator unless the configuration of active/inactive statuses of entries in the interactive dictionary database 700 is changed. These symbols 1010, 1012, and 1014 are thus indicated as hashed out in FIG. 10A to represent that they are inactive as an initial symbol selection.

FIG. 10B shows the I overlay for example, a second level electronic screen overlay 1001 that may be retrieved and displayed when the key 510 corresponding to the I symbol 512 is triggered to continue producing polysemous symbol sequences that begin with the I symbol 512. However, in FIG. 10B, only symbols that may be used as the second symbol in one or more active sequences corresponding to an entry in the interactive dictionary database 700 with active status can be triggered by an operator. Other symbols may be invisible, or concealed behind a non-responsive virtual place-holder (represented by hashed lines in FIG. 10B) so that their corresponding keys cannot be triggered by the operator.

For example, the key 1003 corresponding to the VERB symbol 830 (Row 3, Column 3) may be triggered, resulting in selection of the VERB symbol 830 as the terminal symbol in the active polysemous symbol sequence to produce the contraction "I'm." The key 1005 corresponding to the VERB+S symbol 1009 (Row 3, Column 4) may be triggered, resulting in selection of the VERB+S symbol 1009 as the terminal symbol in the active polysemous symbol sequence to produce the contraction "I've." The key 524 corresponding to the (embellished) APPLE symbol 526 (Row 7, Column 5) may be triggered as the terminal symbol in the un-contracted plural word message "I am."

The JUICE symbol 1015 of FIG. 10B (Row 7, Column 9) may not be triggered as the terminal symbol in the inactive polysemous symbol sequence to produce the plural word message "I can." Similarly, the NOT symbol 1010 of FIG. 10B (Row 7, Column 2) may not be triggered as an intermediate symbol in inactive polysemous symbol sequences to produce negative plural word messages such as "I don't know" unless the configuration of active/inactive statuses of entries in the interactive dictionary database 700 is changed.

A subset of the keys (keys 1019, 1021, and 1023 for example) on the second level electronic screen overlay 1001 of FIG. 10B are blank and cannot be triggered to produce any behaviors, such as producing a previously stored message or linking to a different electronic screen overlay. Blank keys 1019, 1021 and 1023 for example may optionally be concealed behind a non-responsive virtual-place holder so that they are not displayed on the screen like blank key 1025. Blank keys 1019, 1021 and 1023 for example may also optionally be visible on the screen, even when other keys or polysemous symbol sequences are inactive. Examples of both are shown.

In at least one embodiment of the present application, there is a method, apparatus, and/or article of manufacture for providing polysemous and non-polysemous symbols for selection on a plurality of sequentially linked electronic screen overlays displayed on a display, such as integrated input and display 112 for example; storing, in a memory 102, an interactive dictionary database 700 including a plurality of entries, each entry including at least one sequence of symbols including at least one of the polysemous symbols and including an associated at least one word, sentence, phoneme, plural word message, letter, number, morpheme, full name, function, command and/or phrase; receiving via processor 120, an indication of input of at least one word, sentence, phoneme, plural word message, letter, number, morpheme, full name, function, command and/or phrase via triggering an associated polysemous symbol sequence; and storing in memory 102 an indication, via a frequency counter for example, of a number of times that the at least one of a word, sentence, phoneme, plural word message, letter, number, morpheme, full name, function, command and phrase is received via the triggering of the associated polysemous symbol sequence. In at least one embodiment of the present application, the a method, apparatus, and/or article of manufacture, the input at least one word, sentence, phoneme, message, letter, number, morpheme, command and phrase may be initially stored and the indication of a number of times may be incremented by the processor 120 each time the at least one of a word, sentence, phoneme, message, letter, number, morpheme, command and phrase is subsequently received via the triggering of the associated polysemous symbol sequence.

In at least one embodiment of the present application, there is a method, apparatus, and/or article of manufacture for providing polysemous and non-polysemous symbols for selection on a plurality of sequentially linked electronic screen overlays displayed on a display, such as an integrated input and display device 112 for example; storing, in a memory 102, an interactive dictionary database 700 including a plurality of entries, each entry including at least one sequence of symbols including at least one of the polysemous symbols and including an associated at least one word, sentence, phoneme, message, letter, number, morpheme, command and/or phrase; receiving, via a processor 120, an indication of input of at least one word, sentence, phoneme, message, letter, number, morpheme, command and/or phrase via a spelling mode; storing in the memory 102 an indication of a number of times that the at least one of a word, sentence, phoneme, message, letter, number, morpheme, command and phrase is received via the spelling mode; and displaying a prompt, via the integrated input and display device 112, prompting storage of a symbol sequence in the interactive dictionary database 700 corresponding to the received input at least one of a word, sentence, phoneme, message, letter, number, morpheme, command and phrase, upon the processor 120 recognizing that the stored indication has reached a frequency threshold.

In at least one embodiment of the present application, the a method, apparatus, and/or article of manufacture further includes the processor 120 receiving, subsequent to display of the prompt, an indication of input of the at least one word, sentence, phoneme, message, letter, number, morpheme, command and/or phrase, and receiving an indication of input of a symbol sequence; and the processor 120 storing in the interactive dictionary database 700 of the memory 102, the input at least one word, sentence, phoneme, message, letter, number, morpheme, command and/or phrase in association with the received input symbol sequence in the interactive dictionary database 700. Further, the input at least one word, sentence, phoneme, message, letter, number, morpheme, command and phrase may be initially stored and the indication of a number of times may be incremented each time the at least one of a word, sentence, phoneme, message, letter, number, morpheme, command and phrase is subsequently received.

In at least one embodiment of the present application, there is a method, apparatus, and/or article of manufacture for providing a spelling mode; storing, in a memory, a spelled words table including at least a list of all words that have been produced using the spelling mode; adding a word to the spelled words table the first time it is spelled; storing a frequency counter indicating a number of times that a word on the spelled words table is received via a spelling mode; and displaying a prompt, prompting storage of a symbol sequence in the interactive dictionary database corresponding to the received input at least one of a spelled word, upon the stored indication reaching a frequency threshold, thereby prompting an operator to use a polysemous symbol sequence rather than spelling when a frequency threshold is reached for a frequently spelled word.

In at least one embodiment of the present application, there is a method, apparatus, and/or article of manufacture for collecting an automated data log of operator input in real-time, including a record of at least each spelled letter and each previously stored message of at least one of a word, sentence, phoneme, plural word message, letter, number, morpheme, full name, function, command and phrase that is produced by triggering a polysemous symbol sequence corresponding to an existing entry in the interactive dictionary database. This data log may be collected using known methods, a Language Activity Monitor (LAM), for example. The LAM function creates and maintains a text record, called a LAM logfile. Certain activities, such as key activations, symbol selections, navigations among electronic screen overlays, and generated text messages, may be recorded as entries in the LAM logfile.

The frequency counter, indicating a number of times that the at least one of a word, sentence, phoneme, plural word message, letter, number, morpheme, full name, function, command and phrase corresponding to an entry in the interactive dictionary database 700 is received via triggering an associated polysemous symbol sequence, is incremented each time a new entry in the LAM logfile indicates that the corresponding polysemous symbol sequence has been triggered. The frequency counter indicating a number of times that a word on the spelled words table is received via a spelling mode is incremented each time new entries in the LAM logfile indicate that the corresponding word has been produced in the spelling mode.

The frequency threshold for a frequently spelled word on the spelled words table may be an integer, 50 for example.

When a processor 120 recognizes that the frequency counter, indicating a number of times that a word on the spelled words table is received via a spelling mode, reaches a frequency threshold, the processor 120 may automatically search for an existing entry in the interactive dictionary database 700 in memory 102 with a term that matches the text of the frequently spelled word.

a. If an existing entry in the interactive dictionary database 700 with a term that matches the text of the frequently spelled word is found, the operator may be prompted and reminded that the same frequently spelled word could be produced using a polysemous symbol sequence (via the processor triggering a message to be displayed on the touch sensitive display, for example). This prompt may include a display of at least the polysemous symbol sequence and rationale for that polysemous symbol sequence of at least one existing entry in the interactive dictionary database 700 with a term that matches the text of the frequently spelled word, and, if applicable, an option to set this entry in the interactive dictionary database 700 to an active status.

b. If an existing entry in the interactive dictionary database 700 with a term that matches the text of the frequently spelled word is not found, the operator may be prompted (via the processor 120 triggering a message to be displayed on the touch sensitive display 112, for example) to create a new entry in the interactive dictionary database 700 corresponding to the frequently spelled word. This may allow the operator to produce the frequently spelled word using a polysemous symbol sequence and reduce the total number of keystrokes for producing words with many letters, "acupuncture," for example.

In an apparatus including a memory configured to store a plurality of symbol sequences in association with at least one word, sentence, phoneme, message, letter, morpheme, command and/or phrase in an interactive dictionary, wherein upon determining that at least one word has been output via a spelling mode, at least one embodiment is directed to performing a method comprising: determining if the at least one spelled word is included in stored a table of spelled words; storing the at least one spelled word in the table upon determining that the at least one spelled word is not included in the stored table of spelled words; incrementing a frequency count corresponding to the at least one spelled word upon determining that the at least one spelled word is included in the stored table of spelled words; determining, upon the frequency count reaching a threshold count, if the interactive dictionary includes a symbol sequence associated with the stored the at least one spelled word; prompting a user, upon determining that the interactive dictionary does not include a symbol sequence associated with the stored the at least one spelled word, to store the at least one spelled word in the interactive dictionary with a symbol sequence; and displaying a message to the user, upon determining that the interactive dictionary includes a symbol sequence associated with the stored the at least one spelled word, to use the symbol sequence for subsequent output of the at least one spelled word.

The method of at least one embodiment may further comprise: initially determining if the at least one word, sentence, phoneme, message, letter, morpheme, command and/or phrase was output in response to receiving an indication of a selection of symbols of a symbol sequence stored in the interactive dictionary, and associated with at least one word, sentence, phoneme, message, letter, morpheme, command and/or phrase; and/or incrementing a frequency count upon the initial determination being made.

In at least one embodiment of the method, the display of the message includes display of the symbol sequence and associated rationale matching the at least one word, sentence, phoneme, message, letter, morpheme, command and/or phrase; and/or the method may further comprise providing an option to the user, to set the symbol sequence and associated rationale matching the at least one word, sentence, phoneme, message, letter, morpheme, command and/or phrase, in the interactive dictionary database to an active status.

An embodiment may be directed to a computer readable medium including program segments for, when executed on a computer system, causing the computer system to implement any of the methods above.

At least one embodiment on the present application is directed to an apparatus, comprising: a memory 102, configured to store a plurality of symbol sequences in association with at least one word, sentence, phoneme, message, letter, morpheme, command and/or phrase in an interactive dictionary 700 and configured to store a table of spelled words; a processor 120 configured to determine, upon determining that at least one word has been output via a spelling mode, if the at least one spelled word is included in the stored table of spelled words, configured to store the at least one spelled word in the table in the memory upon determining that the at least one spelled word is not included in the stored table of spelled words, configured to increment a frequency count corresponding to the at least one spelled word upon determining that the at least one spelled word is included in the stored table of spelled words, configured to determine, upon the frequency count reaching a threshold count, if the interactive dictionary database 700 includes a symbol sequence associated with the stored the at least one spelled word, and configured to prompt a user, upon determining that the interactive dictionary database 700 does not include a symbol sequence associated with the stored the at least one spelled word, to store the at least one spelled word in the interactive dictionary with a symbol sequence; and an interactive input and display device 112 configured to display a message to the user, upon the processor 120 determining that the interactive dictionary database 700 includes a symbol sequence associated with the stored the at least one spelled word, to use the symbol sequence for subsequent output of the at least one spelled word.

The processor 120 is further configured to, in at least one embodiment, initially determine if the at least one word, sentence, phoneme, message, letter, morpheme, command and/or phrase was output in response to receiving an indication of a selection of symbols of a symbol sequence stored in the interactive dictionary database 700, and associated with at least one word, sentence, phoneme, message, letter, morpheme, command and/or phrase; and/or increment a frequency count upon the initial determination being made.

In at least one embodiment, the display of the message on the interactive input and display device 112 may include display of the symbol sequence and associated rationale matching the at least one word, sentence, phoneme, message, letter, morpheme, command and/or phrase.

In at least one embodiment, the processor 120 is further configured to provide an option to the user, to set the symbol sequence and associated rationale matching the at least one word, sentence, phoneme, message, letter, morpheme, command and/or phrase, in the interactive dictionary database 700 to an active status.

Figure 11:
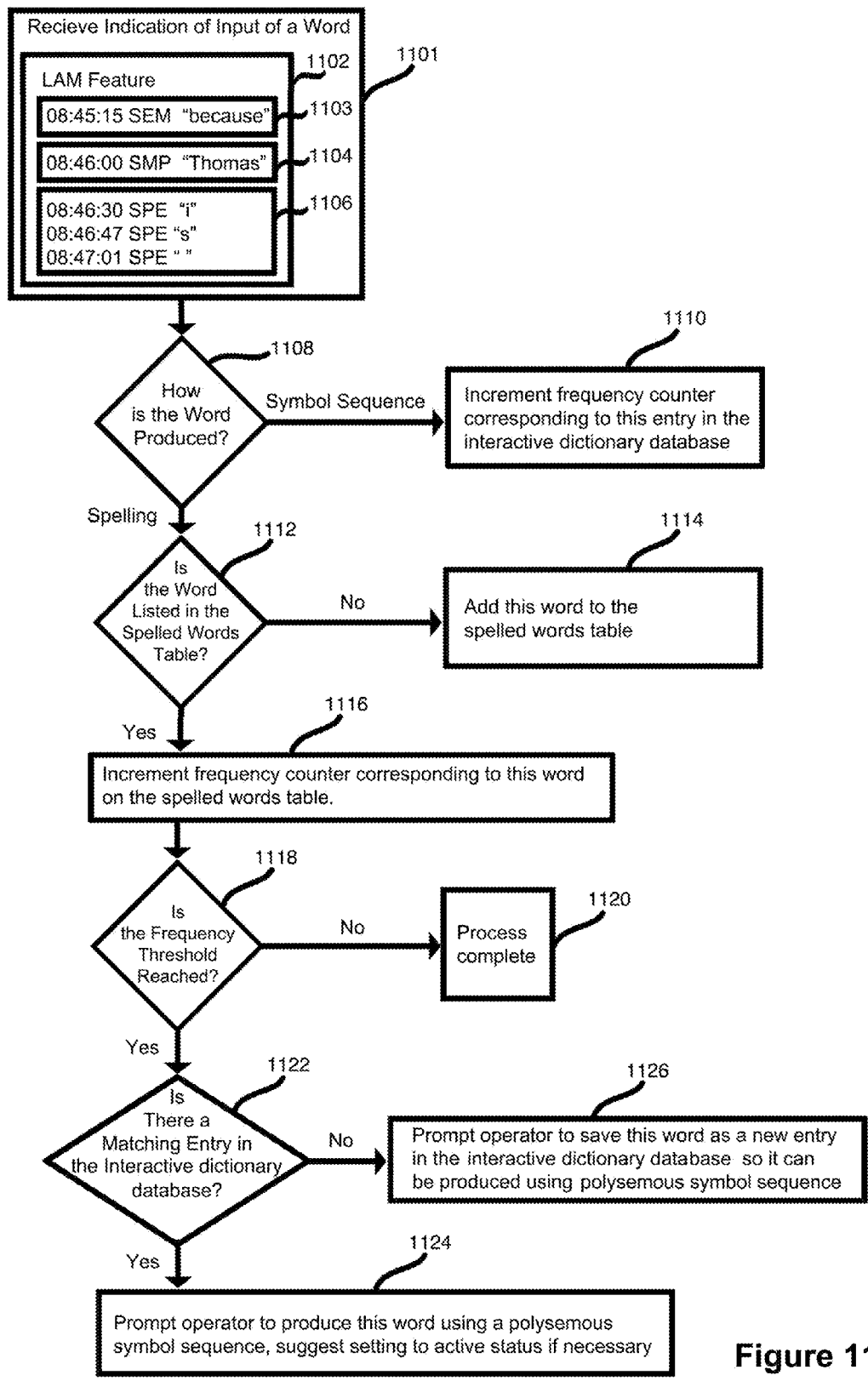
FIG. 11 is a flow diagram showing an embodiment for incrementing a frequency counter when an indication of an input of a word is received.

FIG. 11 is a flow diagram showing an example embodiment of a method for incrementing a frequency counter when an indication of an input of a word is received in step 1101 by a processor 120 for a words that are produced using a spelling mode or words that are produced using a polysemous symbol sequence selection corresponding to an existing entry in an interactive dictionary database 700. In some embodiments, the indication of the input of a word in step 1101 may be received when the word appears in an automated data log of operator input. In some embodiments, the automated data log of operator input may be collected using a LAM feature 1102 that records a time-stamped log of operator input, including a mnemonic code indicating how the operator input was produced.

In the example of FIG. 11, the word "because" was produced using a symbol sequence ending with a polysemous symbol, as indicated by the mnemonic code SEM in box 1103. In the example of FIG. 11, the word "Thomas" was produced using a non-polysemous symbol or a polysemous symbol sequence ending with a non-polysemous symbol, as indicated by the mnemonic code SMP in box 1104. In the example of FIG. 11, the word "is" was produced using a spelling mode, as indicated by the mnemonic code SPE (box 1106). In some embodiments, the system may use this information to determine how the word was produced.

In at least one embodiment of the present invention, a word produced using selection of symbols of a symbol sequence ending with a non-polysemous symbol may correspond to an existing entry in the interactive dictionary database 700. In this at least one embodiment, the inputted word may be at least one word, full name, sentence, phoneme, message, morpheme, function, command and/or phrase corresponding to an existing entry in the interactive dictionary database 700. When an indication of input of one of these words is determined to be received by processor 120 in step 1108, the processor 120 may increment the frequency counter in step 1110 corresponding to this entry in the interactive dictionary database 700.

In at least one embodiment of the present invention, there may be a spelled words table that includes a list of one or more words that have been received by the processor 120 via a spelling mode and a corresponding list of one or more frequency counters. When an indication of input of a word produced using a spelling mode is received in at least one embodiment, the processor 120 will automatically check the spelled words table in step 1112 to determine if the spelled word is listed in the spelled words table. If the spelled word is not listed in the spelled words table, it may be added to the spelled words table as a new list item in step 1114, with a corresponding frequency counter. If the spelled word is listed in the spelled words table, the frequency counter corresponding to this word on the spelled words table may be incremented in step 1116.

In at least one embodiment of the present invention, there may be a frequency threshold for a frequently spelled word on the spelled words list. In at least one embodiment, the frequency threshold may be an integer, such as 50 for example. When the frequency counter corresponding to a spelled word on the spelled words list is incremented in step 1116, the processor 120 may determine whether or not the corresponding frequency threshold is reached in step 1118. If the corresponding frequency threshold is not reached, this process may be complete in step 1120. If the corresponding frequency threshold is reached, the system moves to step 1122 where the processor 120 may determine whether or not there is a matching entry in the interactive dictionary database 700. In at least one embodiment, an entry in the interactive dictionary database 700 may match a spelled word if the text of the corresponding term of at least one of a letter, word, morpheme, phrase, phoneme, sentence, full name, letter, number, plural word message, function, command is the same as the text of the spelled word.

If an existing entry in the interactive dictionary database 700 with a term that matches the text of the frequently spelled word is found, the operator may be prompted in step 1124 and reminded that the same frequently spelled word could be produced using a polysemous symbol sequence (via the processor 120 triggering a message to be displayed on the touch sensitive display 112, for example). This prompt may include a display of at least the polysemous symbol sequence and rationale for that polysemous symbol sequence of at least one existing entry in the interactive dictionary database 700 with a term that matches the text of the frequently spelled word, and, if applicable, an option to set this entry in the interactive dictionary database 700 to an active status.

If an existing entry in the interactive dictionary database 700 with a term that matches the text of the frequently spelled word is not found, in step 1126 the operator may be prompted (via the processor 120 triggering a message to be displayed on the touch sensitive display 112, for example) to create a new entry in the interactive dictionary database 700 corresponding to the frequently spelled word. This may allow the operator to produce the frequently spelled word using a polysemous symbol sequence and reduce the total number of keystrokes for producing words with many letters, like "acupuncture" for example.

In at least one embodiment of the present invention, there is an apparatus, method, computer readable medium and/or article of manufacture for an operator to retrieve a current list of the values of a plurality of frequency counters indicating the number of times that the at least one of a letter, word, morpheme, phrase, phoneme, sentence, full name, letter, number, plural word message, function, command corresponding to each of a plurality of entries in the interactive dictionary database 700 has received via triggering a plurality of associated polysemous symbol sequences and/or the values of a plurality of frequency counters indicating a number of times that a plurality of words on the spelled words table have been received via a spelling mode.

The retrieved list of values of the plurality of frequency counters indicating the number of times that the at least one of a letter, word, morpheme, phrase, phoneme, sentence, full name, letter, number, plural word message, function, command corresponding to each of a plurality of entries in the interactive database 700 has been received via triggering a plurality of associated polysemous symbol sequences may include at least one value of zero if the at least one of a letter, word, morpheme, phrase, phoneme, sentence, full name, letter, number, plural word message, function, command corresponding to at least one entry in the interactive dictionary database has not been received via triggering the associated polysemous symbol sequence and the corresponding frequency counter has not been incremented above zero.

The retrieved list of values of the plurality of frequency counters may be reported to the operator in a list form or a graphical form. This report may include both zero values and integer values greater than zero.

In at least one embodiment of the present invention, there is an apparatus, method, computer readable medium and/or article of manufacture for an operator to selectively retrieve a current list of the values of a specific subset of a plurality of frequency counters, as described above, where the specific subset of frequency counters to be retrieved is defined based on a list that is stored in memory, or a new list that is operator defined. For example, an operator may selectively retrieve a current list of the values of frequency counters indicating the number of times that each conjunction in the English language has been received via triggering associated polysemous symbol sequences and/or via a spelling mode.

The selectively retrieved list of values of a specific subset of a plurality of frequency counters may include at least one value of zero if the at least one of a letter, word, morpheme, phrase, phoneme, sentence, full name, letter, number, plural word message, function, command corresponding to at least one entry in the interactive dictionary database has not been received via triggering the associated polysemous symbol sequence, and the corresponding frequency counter has not been incremented above zero. For example, an operator may selectively retrieve a current list of the values of frequency counters indicating the number of times that each conjunction in the English language has been received via triggering associated polysemous symbol sequences, where the value of the frequency counter corresponding to the word "unless" is zero because "unless" has not been received via triggering the associated polysemous symbol sequence.

The retrieved list of values of the plurality of frequency counters may be reported to the operator in a list form or a graphical form. This report may include both zero values and integer values greater than zero.

Figure 12:
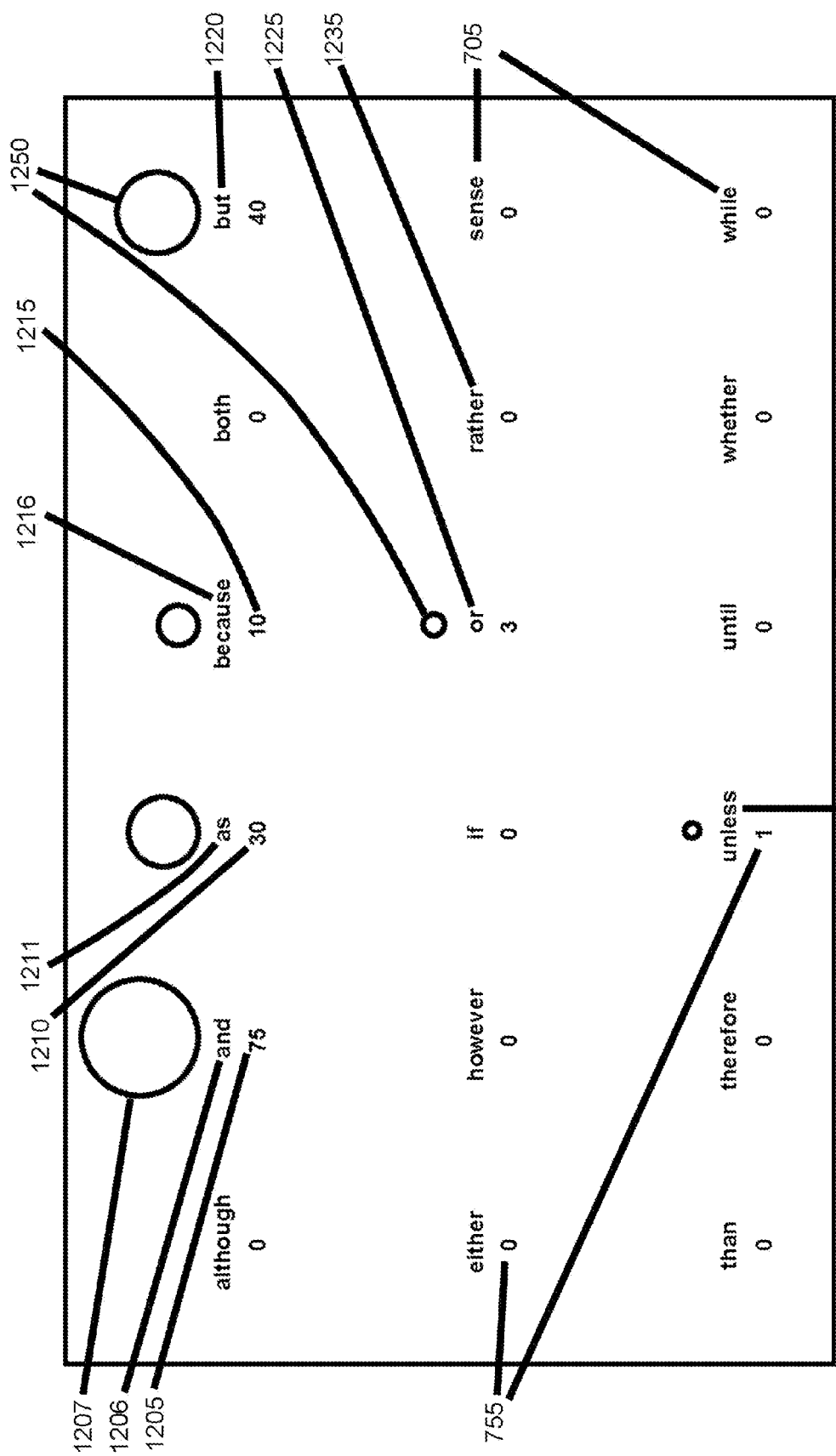
FIG. 12 shows an example of a report reporting values of frequency counters.

FIG. 12 shows an example of a report 1200 reporting a current list of values of a selected subset of frequency counters 755 that have been retrieved from the interactive dictionary database 700. The report in the example of FIG. 12 lists the current values of frequency counters corresponding to each of a list of eighteen English conjunctions. Each of the words listed in the example of FIG. 12 may correspond to the message 705 of at least one existing entry in the interactive dictionary database 700, and may be produced using a corresponding polysemous symbol sequence 715 on sequentially linked electronic screen overlays. The current values of the frequency counters 755 corresponding to the at least one existing entry in the interactive dictionary database 700 corresponding to each of the selected subset of words may be reported in conjunction with each word. For example, the value of the frequency counter 1205 corresponding to "and" 1206 may be reported as 75, indicating that "and" has been produced using a polysemous symbol sequence 75 times. In a similar way, the value of the frequency counter 1210 corresponding to "as" 1211 may be 30, indicating that "as" has been produced using a polysemous symbol sequence 30 times. The value of the frequency counter 1215 corresponding to "because" 1216 may be 10, indicating that "because" has been produced using a polysemous symbol sequence 10 times. In a similar way, the values of the frequency counters corresponding to "but" 1220, "or" 1225, and "unless" 1230 may be 40, 3, and 1 respectively, indicating the number of times that each of these words has been produced using a polysemous symbol sequence. The value of the frequency counters corresponding to some messages, such as "rather" 1235 may be zero, indicating that the corresponding message has not been produced using a polysemous symbol sequence.

In some embodiments, the values of frequency counters may also be indicated graphically using a non-text indicator. In the example of FIG. 12, each of the words listed is displayed in conjunction with a circle 1250, and the size of the circle corresponds to the reported value of each corresponding frequency counter. For example, "and" corresponds to a relatively large circle 1207 because the value of the corresponding frequency counter is relatively large. The circles corresponding to "but" 1220, "as" 1211, and "because" 1216 are smaller because the values of the corresponding frequency counters are smaller. The circles corresponding to "or" 1225 and "unless" 1230 are very small because the values of the corresponding frequency counters are only 3 and 1, respectively. Note that there is no circle corresponding to "rather" 1235 indicating that the value of this frequency counter is zero, and that this message has never been produced using a polysemous symbol sequence.

In at least one embodiment of the present invention, there is an apparatus, method, computer readable medium and/or article of manufacture for temporarily and systematically limiting the number of active entries in an interactive dictionary database 700 corresponding to sequences of polysemous symbols on sequentially linked electronic screen overlays and automatically increasing the number of active entries in the interactive dictionary database 700 when a threshold of logged system usage is achieved in an automated log of operator input data. In at least one embodiment, the system and/or method comprises:

a. An interactive dictionary database 700 is provided, as described above, where less than all of the plurality of entries are initially set to an inactive status, and less than all of the same plurality of entries are initially set to an active status, where a previously stored message that corresponds to an entry with an active status may be produced by triggering a polysemous symbol sequence, and a previously stored message that corresponds to an entry with an inactive status cannot, as described above.

b. Each entry in the interactive dictionary database 700 may correspond to frequency counter indicating a number of times that the at least one of a word, sentence, phoneme, message, letter, number, morpheme, command and phrase corresponding to an entry in the interactive dictionary database 700 is received via triggering an associated polysemous symbol sequence. This frequency counter may be incremented each time each time a processor detects that the associated polysemous symbol sequence is triggered, as described above.

c. As an operator uses the system, an automated data log of operator input, including at least each previously stored message that is triggered may be collected in real-time using known techniques, LAM, for example.

d. Each of the less than all of the plurality of entries in the interactive dictionary database 700 that are initially set to an inactive status may correspond to a threshold argument 765, where the threshold argument 765 includes at least an integer value for a threshold frequency, and a pointer indicating one or more of the other entries in the interactive dictionary database 700. At least one of the entries in the interactive dictionary database 700 that initially has an inactive status and corresponds to a threshold argument 765, where the threshold argument 765 includes a pointer indicating one or more entries in the interactive dictionary database 700 that initially have an active status and no entries in the interactive dictionary database 700 that have an inactive status. The threshold argument 756 for an entry in the interactive dictionary database 700 that is initially set to an inactive status may be satisfied when the sum of the frequency counters corresponding to the at least one other entry in the interactive dictionary database 700 identified in the threshold argument 765 equals the threshold frequency. For example, a threshold value corresponding to "my" may be that the word "mine" should be produced 25 times. In another example, a threshold value corresponding to a plural noun may be that various present progressive verbs (verbs ending in -ing) should be produced a combined total of 100 times. The threshold argument 765 may be defined as a number of times that one or more other previously stored messages are produced on the system. The database also may contain a field, uniquely associated with each stored message, which is a threshold argument 765 and level that the processor 120 can use to determine the active/inactive status of the message. The threshold argument 765 may include pointers to the frequency counters of a list of other stored messages stored in the database in memory 102.

e. If the threshold argument 765 reaches the associated threshold frequency for a particular entry in the interactive dictionary database 700 with an inactive status, the active/inactive status may be automatically reconfigured to active so that the corresponding at least one of a word, sentence, phoneme, message, letter, number, morpheme, command and phrase can be produced by triggering the corresponding symbol sequence. Alternately, the operator may be informed that the threshold argument 765 for the particular message has been satisfied and reminded to reconfigure the status of the message to active.

f. When an entry in the interactive dictionary database 700 is automatically re-configured to an active status, the operator may be prompted with an announcement that a new entry in the interactive dictionary database 700 has been re-configured to an active status and instructions explaining how to produce the corresponding previously stored message of at least one of a word, sentence, phoneme, message, letter, number, morpheme, command and phrase by triggering a polysemous symbol sequence and a rationale for that polysemous symbol sequence.

Figure 13:
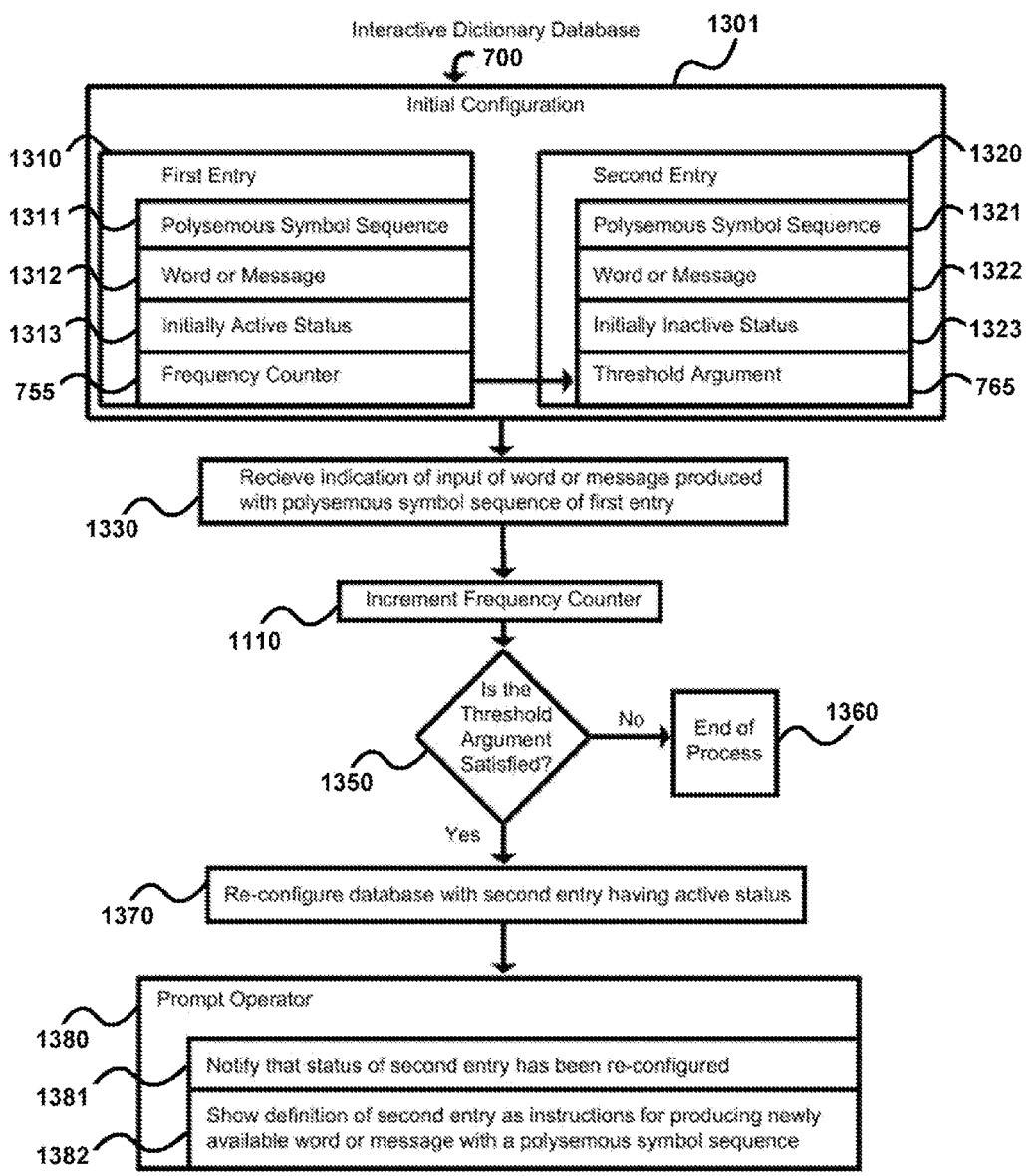
FIG. 13 is a flow diagram showing of a method for using a frequency threshold to automatically re-configure the active/inactive setting of an entry in an interactive dictionary database.

FIG. 13 is a flow diagram showing a method for using a frequency threshold 765 to automatically re-configure the active/inactive setting of an entry in an interactive dictionary database 700 to increase the number of active entries in the interactive dictionary database 700 based on frequency of operator input. In at least one embodiment, the initial interactive dictionary database 700 has an initial configuration 1301 with a first entry 1310 corresponding to a first polysemous symbol sequence 1311 and a first word or message 1312 and a second entry 1320 corresponding to a second polysemous symbol sequence 1321 and a second word or message 1322. In at least one embodiment, the first word or message 1312 and the second word or message 1322 may be at least one of a letter, word, morpheme, phrase, phoneme, sentence, full name, letter, number, plural word message, function, command. The first entry 1310 may initially be configured to have an active status 1313. The second entry 1320 may initially be configured to have an inactive status 1323. The first entry 1310 may include to a frequency counter 755, which increments each time an indication of input of the corresponding word or message 1312 has been received via triggering the corresponding first polysemous symbol sequence 1311. The second entry 1320 may include a threshold argument 765, where the threshold argument 765 includes an integer value for a threshold frequency and a pointer indicating the first entry 1310. The threshold argument 765 of the second entry 1320 may read the value of the frequency counter 755 of the first entry 1310.

In the example embodiment of FIG. 13, each time the processor receives an indication of input of the word or message of the first entry produced with a polysemous symbol sequence in step 1330, the system will increment the frequency counter of the first entry in step 1110. In at least one embodiment, the system may determine if the threshold argument 765 of the second entry 1320 is satisfied by the new value of the frequency counter 755 of the first entry in step 1350. In at least one embodiment, the process may end in step 1360 if the threshold argument 765 of the second entry 1320 is not satisfied. If the threshold argument 765 of the second entry 1320 is satisfied, the processor may automatically re-configure the active/inactive statuses of entries in the interactive dictionary database 700 such that the second entry 1320 has an active status in step 1370. In at least one embodiment, the operator may be prompted in step 1380 after the interactive dictionary database 700 has been re-configured, via a popup on the integrated input and display device 112, for example.

In at least one embodiment, the prompt in step 1380 may include at least notification 1381 indicating that the status of the second entry has been re-configured. In at least one embodiment, the prompt in step 1380 may include a display of the definition of the second entry in the interactive dictionary database 700 as instructions for producing the second word or message 1322 using the corresponding second polysemous symbol sequence 1321. In at least one embodiment, the displayed definition includes at least the second polysemous symbol sequence 1321 and a rationale 725.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of an apparatus or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor 120). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
providing a keyboard, the keyboard including a plurality of selectable polysemous symbols;
storing an interactive dictionary database in a memory, the interactive dictionary database including a plurality of symbol sequences, each of the plurality of symbol sequences including at least one of the selectable polysemous symbols and each of the plurality of symbol sequences being stored in association with a rationale and at least one word, sentence, phoneme, message, letter, number, morpheme, command and/or phrase, each of the respective the rationales relating each of the respective symbol sequences to the associated at least one word, sentence, phoneme, message, letter, number, morpheme, command and/or phrase; and
displaying, upon a processor receiving an input from a user, at least portions of the interactive dictionary database to the user, the at least portions including at least one associated symbol sequence, rationale and at least one word, sentence, phoneme, message, letter, number, morpheme, command and/or phrase, at least a subset of the plurality of polysemous symbol sequences being assignable by a user at least one of an active and an inactive status, wherein when an inactive status is assigned to one of the plurality of polysemous symbol sequences, a corresponding sequence of previously selectable symbols of the keyboard is rendered unselectable by the user.

2. The method of claim 1, wherein the interactive dictionary database is searchable.

3. The method of claim 1, wherein the displaying includes displaying selectable information useable to assign at least a subset of the plurality of polysemous symbol sequences at least one of an active and an inactive status.

4. The method of claim 1, wherein the electronic overlay is a virtual keyboard.

5. The method of claim 4, wherein an integrated input and display device includes the virtual keyboard and performs the displaying.

6. The method of claim 1, wherein the interactive dictionary database includes a plurality of rationales, each respectively relating each of the plurality of symbol sequences to their associated at least one of words, sentences, phonemes, messages, letters, numbers, morphemes, commands and phrases.

7. A non-transitory computer readable medium including program segments for, when executed on a computer system, causing the computer system to implement the method of claim 1.

8. An apparatus, comprising:
a memory configured to store an interactive dictionary database, the interactive dictionary database including a plurality of symbol sequences, each of the plurality of symbol sequences including at least one selectable polysemous symbol of an electronic overlay and each of the plurality of symbol sequences being stored in association with at least one word, sentence, phoneme, message, letter, number, morpheme, command and/or phrase; and
an integrated input and display device, including the electronic overlay including a plurality of selectable polysemous symbols, configured to display at least portions of the interactive dictionary database to a user upon receipt of user input, including information useable to assign at least a subset of the plurality of symbol sequences at least one of an active and an inactive status, wherein the information useable to assign at least a subset of the plurality of symbol sequences at least one of an active and an inactive status is stored in the memory, in association with at least a plurality of the symbol sequences, and wherein the integrated input and display device is configured to display the information to the user in a selectable manner, wherein when an inactive status is assigned to one of the plurality of polysemous symbol sequences, a corresponding sequence of previously selectable symbols of the electronic overlay is rendered unselectable by the user.

9. The apparatus of claim 8, further comprising a processor configured to receive input information relating to the at least one of an active and an inactive status of a symbol sequence and edit the interactive dictionary database stored in memory.

10. The apparatus of claim 8, wherein the interactive dictionary database includes a plurality of rationales, each respectively relating each of the plurality of symbol sequences to their associated at least one of words, sentences, phonemes, messages, letters, numbers, morphemes, commands and phrases.

* * * * *